US011975278B2

(12) United States Patent
Joscher et al.

(10) Patent No.: US 11,975,278 B2
(45) Date of Patent: May 7, 2024

(54) VALVE ARRANGEMENT, LIQUID FILTERS, FILTER ASSEMBLIES, AND METHOD

(71) Applicant: Donaldson Company, Inc., Minneapolis, MN (US)

(72) Inventors: Kurt B. Joscher, Burnsville, MN (US); Mark C. Shepherd, Minneapolis, MN (US); Brent T. Harrold, Minneapolis, MN (US); Michael S. Courneya, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 195 days.

(21) Appl. No.: 17/389,643

(22) Filed: Jul. 30, 2021

(65) Prior Publication Data

US 2022/0032217 A1    Feb. 3, 2022

Related U.S. Application Data

(60) Provisional application No. 63/141,185, filed on Jan. 25, 2021, provisional application No. 63/059,682, filed on Jul. 31, 2020.

(51) Int. Cl.
*B01D 35/157*    (2006.01)
*B01D 17/04*    (2006.01)
(Continued)

(52) U.S. Cl.
CPC ....... *B01D 35/1573* (2013.01); *B01D 17/045* (2013.01); *B01D 29/31* (2013.01); *B01D 35/30* (2013.01); *B01D 36/003* (2013.01); *F16K 31/535* (2013.01); *B01D 2201/12* (2013.01); *B01D 2201/167* (2013.01);
(Continued)

(58) Field of Classification Search
CPC .. B01D 35/1573; B01D 17/045; B01D 29/31; B01D 35/30; B01D 36/003; B01D 2201/12; B01D 2201/167; B01D 2201/291; B01D 2201/4076; B01D 2201/4092; B01D 29/21; B01D 2201/295; B01D 2201/302; B01D 2201/4053; B01D 35/147;
(Continued)

(56) References Cited

U.S. PATENT DOCUMENTS 4,698,164 A * 10/1987 Ellis ................... B01D 35/157
                                                                210/100
7,232,035 B1    6/2007 Crawford et al.
(Continued)

FOREIGN PATENT DOCUMENTS

CN    103861343 A    6/2014
CN    110925450 A    3/2020
(Continued)

OTHER PUBLICATIONS

1 International Search Report and Written Opinion for PCT/US2021/043976 dated Jan. 5, 2022, 17pgs.

*Primary Examiner* — Madeline Gonzalez
(74) *Attorney, Agent, or Firm* — Merchant & Gould P.C.

(57) ABSTRACT

A valve arrangement includes a valve shaft having a fluid flow bore, and valve gear projections or teeth projecting from the valve shaft, constructed and arranged to receive a force to rotate the valve shaft. The valve arrangement can be used in a filter assembly having cartridge projections such as gear teeth to mesh with the teeth on the valve gear.

22 Claims, 42 Drawing Sheets

(51) Int. Cl.
*B01D 29/31* (2006.01)
*B01D 35/30* (2006.01)
*B01D 36/00* (2006.01)
*F16K 31/53* (2006.01)

(52) U.S. Cl.
CPC ............ *B01D 2201/291* (2013.01); *B01D 2201/4076* (2013.01); *B01D 2201/4092* (2013.01)

(58) Field of Classification Search
CPC ..... F16K 31/535; F16K 5/0442; F02M 37/24; F02M 37/36
USPC .... 210/234, 235, 282, 440–444, 455, 493.2, 210/450, 145, 429
See application file for complete search history.

(56) References Cited

U.S. PATENT DOCUMENTS

| | | |
|---|---|---|
| 8,333,890 B2 | 12/2012 | Blizard et al. |
| 8,501,001 B2 | 8/2013 | Curt et al. |
| 8,858,793 B2 | 10/2014 | Roesgen |
| 9,067,154 B1 | 6/2015 | Branscomb et al. |
| 10,238,999 B2 | 3/2019 | Malgorn et al. |
| 10,253,737 B2 | 4/2019 | Jokschas et al. |
| 2006/0219626 A1 | 10/2006 | Dworatzek et al. |
| 2014/0001113 A1 | 1/2014 | Jun Yoshino et al. |
| 2018/0257011 A1 | 9/2018 | Bodn et al. |

FOREIGN PATENT DOCUMENTS

| | | |
|---|---|---|
| DE | 102004060517 B3 | 8/2006 |
| DE | 102005043968 A1 | 3/2007 |
| DE | 102012007762 A1 | 10/2013 |
| DE | 102015114322 A1 | 3/2017 |
| DE | 102017203796 A1 | 9/2018 |
| EP | 2189692 A2 | 5/2010 |
| EP | 2653675 A1 | 10/2013 |
| FR | 2890703 A1 | 3/2007 |
| WO | 2008143930 A1 | 11/2008 |
| WO | 2012151749 A1 | 11/2012 |
| WO | 2018156489 A1 | 8/2018 |
| WO | 2018222804 A2 | 12/2018 |

\* cited by examiner

VALVE ARRANGEMENT, LIQUID FILTERS, FILTER ASSEMBLIES, AND METHOD

This application claims the benefit of U.S. Provisional Patent Application Ser. No. 63/059,682, filed Jul. 31, 2020, and U.S. Provisional Patent Application Ser. No. 63/141,185, filed Jan. 25, 2021, the entire disclosures of which are incorporated by reference in their entirety.

TECHNICAL FIELD

The present disclosure relates to valves in general. It particularly concerns valves usable with liquid filters and the filters, filter heads, and filter assemblies, which utilize a serviceable filter cartridge. The liquid filters can be used for a variety of applications. Assemblies and methods of preparation and use are provided.

BACKGROUND

Valves are useable for controlling the amount of fluid flow through a conduit in a variety of applications. One example application is for filters, such as filters for liquids.

Liquid filters are used for a variety of applications, for example to filter lubricating fluids, fuels or hydraulic fluids. During use, liquid to be filtered is passed through a filter media, as filtration occurs. A well-known configuration, is to position the filter media as a cylinder surrounding a central clean liquid volume, with filtration flow occurring with an outside to inside (out-to-in) flow through the filter media. In other arrangements filtering flow is from inside the cartridge to outside (in-to-out).

In many instances, the filter media is provided in the form of filter cartridge, in extension between first and second, opposite, end caps. Examples of filter cartridges which utilize such constructions, are described for example in WO 02/070869 A1 published 12 Sep. 2002, (FIGS. 1 and 2), the complete disclosure of WO 02/070869 being incorporated herein by reference.

In many assemblies, the filter cartridge is constructed as a removable and replaceable (i.e., serviceable) component, see for example FIGS. 1 and 2 of WO 02/070869 A1. It is desirable to provide for liquid filter designs that allow for desired options in construction of service cartridges.

The filter cartridge is typically selectively attachable and detachable from a filter head. The filter head includes ports for unfiltered liquid and for filtered (clean) liquid. The filter head can also include valve configurations for controlling the flow of liquid into the filter cartridge. It is desirable to provide for valve designs that allow for desired options in operation of the valve, and in some applications, in connection with filter heads and service cartridges.

SUMMARY

In general, a valve arrangement is provided including a valve shaft having a fluid flow bore, and valve gear teeth projecting from the valve shaft, constructed and arranged to receive a force to rotate the valve shaft.

The shaft has opposite first ends and second ends with a longitudinal axis passing through the first and second ends. The fluid flow bore has a central axis perpendicular to the longitudinal axis.

In many embodiments, the fluid flow bore has a non-circular perimeter shape.

In many embodiments, the fluid flow bore has an oval perimeter shape.

The valve gear teeth can project from the second end of the shaft.

The valve gear teeth can project radially from the second end of the shaft.

The valve gear teeth can include at least 2 teeth circumferentially spaced from each other.

The valve gear teeth can include at least 3 teeth circumferentially spaced from each other.

The valve gear teeth can include anywhere from 2-10 teeth circumferentially spaced from each other.

In some examples, the valve gear teeth are spur valve gear teeth.

In general, the valve arrangement can be used with a liquid filter assembly. The filter assembly has an unfiltered liquid inlet, a filter cartridge to filter incoming liquid, and a filtered liquid outlet. The valve arrangement controls a volume of liquid flow through unfiltered liquid inlet to the filter cartridge.

In another aspect, a filter cartridge is provided including a filter media construction and a set of cartridge projections attached to the filter media construction.

The cartridge projections can be gear teeth.

The cartridge projections can be part of a ring member.

The cartridge projections can be circumferentially spaced from each other.

The cartridge projections can extend radially outwardly.

The filter media construction may include pleated media in a tube shape surrounding an open interior volume having first and second opposite ends. The cartridge can include a first end cap secured to the first end of the filter media construction, in which the first end cap has an opening in communication with the open interior volume.

The ring member can be part of the first end cap.

The filter cartridge may also include a radially directed seal member secured to the first end cap.

The pleated media can have inner pleat tips and outer pleat tips, and the seal member can be positioned spaced radially from both the inner pleat tips and outer pleat tips.

The ring member can have the projections radially spaced between the inner pleat tips and outer pleat tips, and the projections can be spaced radially inward from the outer pleat tips.

The first end cap may include a seal member holder extending axially from the first end cap and between the inner pleat tips and outer pleat tips. The holder can have a radial groove holding the seal member. The ring member can be in integral part of the seal member holder.

In some embodiments, the seal member extends radially inwardly, and the projections on the ring member extend radially outwardly.

In some arrangements, the cartridge projections project from a radial wall of the ring member.

Some examples include the cartridge projections projecting from a plane perpendicular to a central longitudinal axis of the filter media construction.

In some embodiments, the cartridge projections are spur gear teeth.

In example embodiments, the cartridge further includes a second end cap secured to a second end of the filter media construction.

The filter cartridge can further include a housing with an interior holding the filter media construction within the interior.

The housing can have externally directed threads for connection with the filter head.

The filter media construction, in some embodiments, can be non-removably secured within the housing.

In some embodiments, the filter media construction can be removably secured within the housing.

In some embodiments, each projection has a height of 0.12-0.34 inch.

In some embodiments, each projection has a height of about 13/35".

In some embodiments, each projection is a gear tooth sized so that a one tooth angle of rotation is 7.2-20°.

In some examples, each projection is a gear tooth is sized so that a one tooth angle of rotation is about 10-11°.

In some embodiments, there are no more than 50 projections.

In some embodiments, there are no fewer than 18 projections.

In some embodiments, there are about 43-47 projections.

In another aspect, a filter head arrangement is provided. The filter head arrangement includes a fluid inlet and a valve arrangement, as variously characterized above, in which the valve teeth are constructed and arranged to receive a force to rotate a valve shaft between an open position and a closed position. The open position aligns the fluid flow bore with the fluid inlet, and the closed position blocks fluid flow from the fluid inlet. The valve arrangement can further include a torsion spring to hold the valve shaft in the closed position when no force is applied to the valve gear teeth.

In another aspect, a filter assembly is provided. The filter assembly includes a filter head, as characterized previously, and a filter cartridge, as variously characterized above removably secured to the filter head. The cartridge projections on the filter cartridge apply a force against the valve gear teeth to move the valve shaft between the open and closed positions.

In example embodiments, the cartridge projections are gear teeth, and a ratio of the valve gear teeth to the cartridge gear teeth is about 1:2.5-1:5.

In some examples, a ratio of the valve gear teeth to the cartridge gear teeth is about 1:2.69.

In some examples, the height of the valve gear teeth and the cartridge gear teeth is between about 0.12-0.34 inch.

In some examples, the height of the valve gear teeth and the cartridge gear teeth is about 13-35ths".

In some examples, the valve shaft has an outer diameter of about 17-18 mm, and the bore and the valve shaft has a diameter of about 9-10 mm.

The valve shaft can have a rotational axis parallel to a central longitudinal axis of the filter cartridge, in some examples.

The valve shaft can have a rotational axis perpendicular to a central longitudinal axis of the filter cartridge, in some examples.

In some examples, the filter cartridge is a spin-on cartridge comprising a filter element non-removably secured within an outer housing, and the housing is removably attached to the filter head.

In other embodiments, the filter cartridge comprises a bowl-cartridge assembly including a filter element removably positioned within a bowl, and the bowl in removably attached to the filter head.

In some example embodiments, the bowl-cartridge assembly further includes a coalescer element in an interior of the filter cartridge.

The filter element and bowl can include an anti-rotation arrangement, in examples.

The anti-rotation arrangement may include a plurality of tabs projecting radially from the element, and a plurality of slots along an interior wall of the bowl receiving the tabs.

The anti-rotation arrangement may include at least one protrusion extending outward from an endcap.

The anti-rotation arrangement may comprises a pocket arrangement configured to receive a protrusion on a filter housing.

In a further aspect, a method is provided comprising: rotating a filter assembly having a first screw thread relative to a mating screw thread of a filter head, wherein rotating the filter assembly rotates a set of cartridge projections; axially translating the first endcap of the filter assembly into the filter head resulting from rotating the filter assembly, wherein axially translating the first endcap into the filter head positions the cartridge projections into operational engagement with a projections on a valve shaft in the filter head; and opening a valve integral with the valve shaft in the filter head by rotating the projections on the valve shaft resulting from rotating the cartridge projections.

The step of opening the valve may comprise rotating the valve about a rotational axis.

In some examples, the rotational axis is perpendicular to the central axis, while in some examples, the rotational axis is parallel to the central axis.

In some examples, the valve is a ball valve.

In some examples, the cartridge projections comprise a drive gear in the form of one of a bevel gear or worm gear.

The concepts disclosed herein relates to a filter assembly incorporating a drive gear that is rotatably fixed to the filter assembly. Rotation of the filter assembly results in rotation of the drive gear, which can be used to transmit rotational motion to other components such as a driven gear. The filter assembly is manually rotated for installation of the filter assembly in a filtration system such that mating screw threads defined by the filter assembly and a filter head are brought into mutual engagement. Rotation of the filter assembly relative to the filter head during installation opens a fluid flow pathway leading through the filter assembly. In particular, rotation of the drive gear causes rotation of a driven gear in the filter head. The driven gear is operatively coupled to a valve in the fluid flow pathway, which opens upon rotation of the driven gear.

In some embodiments, the current technology relates to a filter assembly. Filter media is arranged about a central opening having a central axis. The filter media has a first media end and a second media end. A first endcap is coupled to the first media end of the filter media. The first endcap defines the central opening and a drive gear about the central opening. A filter housing is coupled to the first endcap and has a first housing end and a second housing end. The first housing end defines a housing opening. The second housing end surrounds the second media end. A screw thread is coupled to the filter housing and the first endcap, where the screw thread is disposed about the central opening and is configured to engage a filter head.

In some such embodiments, the drive gear is selected from the group consisting of: a bevel gear and a worm gear drive. Additionally or alternatively, the first endcap and the screw thread form a single, unitary structure. Additionally or alternatively, the filter housing is fixed to an outer surface of the first endcap towards the first housing end. Additionally or alternatively, the first endcap has a sealing structure disposed about the central opening. Additionally or alternatively, the sealing structure is positioned radially between the drive gear and the screw thread. Additionally or alternatively, the sealing structure defines an axial seal. Additionally or alternatively, the sealing structure defines a radial seal. Additionally or alternatively, the assembly has a housing seal disposed about the filter housing towards the first housing end. Additionally or alternatively, the screw thread is integral to the filter housing. Additionally or alternatively, the first endcap has a housing engagement member having a rotational obstruction feature that is configured to be received by a mating feature of the filter housing. Additionally or alternatively, the rotational obstruction feature has a protrusion extending outward from the first endcap and the mating feature of the filter housing is a slot configured to receive the protrusion.

Some embodiments relate to a filter element. Filter media is arranged about a central opening having a central axis. The filter media has a first media end and a second media end. A first endcap is coupled to the first media end of the filter media. The first endcap defines the central opening and a drive gear about the central opening. The first endcap has a housing engagement member that has a rotational obstruction feature.

In some such embodiments, the rotational obstruction feature is configured to engage a mating feature on a filter housing. Additionally or alternatively, the rotational obstruction feature has a protrusion extending outward from the first endcap. Additionally or alternatively, the rotational obstruction feature has a plurality of protrusions extending radially outward from the first endcap. Additionally or alternatively, the rotational obstruction feature has a pocket arrangement configured to receive a protrusion feature on a filter housing. Additionally or alternatively, the drive gear is selected from the group consisting of: a bevel gear, and a worm gear drive. Additionally or alternatively, the first endcap further has a sealing structure disposed about the central opening. Additionally or alternatively, the sealing structure defines an axial seal. Additionally or alternatively, the sealing structure defines a radial seal.

Some embodiments relate to a filter system. A filter head defines a filter assembly opening having a first screw thread about the filter assembly opening and a fluid flow pathway selectively extending to the filter assembly opening. The filter head has a valve disposed in the fluid flow pathway, where the valve has an open position and a closed position. The system has a filter assembly having filter media arranged about a central opening having a central axis. The filter media defines a first end and a second end. A first endcap is coupled to the first end of the filter media. A mating screw thread is about the first endcap, where the mating screw thread is configured to engage the first screw thread of the filter head upon rotation of the filter assembly relative to the filter head. A mating gear arrangement has a first portion and a second portion, where the first portion is a component of the filter head and the second portion is a component of the filter assembly. The mating gear arrangement is operatively coupled to the valve to translate the valve from the open position to the closed position.

In some such embodiments, the system has a sealing structure configured to form a seal between the filter head and the first endcap about the central opening. Additionally or alternatively, the sealing structure is positioned radially inward from the mating screw thread. Additionally or alternatively, the sealing structure defines an axial seal. Additionally or alternatively, the sealing structure defines a radial seal. Additionally or alternatively, the first portion of the mating gear arrangement has a ratchet gear. Additionally or alternatively, the first portion of the mating gear arrangement has one in the group consisting of: a pinion gear and a worm gear. Additionally or alternatively, the valve has a ball valve. Additionally or alternatively, the first portion of the mating gear arrangement defines a rotational axis that is perpendicular to the central axis. Additionally or alternatively, the first portion of the mating gear arrangement defines a rotational axis that is parallel to the central axis. Additionally or alternatively, a filter housing is fixed to the first endcap, where the filter housing and the filter head encase the filter media. Additionally or alternatively, the system has a housing seal disposed about the filter housing, where the housing seal is configured to be positioned between the filter housing and the filter head.

Some embodiments relate to a method. A filter assembly having a first screw thread is rotated relative to a mating screw thread of a filter head. Rotating the filter assembly rotates a drive gear, and the drive gear is integral with a first endcap of the filter assembly about a central axis. The first endcap of the filter assembly is axially translated into the filter head resulting from rotating the filter assembly. Axially translating the first endcap into the filter head positions the drive gear into operational engagement with a driven gear of the filter head. A valve in the filter head is opened by rotating the driven gear resulting from rotating the drive gear.

In some such embodiments, rotating the valve about a rotational axis opens the valve. Additionally or alternatively, the rotational axis is perpendicular to the central axis. Additionally or alternatively, the rotational axis is parallel to the central axis. Additionally or alternatively, the valve is a ball valve. Additionally or alternatively, the drive gear is a bevel gear. Additionally or alternatively, the drive gear is a worm gear drive.

It is noted that not all the specific features described herein need to be incorporated in a arrangement for the arrangement to have some selected advantage according to the present disclosure.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

A. Valve Arrangement an Application for Use, in General

Figure 1:
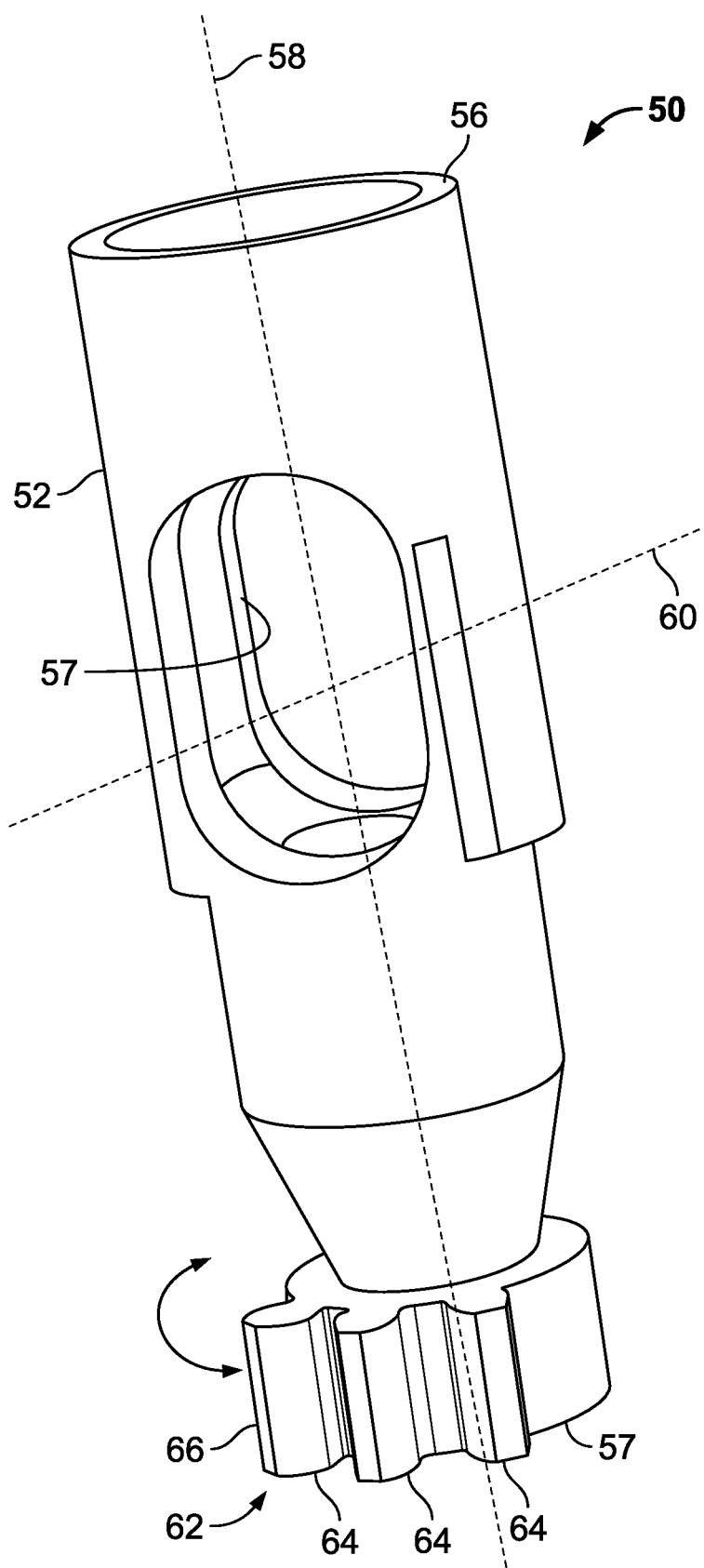
FIG. 1 is a perspective view of a valve arrangement, constructed in accordance with principles of this disclosure.

FIG. 1 illustrates an embodiment of a valve arrangement 50 in accordance with principles of this disclosure. The valve arrangement 50 includes a valve shaft 52. A fluid flow bore 54 passes through the shaft 52. In particular, the shaft 50 has opposite first and second ends 56, 57 with a longitudinal axis 58 passing through the first and second ends 56, 57. The fluid flow bore 54 has a central axis 60 that is perpendicular to the longitudinal axis 58 of the shaft 52.

The valve arrangement 50 further includes projections, which can be gear teeth 62. The valve gear teeth 62 project from the valve shaft 52 and are constructed and arranged to receive a force to rotate the valve shaft 52 about the longitudinal axis 58.

In the embodiment shown, the valve gear teeth 62 project from the second end 57 of the shaft 52. As shown, the valve gear teeth 62 project radially from the second end 57 of the shaft 52.

While many embodiments are possible, in general, the gear teeth 62 will include at least two individual teeth 64 circumferentially spaced from each other. In many cases, there will be at least three teeth 64 circumferentially spaced from each other. There can be, for example, anywhere from 2-10 teeth 64 circumferentially spaced from each other.

The shaft 52 can be generally cylindrical with an outer circumference at the second end 57. The gear teeth 62, in this embodiment, do not circumscribe the entire circumference of the shaft 52. Rather, they extend along a limited arc of the circumference, for example, along no more than a 180° arc; in some cases, no more than 150°, no more than 120°, and sometimes no more than a 90° arc.

The gear teeth 62 can be many different geometric shapes. In the example shown, the gear teeth 62 are spur valve gear teeth 66.

The fluid flow bore 54 can have many different shapes. In particular, the shape can be sized to help optimize the fluid flow therethrough, in the system of use. In the example shown, the bore 54 has a non-circular perimeter shape. The shape can be oval, or racetrack shaped.

Figure 2:
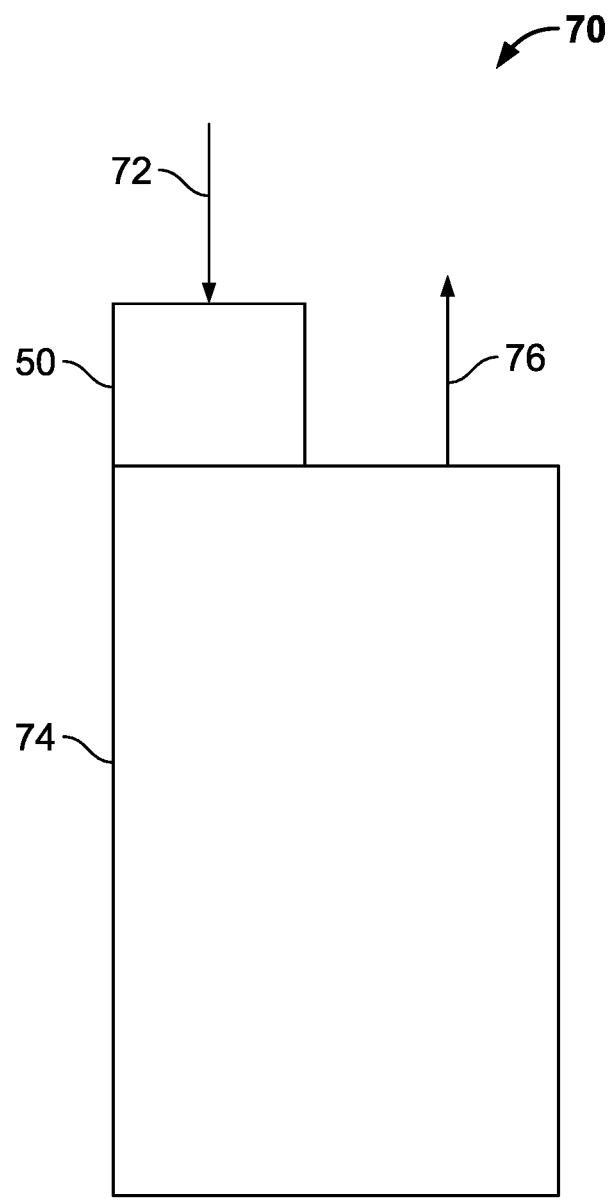
FIG. 2 is a schematic view of a system using the valve arrangement of FIG. 1.

Attention is directed to FIG. 2, which shows a schematic illustration of a system 70 using the valve arrangement 50. In the system 70, an incoming liquid flow path is shown at 72. The incoming liquid flow path 72 flows into the valve arrangement 50, which controls a volume of flow therethrough. The flow allowed to flow through the valve arrangement 50 flows into system component 74. The system component 74 processes, in some manner, the fluid flowing into it and then the processed fluid flows out of the component 74 through an outlet path or conduit 76.

The system 70 can be many different types of applications. In one example, the system 70 can be a filter assembly. The component 74 can be a filter cartridge that operates to filter the liquid flowing into it through the inlet path 72, with the flow volume controlled by the valve arrangement 50. The filtered liquid then flows out of the filter arrangement through the outlet conduit 76.

In general, the gear valve arrangement 50 operates by having a force supplied to the gear teeth 62, which will rotate the valve arrangement 50 about the longitudinal axis 58. When it rotates, it moves the bore 54, which can move it either away from a fluid flow conduit, such that the conduit is completely or partially blocked; or the bore is moved to be aligned with the fluid flow conduit, such that the conduit is unblocked, and fluid is allowed to flow freely therethrough.

Figure 7:
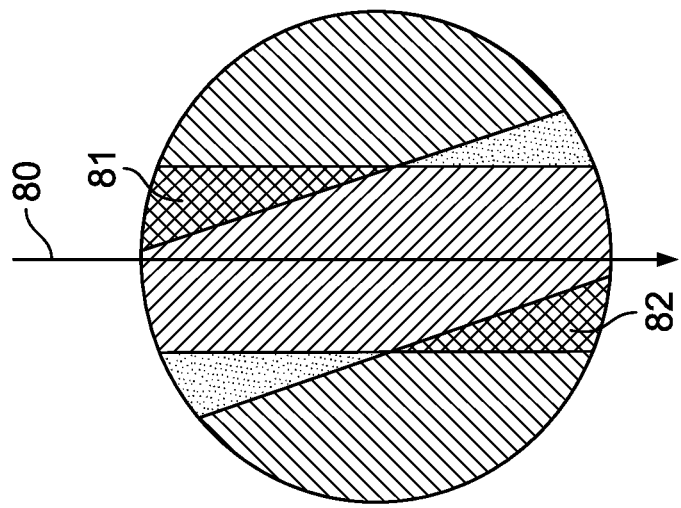
FIG. 7 is a top down view of a partially closed valve in the filter assembly of FIG. 3.
Figure 6:
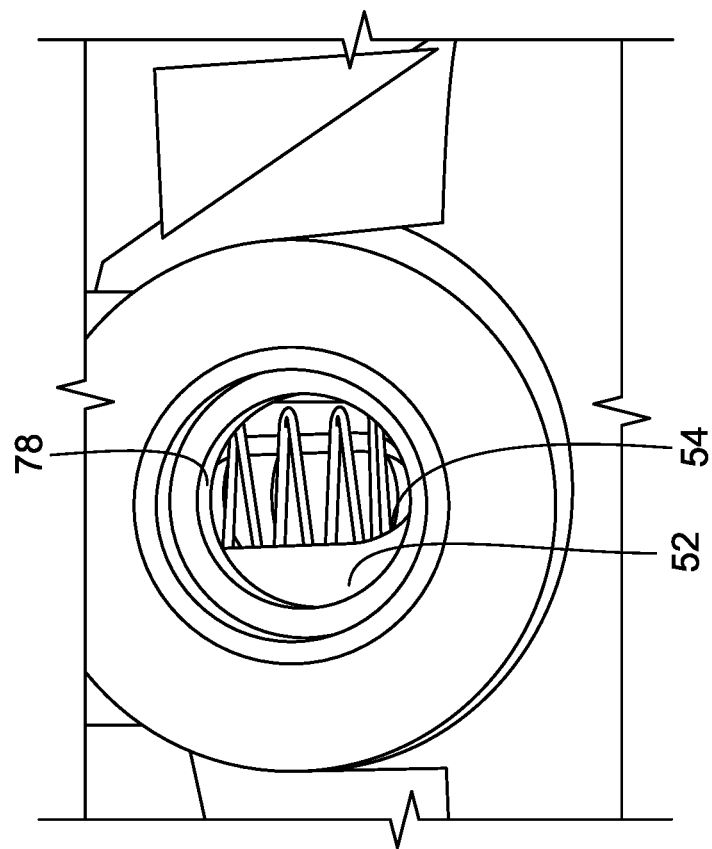
FIG. 6 is a side view of a partially closed valve in the filter assembly of FIG. 3.

An example is shown in FIGS. 6 and 7. FIG. 6 is a side view of a partially closed valve arrangement 50. The shaft at 52 can be seen, while the bore 54 is shown to be only partially in alignment with an open flow path 78. FIG. 7 is a top down view of FIG. 6, showing the partially closed valve arrangement 50. The flow path is shown at 80, and it can be seen how the flow path is partially blocked at 81, 82. If the bore 54 were in alignment with the open flow path 78, the blocks at 81, 82 would not be present. In this example, the blockages at 81, 82 are the shaft 52 of the valve arrangement 50.

B. Example Filter Arrangements

Figure 3:
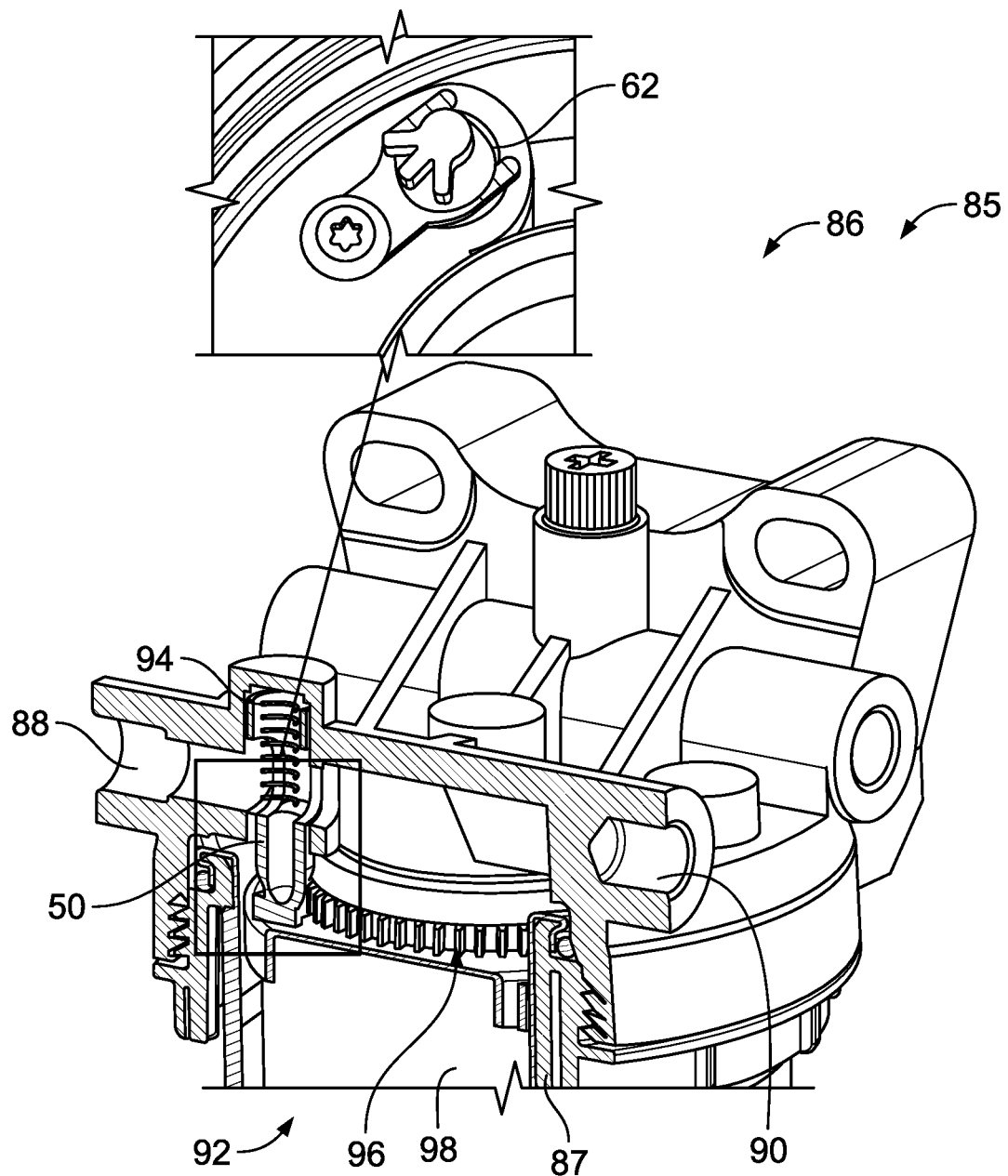
FIG. 3 is a perspective view showing a portion of a liquid filter assembly including a liquid filter head arrangement incorporating the valve arrangement of FIG. 1.

FIG. 3 shows a liquid filter assembly 85 including a filter head arrangement 86 and a filter cartridge 92 removably connected to the filter head arrangement 86.

The filter head arrangement 86 has a fluid inlet 88 and a fluid outlet 90.

Typically, the filter head arrangement 86 is attached to equipment, such as engines utilizing oil or hydraulic fluid. The fluid to be filtered flows from some upstream reservoir, and into the inlet conduit 88. It then flows from the filter head arrangement 86 into filter cartridge 92 (only a portion being shown in FIG. 3), where it is filtered, and then flows back into the filter head arrangement 86 to exit the filter head arrangement 86 through the outlet conduit 90. The filtered liquid then goes to downstream components.

In accordance with principles of this disclosure, the filter head arrangement 86 uses gear valve arrangement 50 to control the volume of fluid flow form the inlet 88 to the filter cartridge 92. For example, if there is no filter cartridge 92 installed at all, the valve arrangement 50 can completely block the flow of fluid from the inlet 88.

The valve gear arrangement 50 is used with the filter head arrangement 86 such that the gear teeth 62 are constructed and arranged to receive a force to rotate the valve shaft 52 between an open position and a closed position. In the open positon, the fluid flow bore 54 is aligned with the inlet 88, while in the closed position, fluid flow is blocked at the inlet 88 to stop or prevent flow from reaching the cartridge 92 or a housing containing or what should contain the cartridge.

In FIG. 3, it can be seen how the valve arrangement 50 further includes a spring 94, such as a torsion spring 94, to hold the valve shaft 52 in the closed position when no force is applied to the gear teeth 62.

Figure 4:
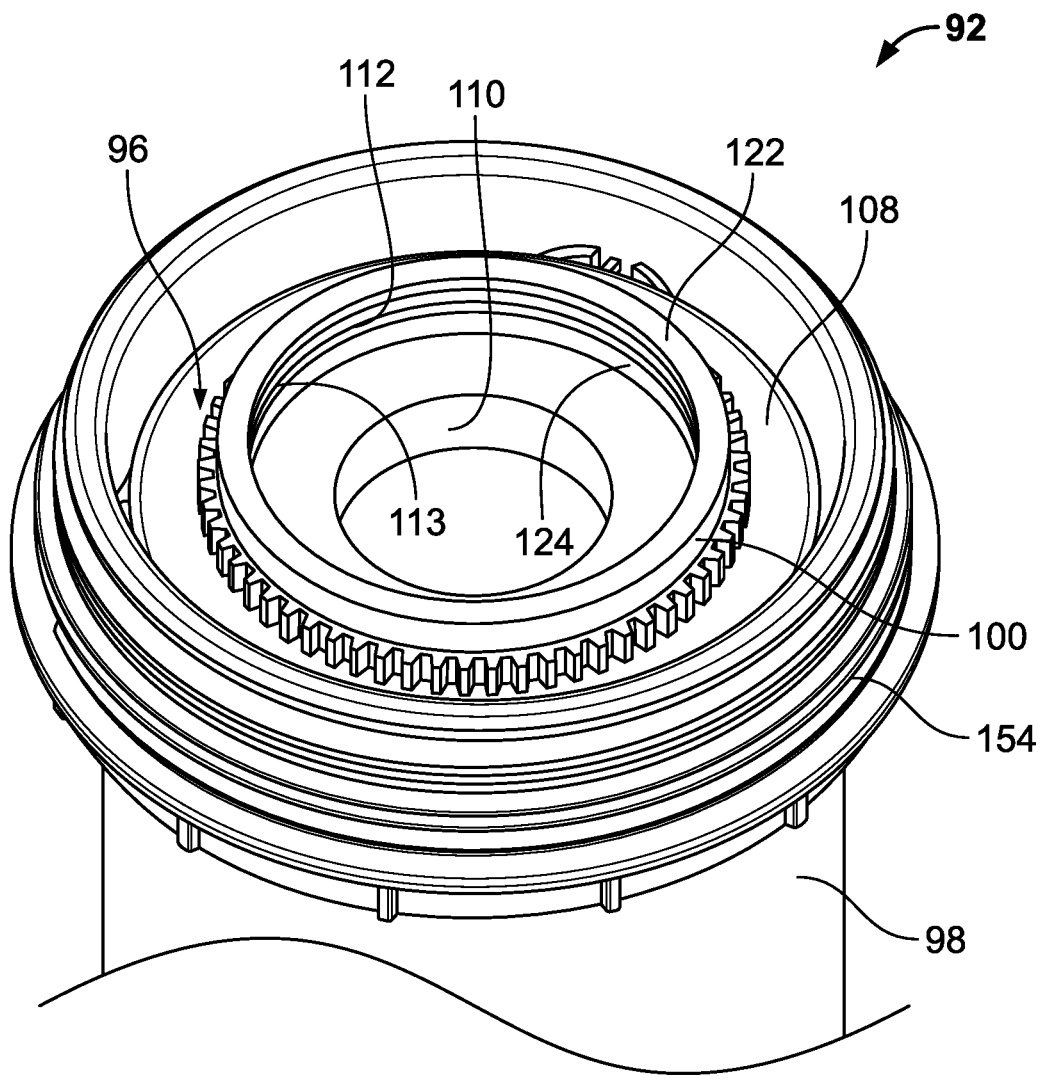
FIG. 4 is a perspective view of a filter cartridge used in the filter assembly of FIG. 3.
Figure 5:
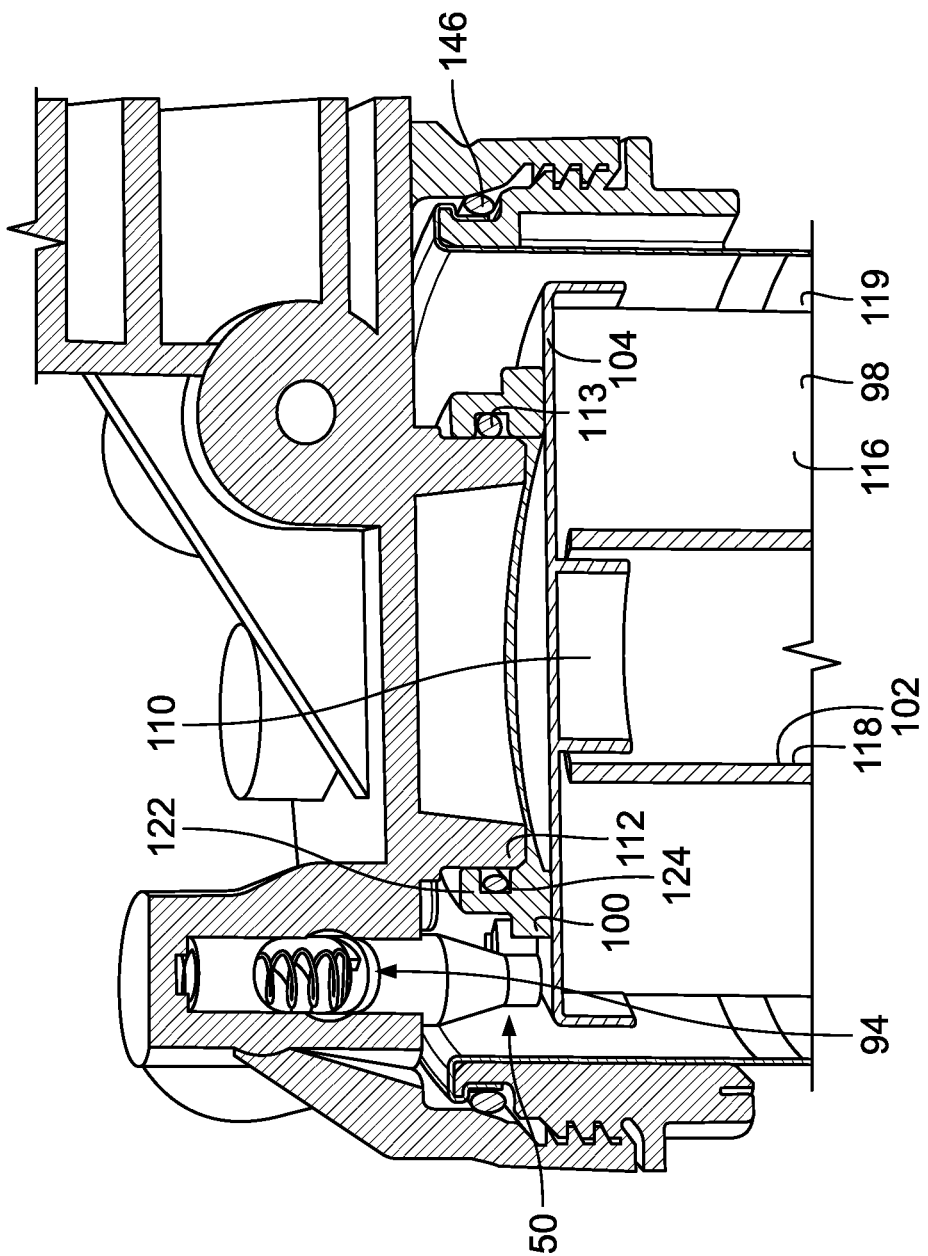
FIG. 5 is a perspective view of a portion of the filter assembly of FIG. 3.

In reference now to FIG. 4, a top perspective view of one embodiment of a filter cartridge 92 is shown. The filter cartridge 92 includes projections 96, such as cartridge gear teeth 96. The cartridge gear teeth 96 can engage with the valve gear teeth 62 and apply a force against the valve gear teeth 62 to move the valve shaft 52 between the open and closed positions.

The filter cartridge 92, in general and in reference to FIGS. 4, 5, and 17-23, includes a filter media construction 98 and a set of the cartridge gear teeth 96 attached to the filter media construction 98.

The cartridge gear teeth 96 can be part of a ring member 100 and are circumferentially spaced from each other about the ring member 100. The cartridge gear teeth 96 are shown extending radially outwardly about the ring member 100. It can be appreciated that the cartridge gear teeth 96 project from a radial wall of the ring member 100, such that the radial wall together with the teeth varies in radial thickness about the ring member 100.

The filter media construction 98 forms a tube shape surrounding an open interior volume 102 with first and second opposite ends 104, 105.

There is a first end cap 108 at the first end 104 secured to the filter media construction 98. The first end cap 108 has an opening 110 in communication with the open interior volume 102.

The filter media construction 98 can be many different types of filter media. In many examples, the filter media construction 98 can be pleated media, including pleated cellulous media.

In the example embodiment shown the ring member 100 is part of the first end cap 108 and surrounds the opening 110.

Figure 21:
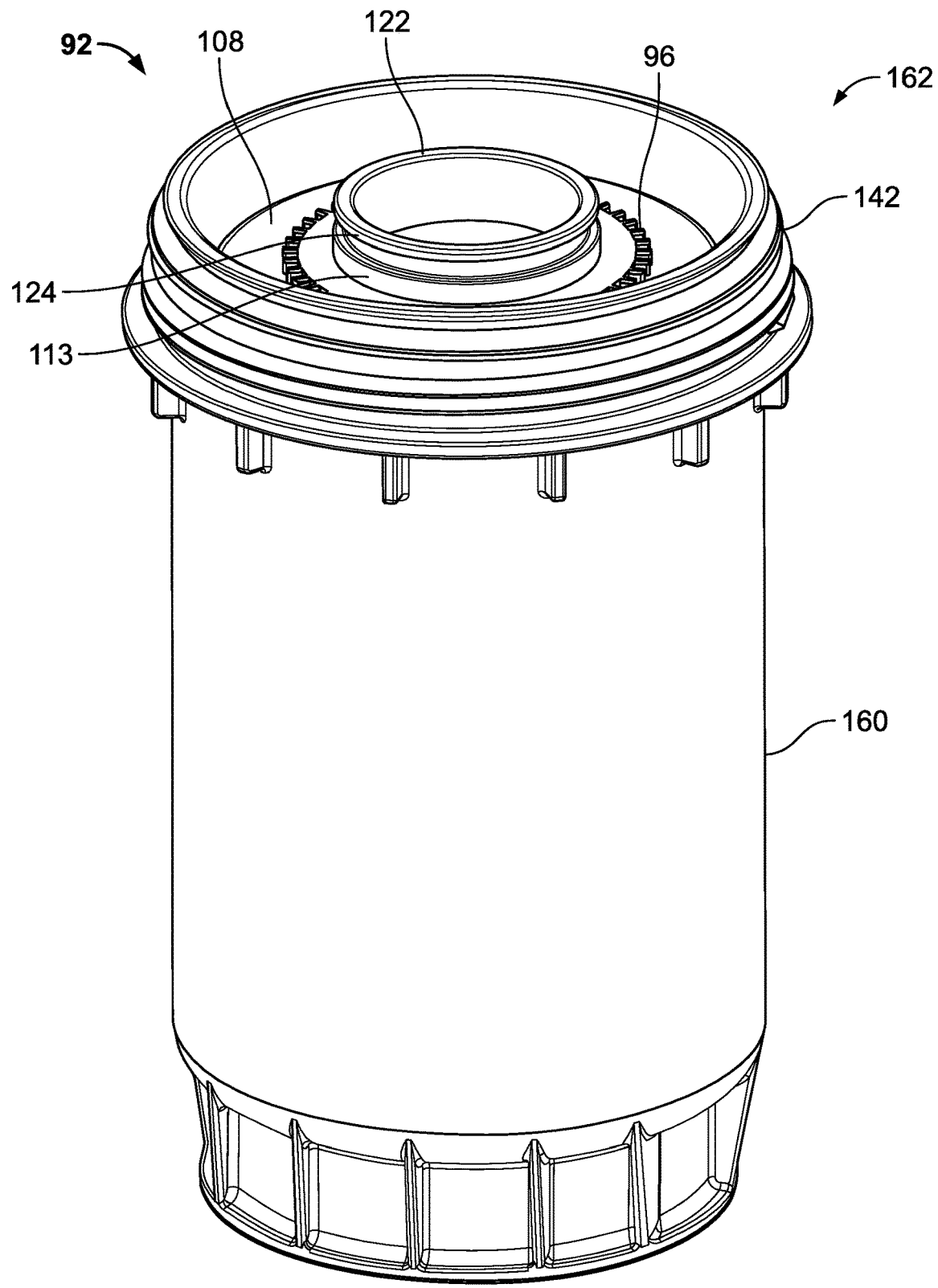
FIG. 21 is a perspective view of a bowl-cartridge assembly, according to another embodiment, usable with the assemblies as previously described.
Figure 22:
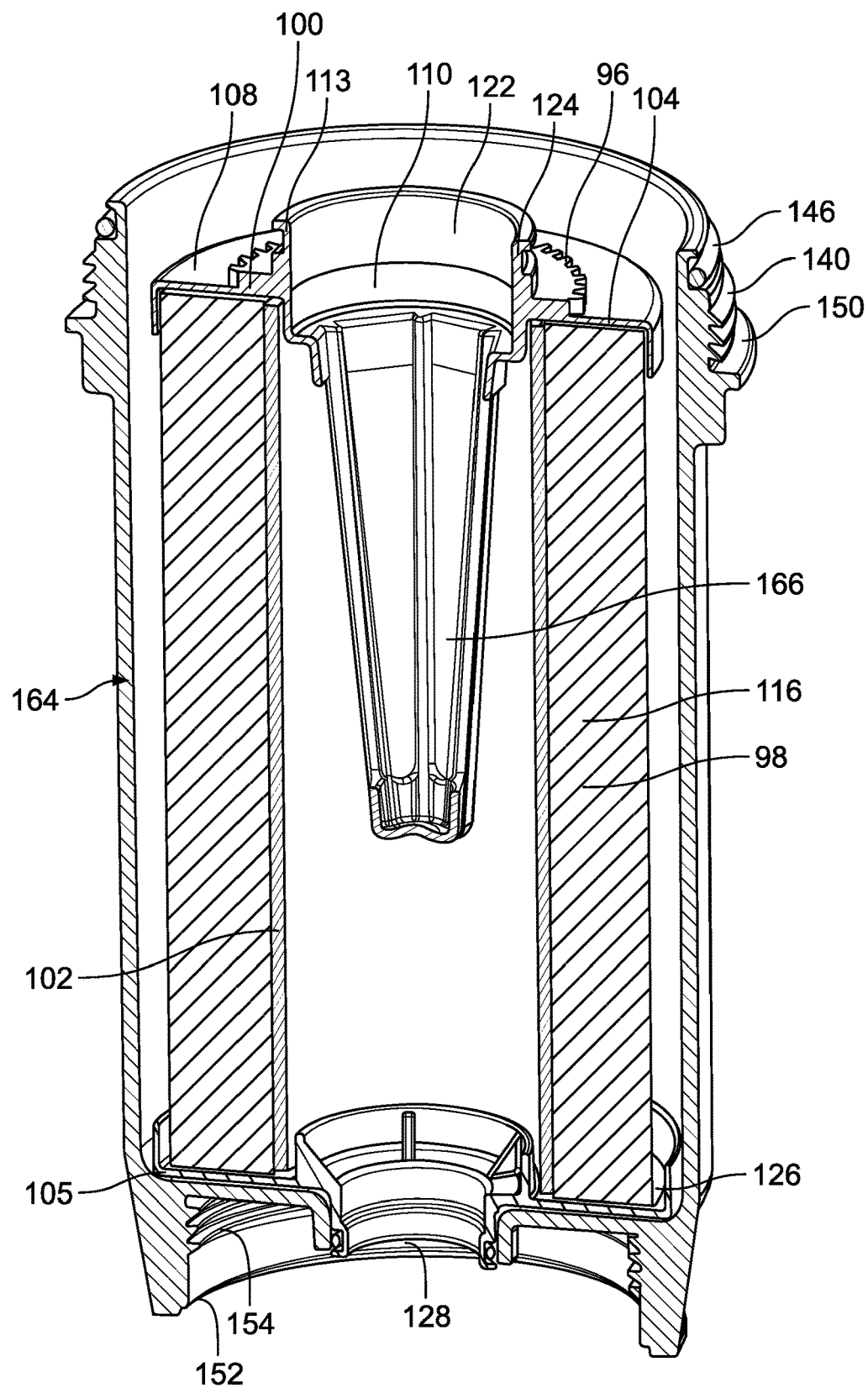
FIG. 22 is a cross-sectional, perspective view of the assembly of FIG. 21.
Figure 23:
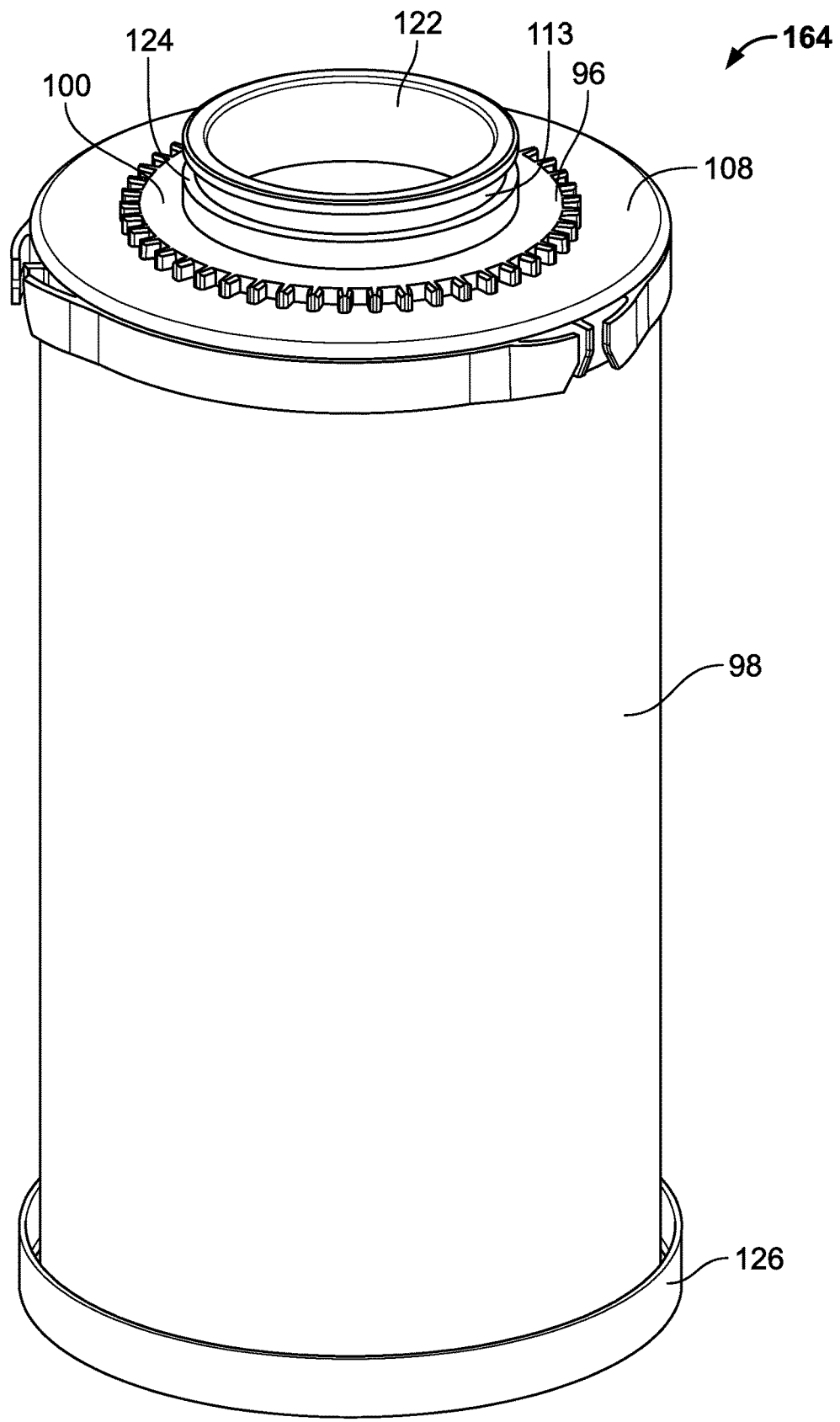
FIG. 23 is a perspective view of the filter cartridge usable with the bowl-cartridge assembly of FIGS. 21 and 22.

The filter cartridge 92 can further include a seal member 112. In many examples, the seal member 112 is secured to the first end cap 108 as a radially directed seal member 113. The radially directed seal member 113 can be either inwardly directed (FIGS. 4, 5, & 17-20) or outwardly directed (FIGS. 21-23)

The filter media construction 98 can be pleated media 116 with inner pleat tips 118 and outer pleat tips 119. The inner pleat tips 118 help to define the interior volume 102, while the outer pleat tips 119 help to define a perimeter of the filter media construction 98.

In many embodiments, the seal member 112 is positioned to be spaced radially from both the inner pleat tips 118 and outer pleat tips 119. The ring member 100 having the gear teeth 96 is radially spaced between the inner pleat tips 118 and outer pleat tips 119. Typically, the cartridge gear teeth 96 are spaced radially inwardly from the outer pleat tips 119.

The first end cap 108 includes a seal member holder 122. The holder 122 can extend axially from the first end cap 108 in a direction away from the media 116. In many embodiments, the holder 122 is radially between the inner pleat tips 118 and outer pleat tips 119. The holder 122 can have a radial groove 124 holding the seal member 112. While many different embodiments are possible, in preferred embodiments, the ring member 100 is an integral part of the seal member holder 122. In embodiments in which the radial seal member 113 is inwardly directed, the groove 124 is along the interior of the holder 122, while in embodiments in which the radial seal member 113 is outwardly directed, the groove 124 is along the exterior of the holder 122.

In certain of the examples shown (i.e., FIGS. 4, 5, 17-20), the seal member 113 extends from the holder 122 radially inwardly, while the teeth 96 extend radially outwardly. Thus, the teeth 96 extend in a radial opposite direction as the seal member 112, in some example embodiments. In other examples (FIGS. 21-23), the seal member 113 extends from the holder 122 radially outwardly, while the teeth 96 extend radially outwardly, such that they extend in the same radial direction.

The cartridge gear teeth 96 are sized and shaped to engage the gear teeth 62 of the valve arrangement 50. In many examples, the cartridge gear teeth 96 are spur gear teeth.

The filter cartridge 92 can further include a second end cap 126. The second end cap 126 can often have one or more openings 128, but may also be a closed end cap.

Figure 17:
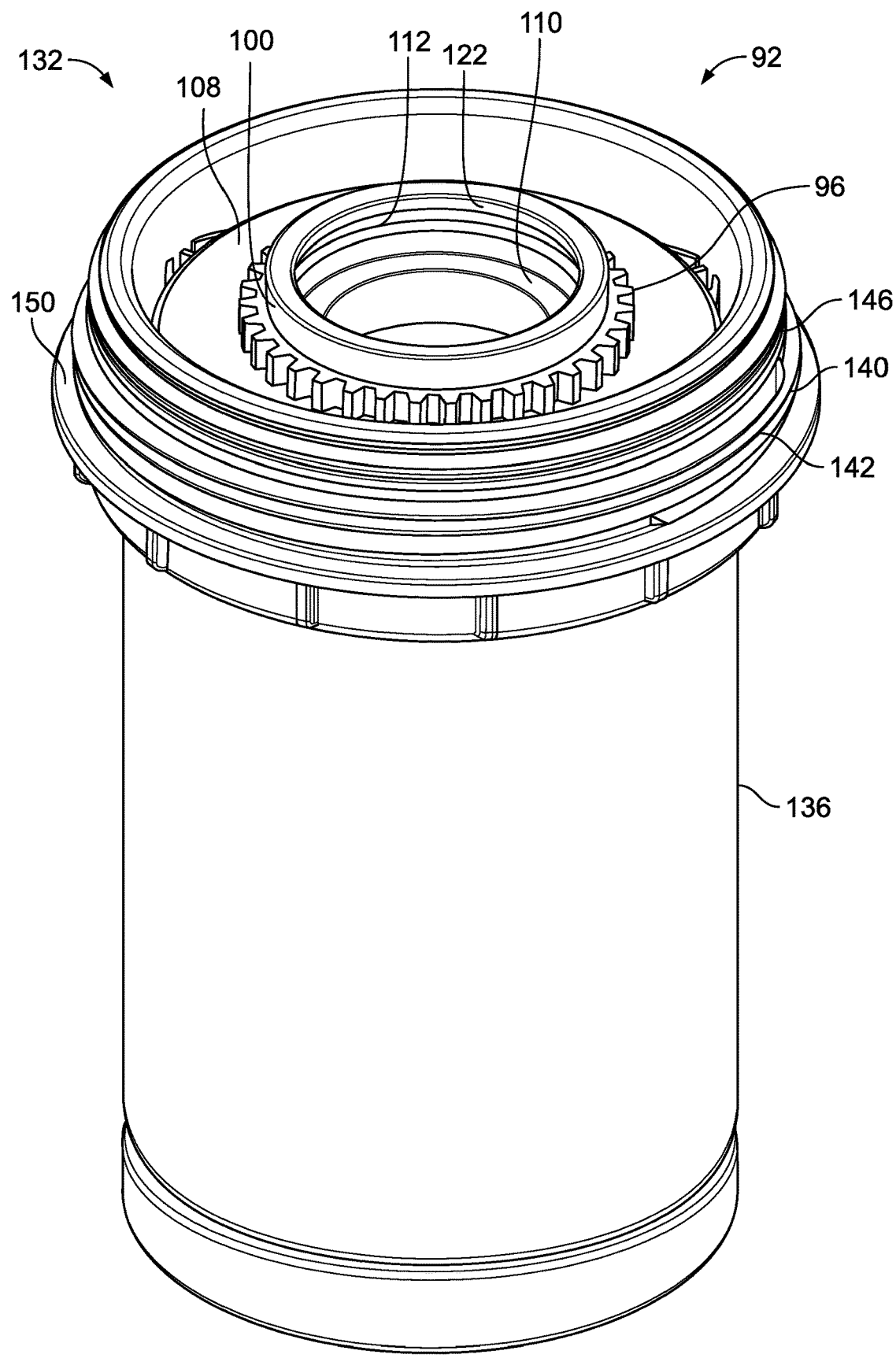
FIG. 17 is a perspective view of a spin-on filter assembly, usable in the assemblies as previously described.
Figure 18:
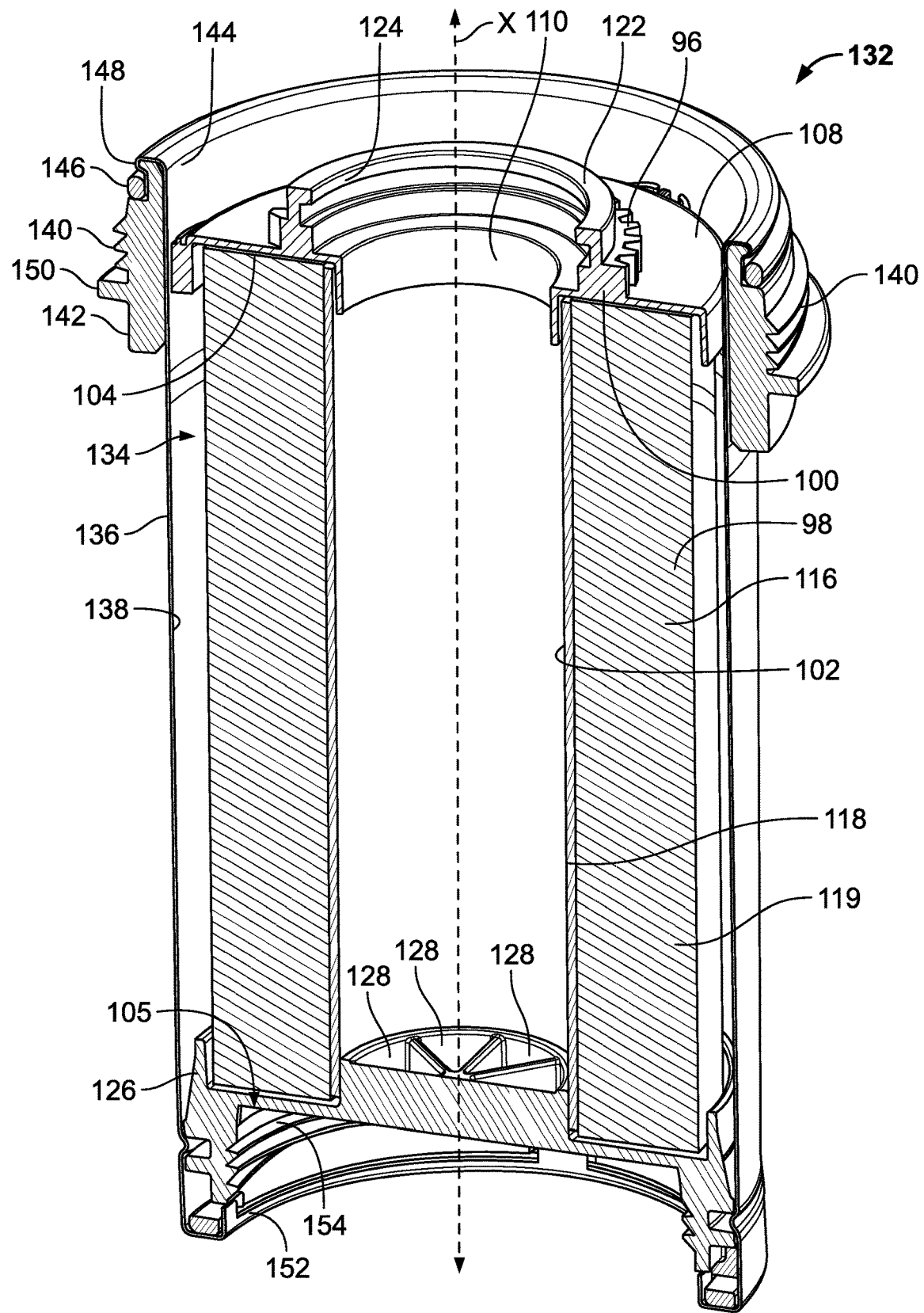
FIG. 18 is a perspective, cross-sectional view of the spin-on filter assembly of FIG. 17.

In reference now to FIGS. 17-23, specific examples of filter cartridges 92 are shown herein. FIGS. 17 and 18 include a filter cartridge 92 in the form of a spin-on cartridge 132. A spin-on cartridge 132 includes a filter element 134 (FIG. 18) non-removably secured within an outer housing 136. The housing 136 is removably attachable to the filter head arrangement 86. A central longitudinal axis x is illustrated passing through the cartridge 132. When installed with the filter head 86, the axis 58 of the valve shaft 52 is parallel to the longitudinal axis x, in this non-limiting example embodiment. Other arrangements are possible.

The housing 136 includes an interior 138 that holds the element 134. The housing 136 also includes externally directed threads 140 for connection with threads 87 on the filter head arrangement 86.

In the embodiment shown in FIGS. 17 and 18, the housing 136 has a sleeve 142 at an open mouth 144. The sleeve 142 has the threads 140. The sleeve 142 can be made as described in either U.S. Pat. No. 9,545,587 or 9,555,347, both of which are incorporated herein by reference.

The housing 136 also has an externally directed seal member 146 for forming a seal with the filter head arrangement 86. In the embodiment shown in FIGS. 17 and 18, the seal member 146 is held within a groove 148 in the sleeve 142.

The sleeve 142 can also have a radially directed flange 150 acting as a stop when threaded or screwed into the filter head arrangement 86.

Still in reference to FIGS. 17 and 18, in this embodiment, the housing 136 has an open bottom end 152. The open bottom end 152 can receive a valve arrangement that is threadably attached to the bottom of the element at threads 154. This valve arrangement would allow for the drainage of liquid, such as water, in the case of a fuel/water separator.

Figure 19:
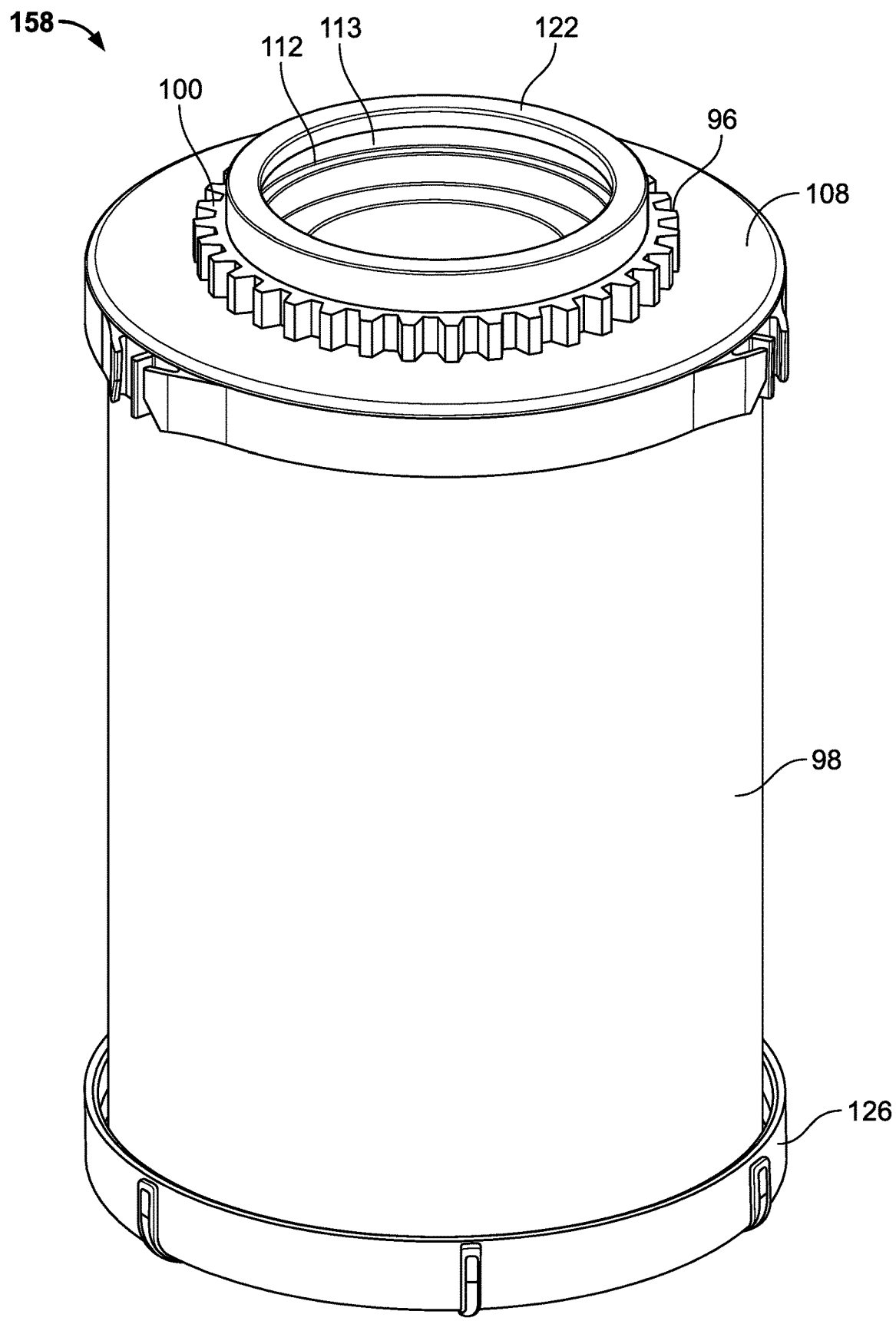
FIG. 19 is a perspective view of a filter cartridge usable in a bowl-cartridge assembly.
Figure 20:
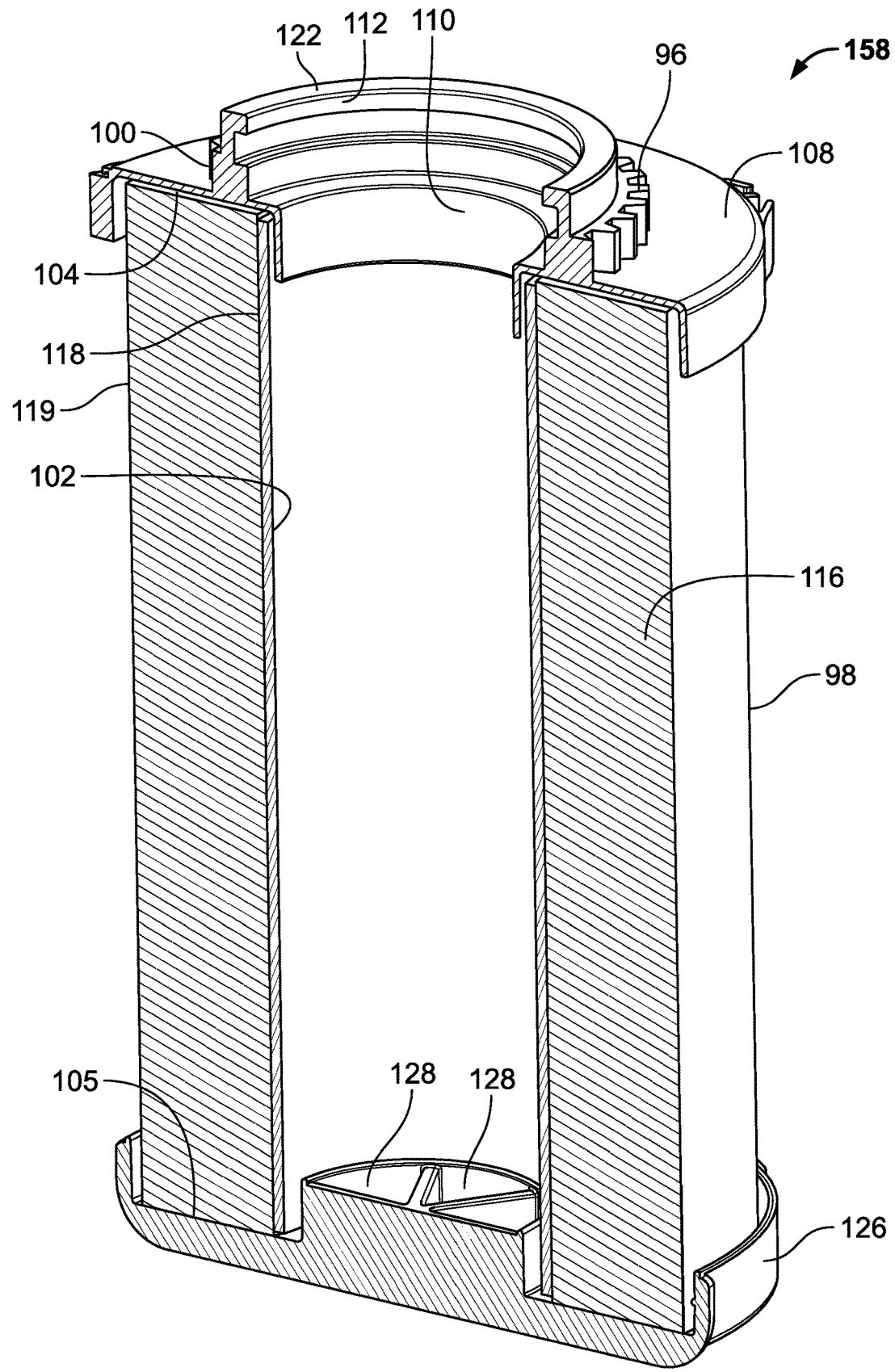
FIG. 20 is a perspective, cross-sectional view of the filter cartridge of FIG. 19.

FIGS. 19 and 20 show a filter cartridge 92 in the form of a filter element used in a bowl-cartridge assembly. In a bowl-cartridge assembly, the filter element 158 is removably secured within an outer housing or bowl 160 (FIG. 21).

FIGS. 21 and 22 show a bowl-cartridge assembly 162. The bowl or housing 160 can receive the example element 158 of FIGS. 19 and 20; alternatively, it can receive a coalescer filter element 164, as shown in FIGS. 22 and 23. In general, when the filter media construction 98 becomes clogged and needs servicing, in the bowl-cartridge assembly 162, the housing 160 is removed from the filter head arrangement 86, and then the interior filter element, such as element 158 or element 164 is removed from the housing 160 and replaced with a new element 158, 164.

In FIG. 22, it can be seen how the coalescer filter element 164 includes an inner coalescer 166 disposed within the filter interior 102. The coalescer 166 will help to separate whatever is being coalesced, such as water from fuel. In this example, the coalescer 166 extends into the filter interior 102 from the opening 110 in the first end cap 108 only partially toward the second end cap 126 in a frusto-conical shape.

Figure 24:
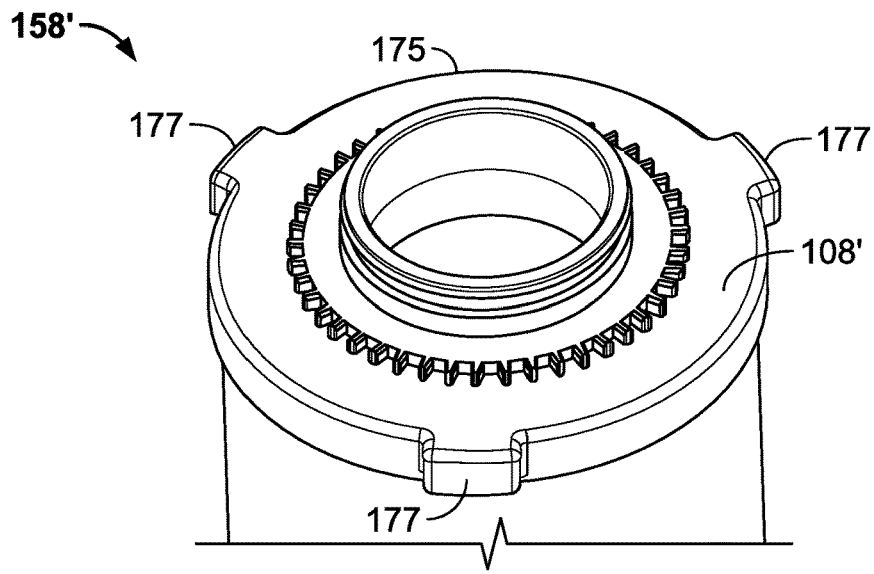
FIG. 24 is a perspective view of a portion of a filter cartridge usable in a bowl-cartridge assembly.
Figure 25:
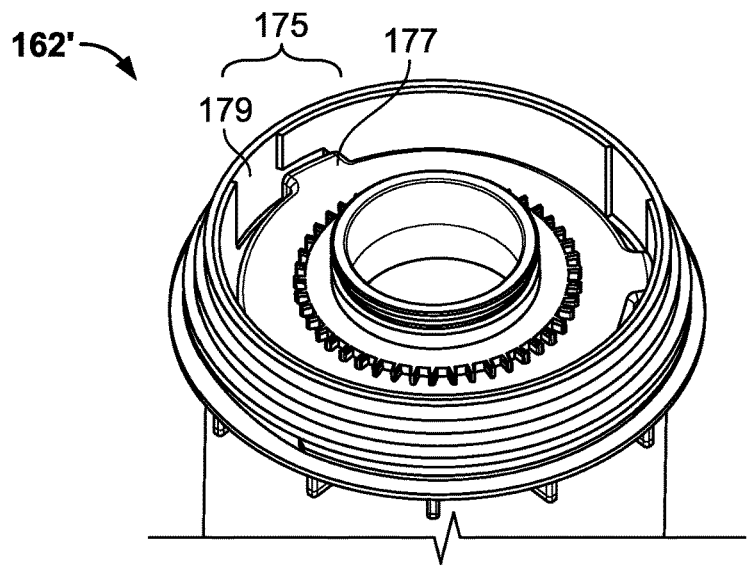
FIG. 25 is a perspective view of a portion of a bowl-cartridge assembly having the cartridge of FIG. 24 installed in a bowl.
Figure 26:
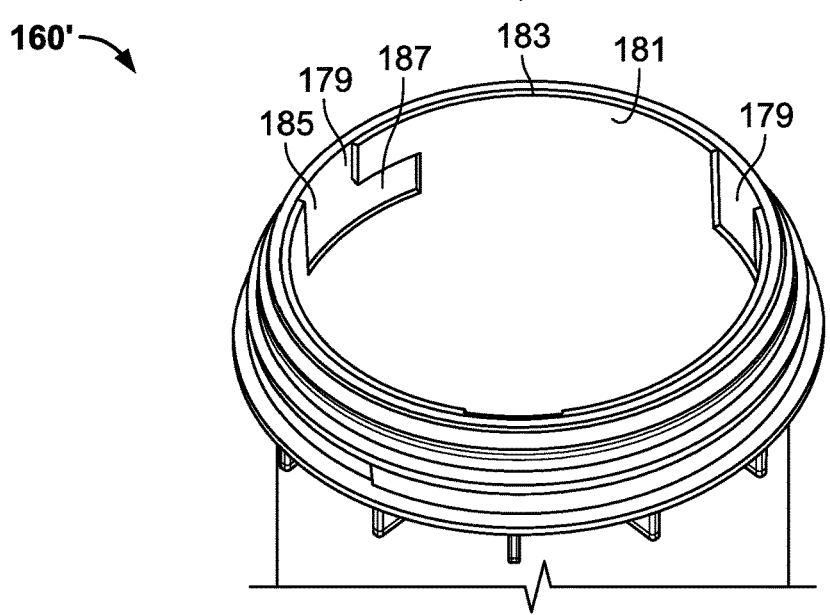
FIG. 26 is a perspective view of a portion of the bowl used in the bowl-cartridge assembly of FIG. 25.

FIGS. 24-26 show a variation on the bowl-cartridge assembly 162 of FIGS. 19-22 at 162'. The filter cartridge 158' and the bowl 160' include an anti-rotation arrangement 175. The anti-rotation arrangement 175 provides that, once the cartridge 158' is operably oriented within the interior of the bowl 160', the cartridge 158' will not rotate with the bowl 160' when the bowl 160' is rotated (threaded) onto the filter head.

While variations are possible for the anti-rotation arrangement 175, in the example shown, the end cap 108' has radially outwardly extending tabs 177 projecting from an outer perimeter edge 175 of the end cap 108'. The bowl 160' has recessed slots 179 along an interior wall 181 of the bowl 160' adjacent the open mouth 183 sized to receive the tabs 177. The recessed slots 179 are bayonet-shaped, such that they are open at 185 at the edge of the mouth 183, and after the tabs 177 drop vertically into them at 185, a rotational motion of the cartridge 158' within the bowl 160' will move the tabs 177 into a portion 187 of the slot 179 that is not open to the edge of the mouth 183, thereby locking the tabs 177 in the slots 179.

C. Analysis of Gear Teeth, Ratios, and Tolerances

A gear ratio is defined as the number of teeth of the driven part (the load) over the number of teeth of the driver (effort). In the example of the filter arrangements herein, the driver or effort are the cartridge gear teeth 96, while the driven or load are the valve arrangement gear teeth 62.

Process tolerances help to determine the geometry of the teeth for the gear teeth 62 and the gear teeth 96. Taller teeth are better for larger process tolerances. In general, the shorter the height of the gear tooth, the smaller the angle of the rotation and the more precise movement of the gear. The more precise of the gear movement, the more controlled is the opening of the valve arrangement 50.

Figure 8:
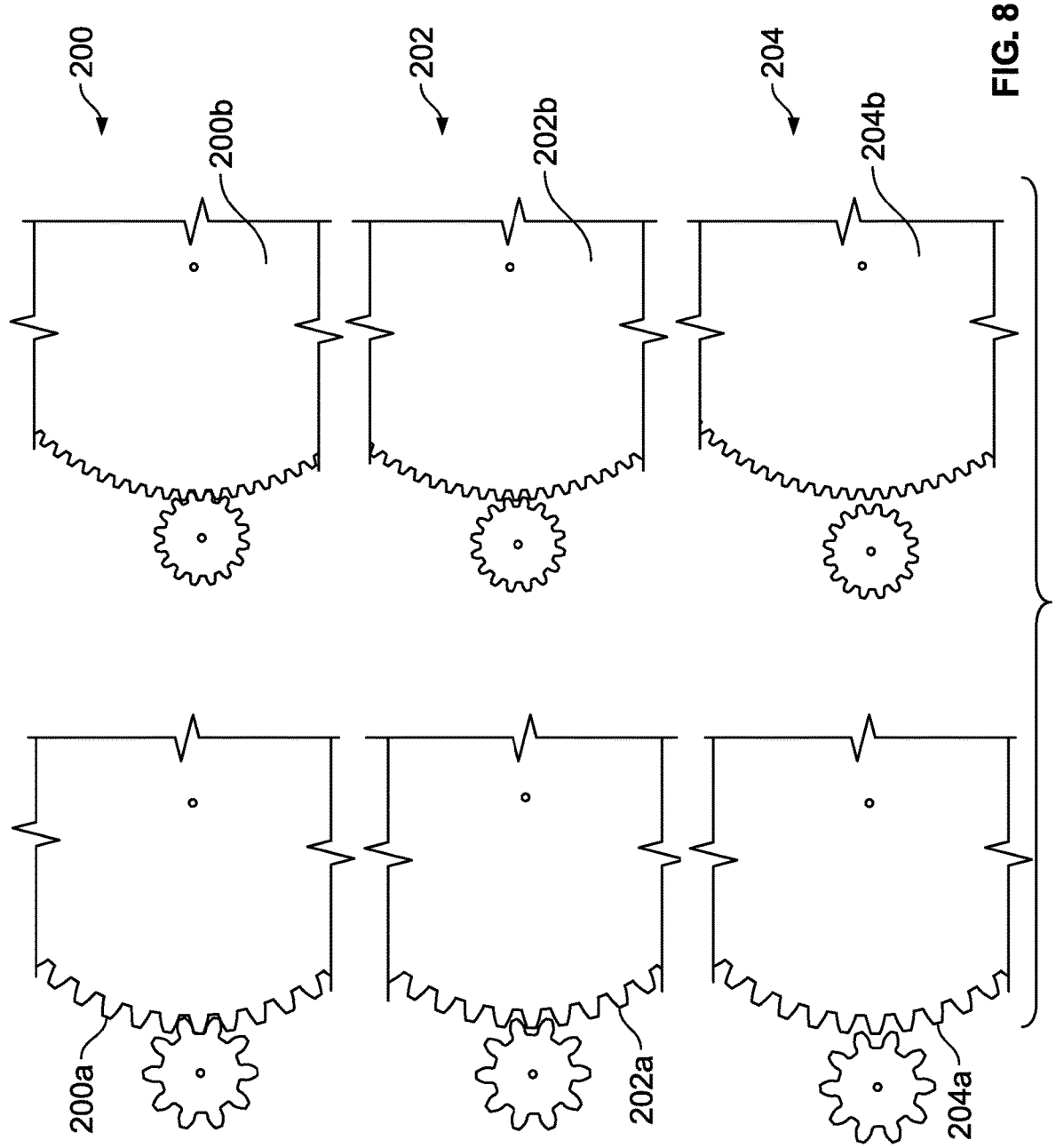
FIG. 8 are schematic illustrations showing processed tolerances for various tooth heights for gears used in concepts herein.

In FIG. 8, at 200 illustrates an ideal condition of gear mesh. 200a and 200b both shown ideal conditions, but 200a has taller teeth than the teeth at 200b.

At 202, the gears are separated by a nominal distance equivalent to the processed tolerance to prevent gear binding. Again, 202a shows the taller teeth, while the 202b shows the shorter teeth.

At 204, the gears are shown at twice the process tolerance. In 204b, the gears do not even engage with each other. At 204a, there is a minimal engagement, but there is no backlash. The gears need to have backlash to work properly.

FIGS. 9-12 illustrate the ratcheting effect of gears. The amount the valve arrangement 50 opens is determined by the tooth height. The taller the tooth height, the less precise the opening of the valve arrangement 50 a small amount of precision could be gained by changing the relative size of the gears so that the gear ratio is smaller. A view looking through the inlet 88 shows the position of the bore 54 of the valve arrangement 50, and a portion of the shaft 52 can be seen.

Figure 9:
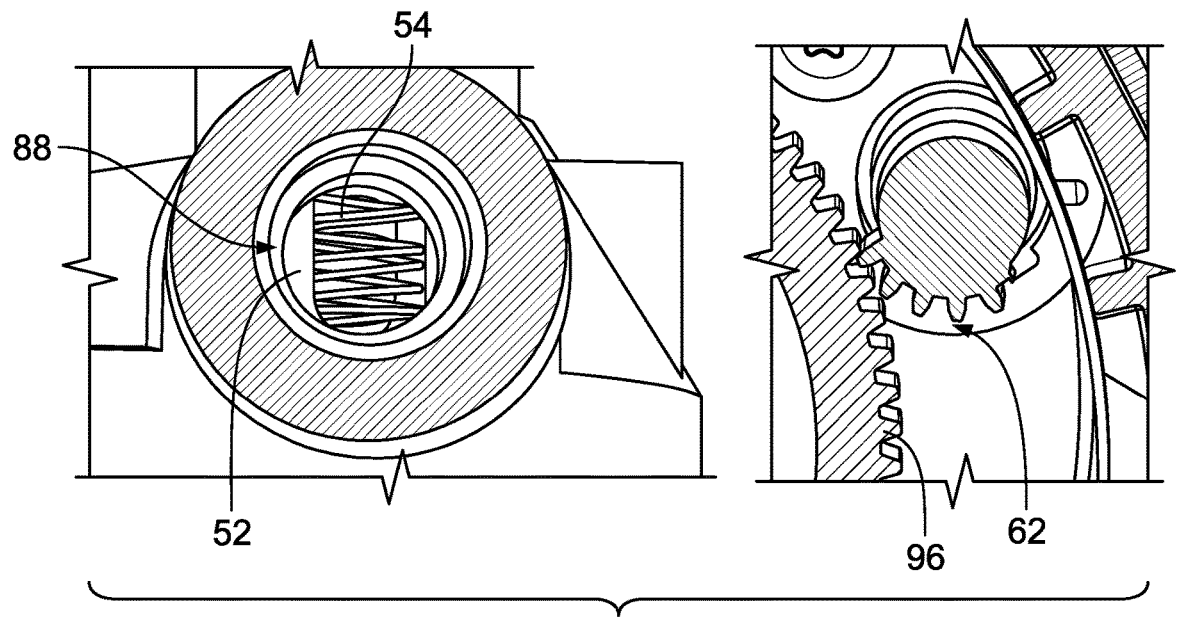
FIG. 9 is a schematic illustration of a valve assembly and filter cartridge portion.
Figure 10:
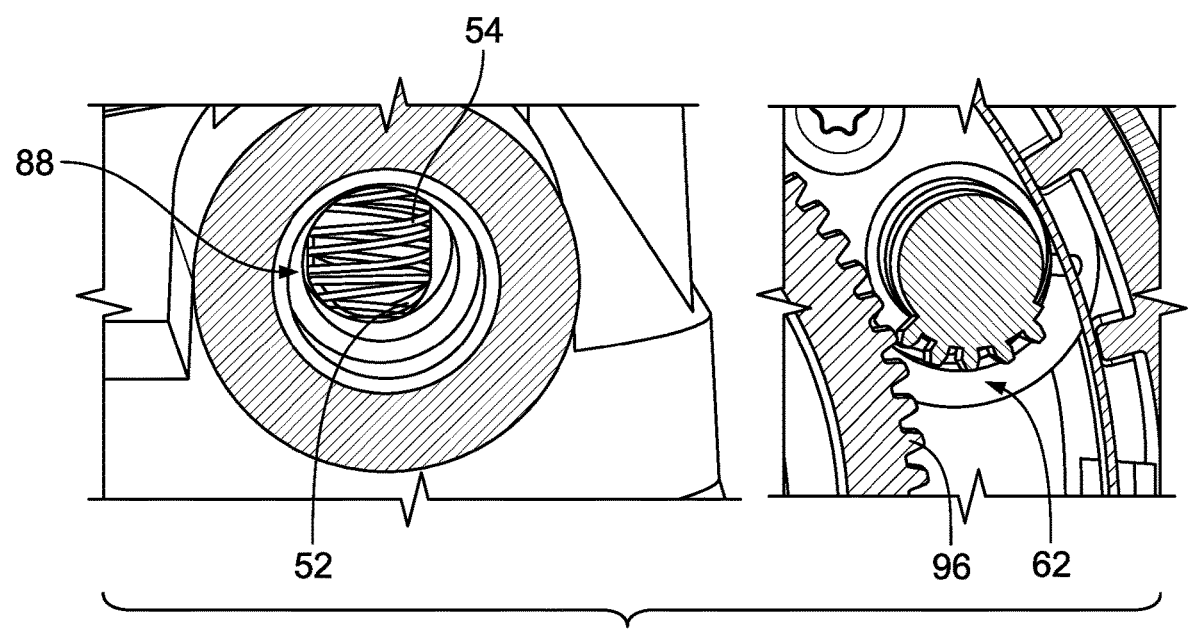
FIG. 10 is a schematic illustration similar to FIG. 9 of a valve assembly and filter cartridge portion, with different sized teeth than FIG. 9.

FIGS. 9 and 10 shown one example, in which the gear tooth height is about $^{16}/_{84}$". It uses a gear ratio 1:5.25. In FIGS. 9 and 10, the one tooth angle of rotation is 4.17° for the cartridge gear teeth 96, and 21.29° for the valve arrangement gear teeth 62.

Figure 11:
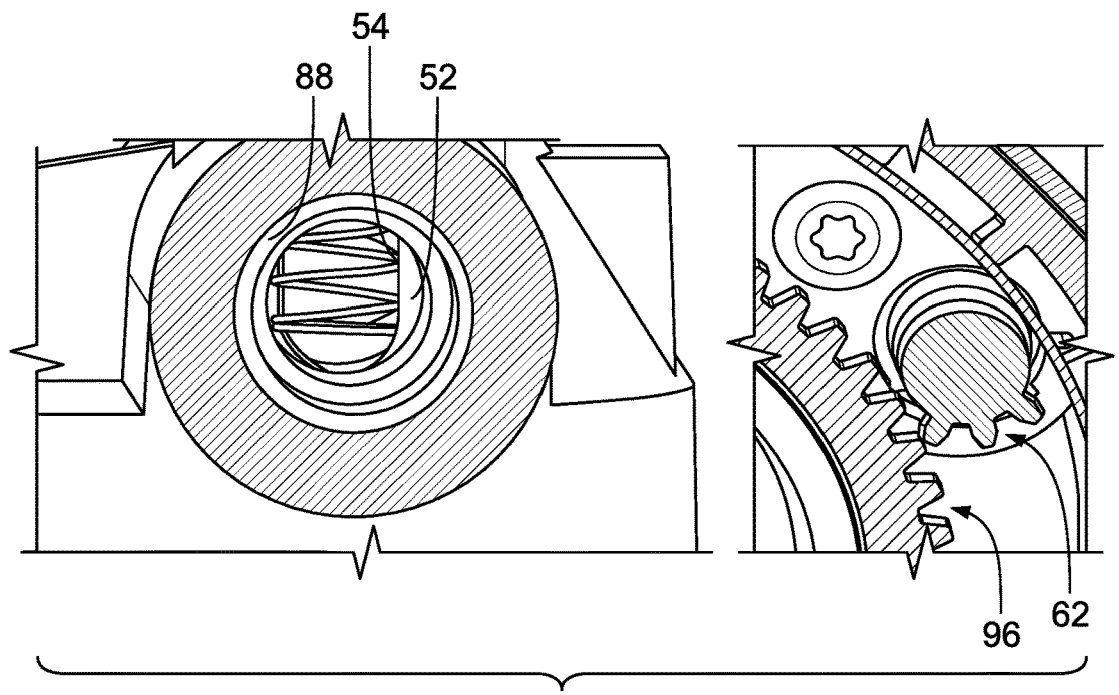
FIG. 11 is a schematic, perspective view of portion of the valve assembly and filter cartridge, according to one aspect.
Figure 12:
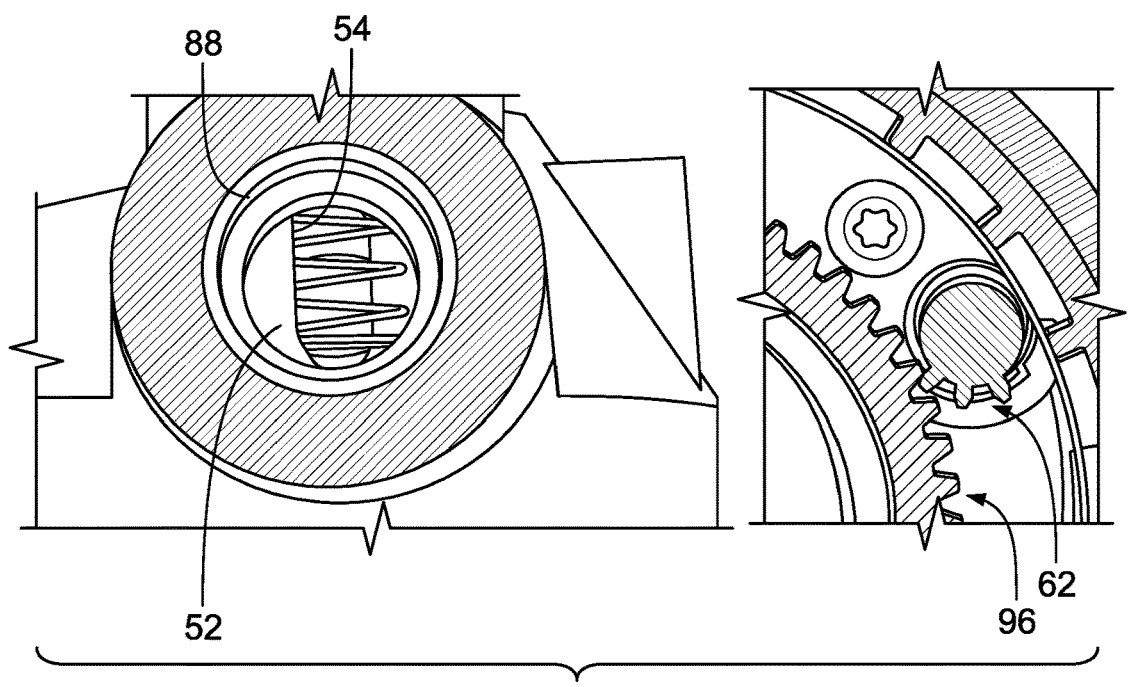
FIG. 12 is a schematic, perspective view of portion of the valve assembly and filter cartridge, according to one aspect.

In FIGS. 11 and 12, a taller tooth height is used than what is shown in FIGS. 9 and 10, with a tooth height of $^{10}/_{46}$". This has a gear ratio of 1:4.6. In FIGS. 11 and 12, the one tooth angle of rotation for the cartridge gear teeth 96 is 7.81°, while the tooth angle of rotation for the valve arrangement gear teeth 62 is 35.93°.

Figure 15:
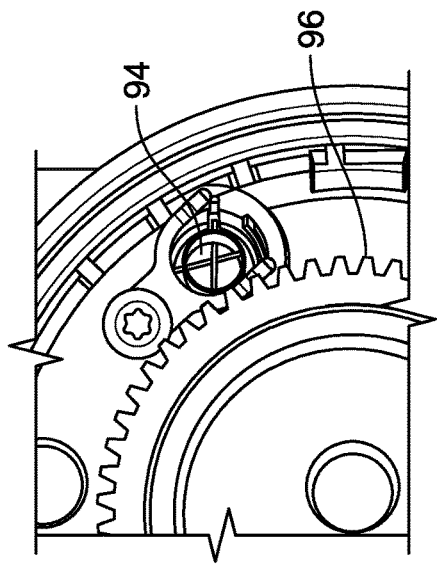
FIG. 15 is a view similar to FIG. 14, and showing a filter cartridge removal position, in which a spring will move back to a neutral positon, when the filter cartridge is completely removed.
Figure 15:
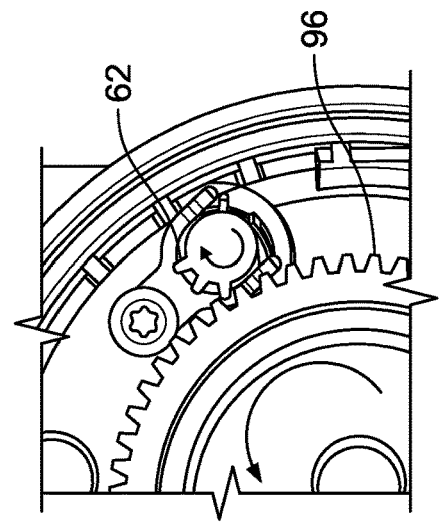
Figure 14:
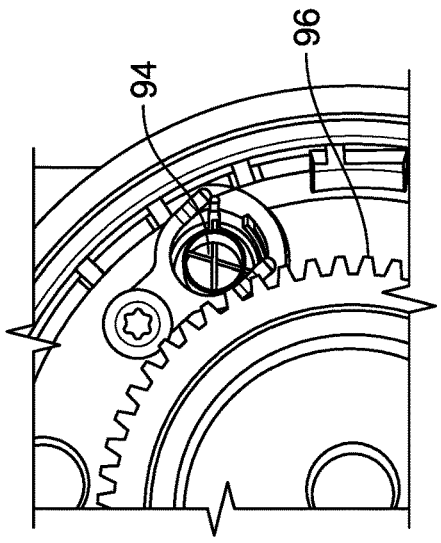
FIG. 14 is a view similar to FIG. 13, with filter cartridge installed and the valve being in an open position.
Figure 14:
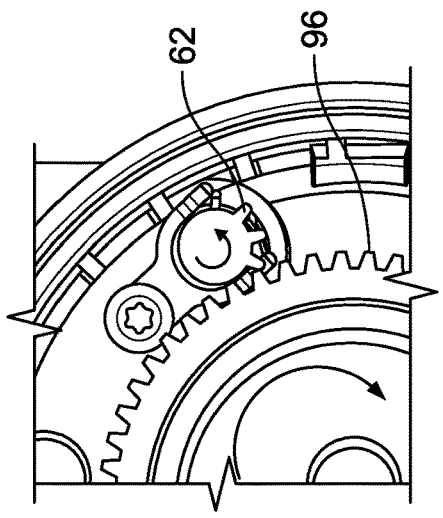
Figure 13:
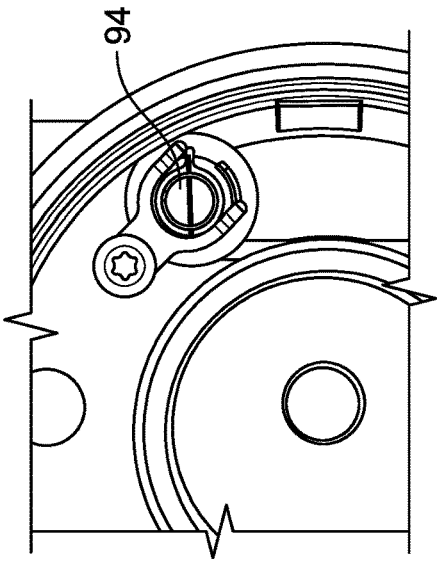
FIG. 13 is a top view of the valve arrangement in a filter assembly, in which no filter is installed, the valve is closed, and the valve gear is in a neutral position.
Figure 13:
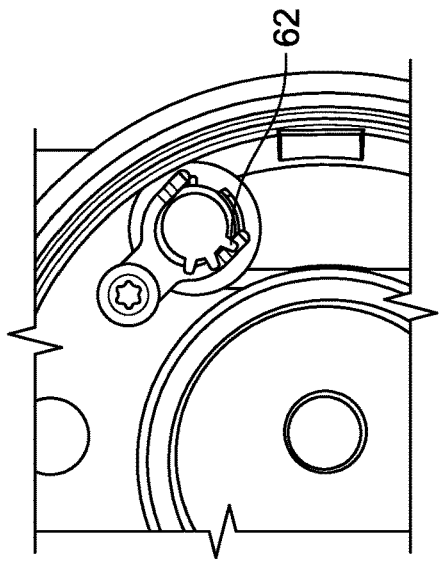

FIGS. 13-15 illustrate the helpfulness of having the torsion spring 94 sit neutrally when no filter cartridge 92 is installed. The valve gear 62 must ratchet in both directions. In FIG. 13, a neutral, no-filter position is illustrated with the valve arrangement 50 closed. The spring 94 is shown in the neutral position.

In FIG. 14, the filter cartridge 92 is installed, and the valve arrangement 50 is open. Comparing FIGS. 13 and 14, it can be seen how the gear teeth 62 have been ratcheted in a counter clockwise position, and the spring 94 has been rotated counter clockwise, as well.

In FIG. 15, the filter removal position is shown. The cartridge gear teeth 96 are shown rotating counter clockwise, which rotates the valve arrangement gear teeth 62 clockwise. The torsion spring 94 rotates clockwise, past the neutral position, and when the filter cartridge 92 is completely removed, the spring 94 springs back to neutral, which is also the position where the valve arrangement 50 is closed.

Figure 16:
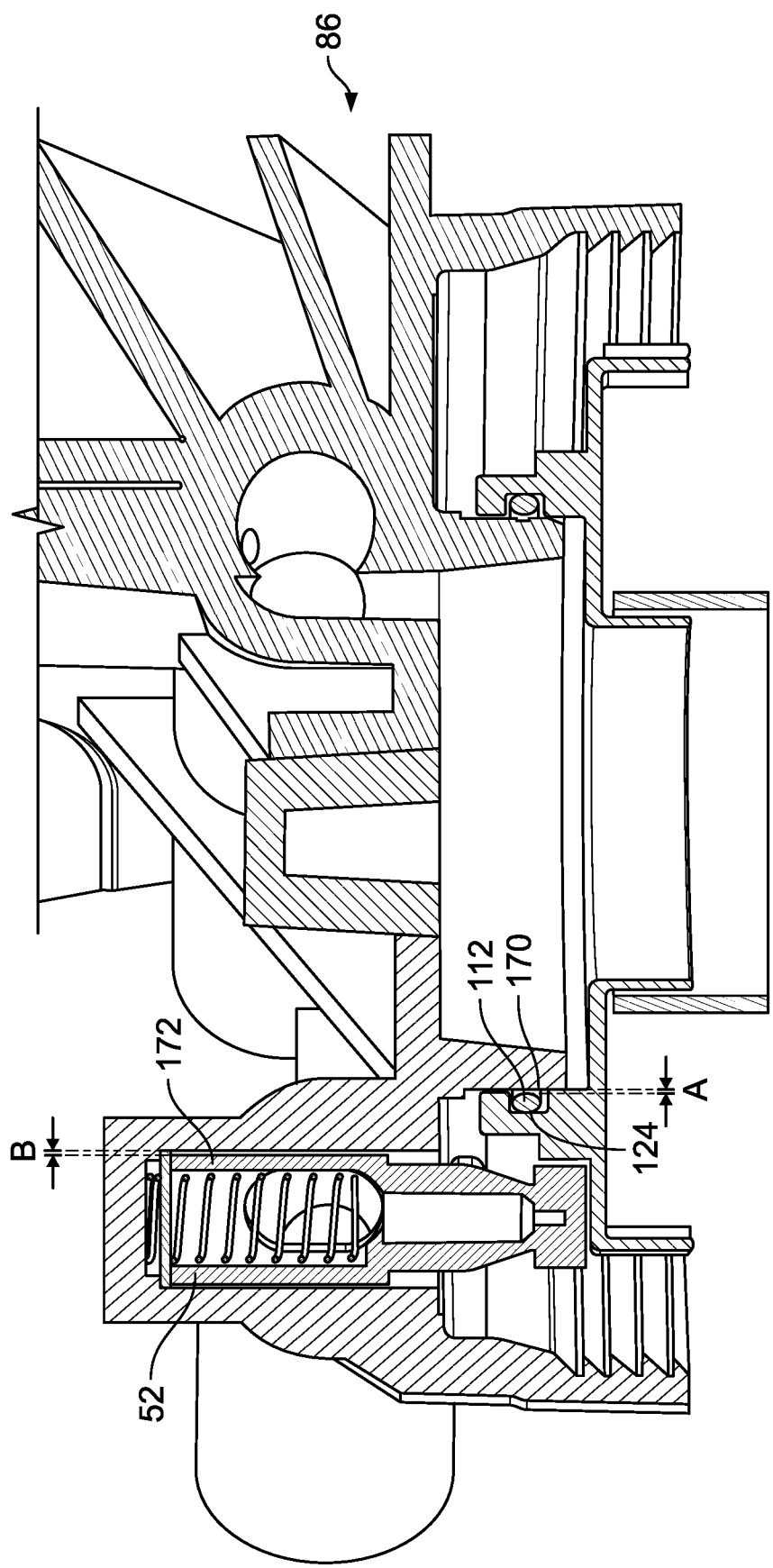
FIG. 16 is a schematic, cross-sectional view of the filter assembly using the valve arrangement, and showing regions where to account for manufacturing tolerances.

FIG. 16 illustrates a tolerance analysis. The tolerances are shown at A and B. "A" is the radial distance between the seal member 112 and a sealing surface 170 on the filter head arrangement 86. Tolerance B is a radial gap between an inner bore 172 in the filter head arrangement 86 and the outer shaft 52 of the valve arrangement 50. There are further tolerances related to concentricities. The tolerances are calculated for an acceptable amount, such as less than 1 mm.

In many cases, it has been found helpful to have a ratio of valve gear teeth 62 to cartridge gear teeth 96 of about 1:2.69. The height of the valve gear teeth 62 and the cartridge gear teeth 96 is about 13-35ths".

It is also been helpful to have a valve shaft with an outer diameter of about 17-18 mm, while a dimension across the bore 54 of the valve arrangement 50 in a direction perpendicular to the longitudinal axis 58 is about 9-10 mm.

Figure 27:
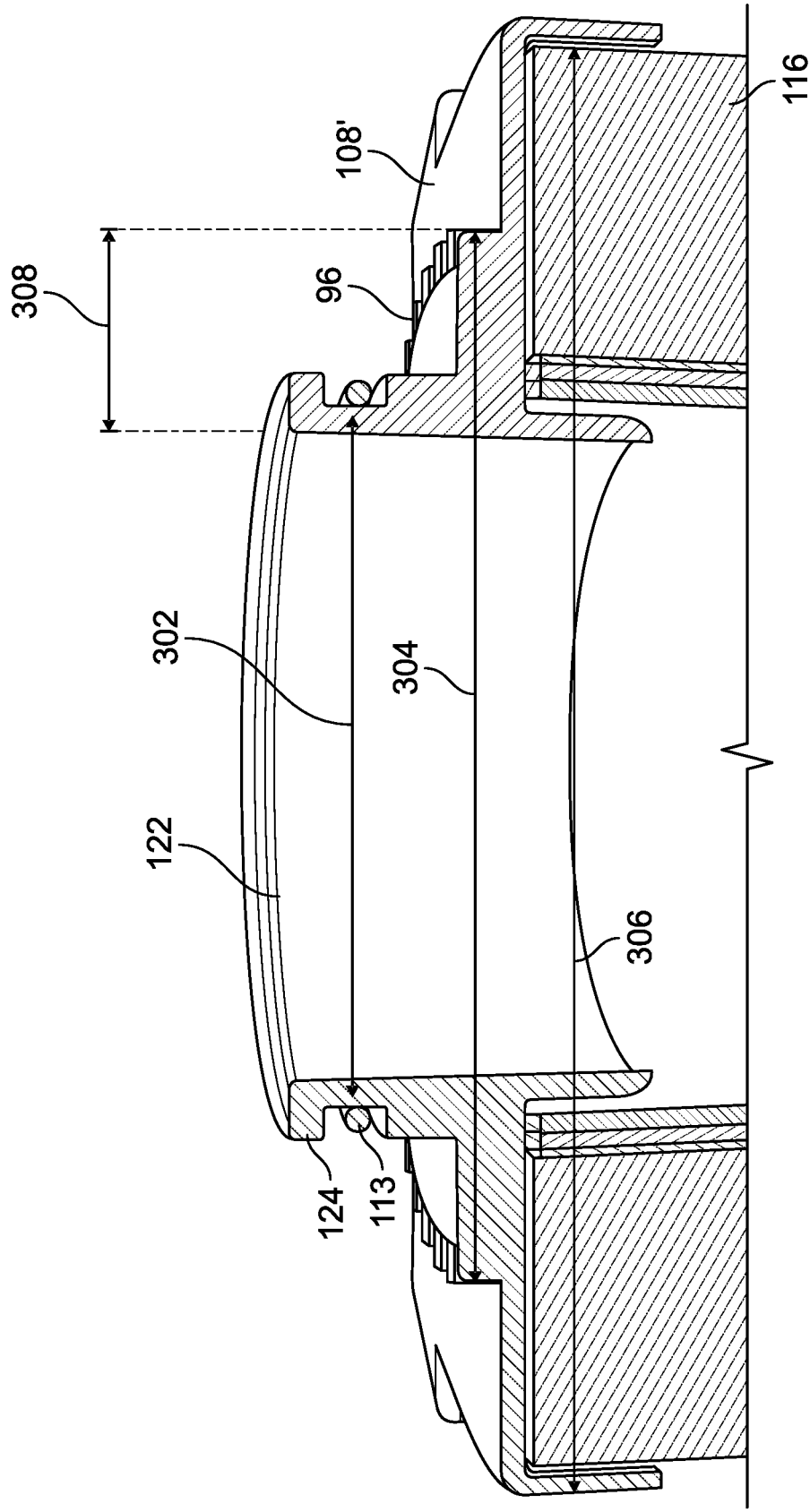
FIG. 27 is a perspective, cross-sectional view of a portion of filter cartridges described herein and showing dimension lines to indicate relationships between cartridge features.

FIG. 27 illustrates helpful relationships between the seal surface diameter 302; gear tip outer diameter 304; and first end cap outer diameter 306. A lateral distance 308 between an outermost tip of the gear teeth 96 and the base of the groove 124 for the seal member 113 is between 1 and 13 mm; typically, between 5 and 10 mm, for example, about 7-8 mm. The following dimensions result in a useful arrangement:

| | Minimum (mm) | Nominal (mm) | Maximum (mm) | Percent of end cap OD 306 Minimum | Percent of end cap OD 306 Maximum |
|---|---|---|---|---|---|
| Seal surface diameter 302 | 39.3 | 41 | 51 | 45% | 60% |
| Gear tip outer diameter 304 | 53.3 | 57 | 65 | 62% | 77% |

In operation, the filter head arrangement 86 is provided and the filter cartridge 92 having the cartridge gear teeth 96 is provided. The cartridge 92 is removably attached to the filter head arrangement 86 by threading a connection between the cartridge 92 and threads 87 on the filter head arrangement 86. While the cartridge 92 is rotated relative to the filter head arrangement 86, the cartridge gear teeth 96 will engage the gear teeth 62 of the valve arrangement 50, which will rotate the shaft 52 about the longitudinal axis 58 and move the bore 54 in open alignment with the inlet 88 of the filter head arrangement 86. This will then allow fluid to flow from the inlet 88 and to the filter cartridge 92. The filter cartridge 92 will filter material from the liquid when the liquid passes through the media construction 98. The filtered liquid will then flow from the filter cartridge 92, back into the filter head arrangement 86 and exit the filter head arrangement 86 through the outlet 90. When the filter cartridge 92 is removed from the filter head arrangement 86, rotation of the cartridge 92 will cause engagement between the cartridge gear teeth 96, which will move the gear teeth 62 on the valve arrangement 50 and move the bore 54 out of alignment with the inlet 88.

The filter cartridge including the outer housing and internal element can all be make of a variety of materials including non-metal, such as a nylon plastic. Some embodiments can also include metal for select parts, including the housing and/or sleeve.

D. Alternate Configurations, FIGS. 40-59

In addition to the configurations for projections 96 (such as cartridge gear teeth 96) shown in the cartridge 158 of FIG. 19, for example, a variety of other possible configurations could be used. In general, the projections 96 can be any shape that can turn the gear teeth 62 of the valve arrangement 50 over a required range of motion (e.g., at least 3 teeth) and provide a continuous or non-continuous diameter after rotation that would hold the valve arrangement 50 open after turning. In FIGS. 40-59, the end cap is shown at 400, and can be used where end cap 108 is illustrated. In each of these embodiments, an anti-rotation arrangement analogous to 175 with the radially outwardly extending tabs 177, is shown with radially outwardly extending flanges 401 extending radially from an outer perimeter of the end cap 400; many alternatives are possible.

Figure 40:
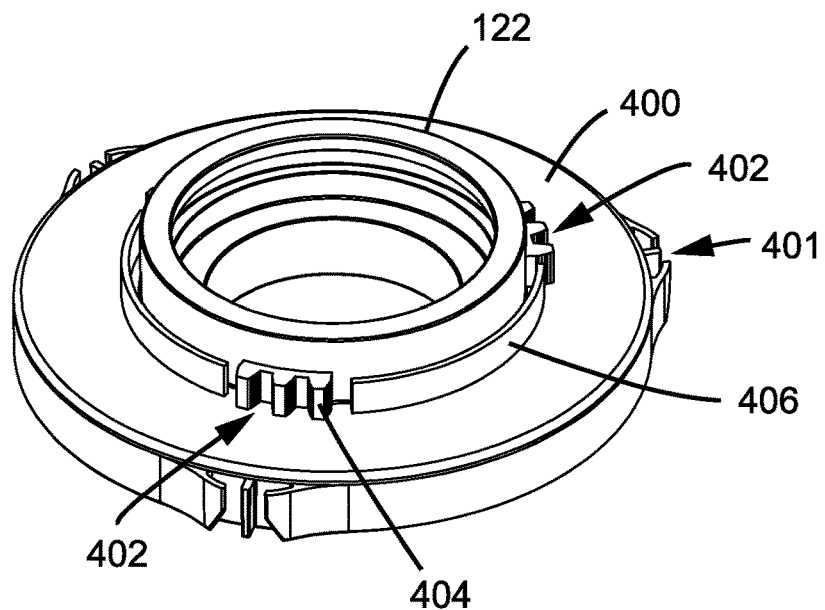
FIG. 40 is a perspective view of an endcap for a filter cartridge, such as the FIG. 19 cartridge, with an alternative projections
Figure 41:
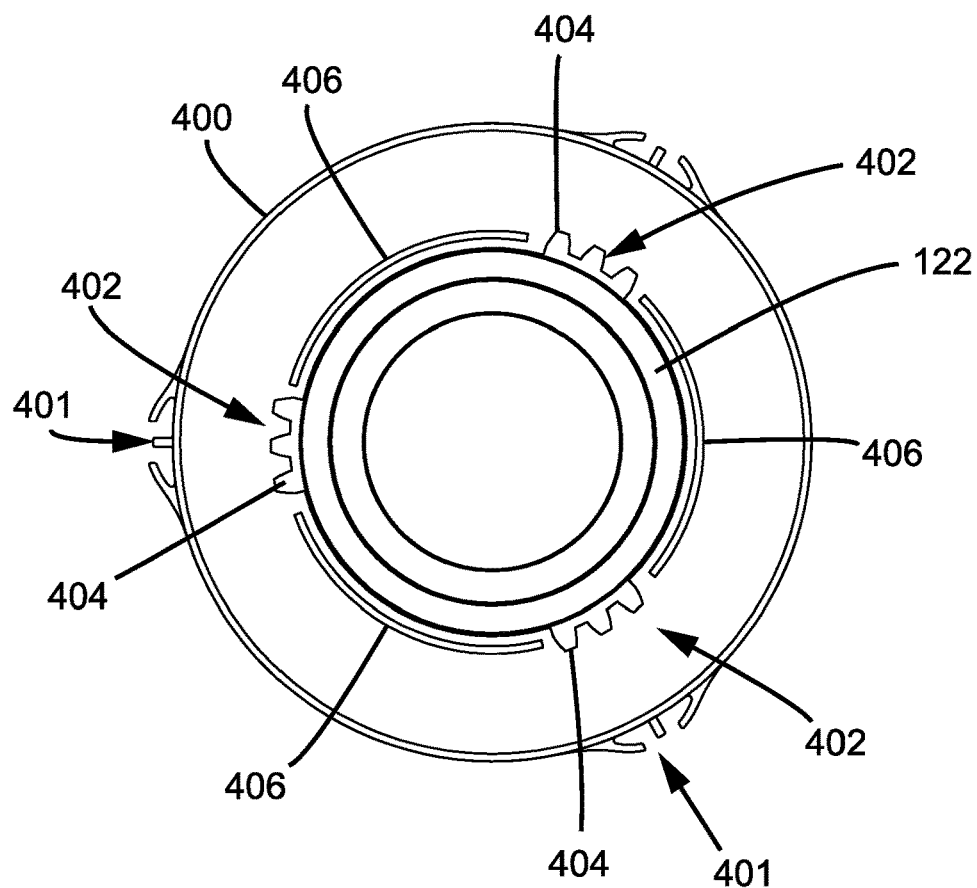
FIG. 41 is a top plan view of the endcap of FIG. 40.

FIGS. 40 and 41 illustrates projections 402 having the same shape as shown in FIG. 19, which can be spur-gear shaped. The projections 402 are in groups 404 of 3 projections/teeth 402. There are 3 groups 404, evenly circumferentially spaced from each other. Between each group 404, there are continuous, smooth ridges 406.

Figure 42:
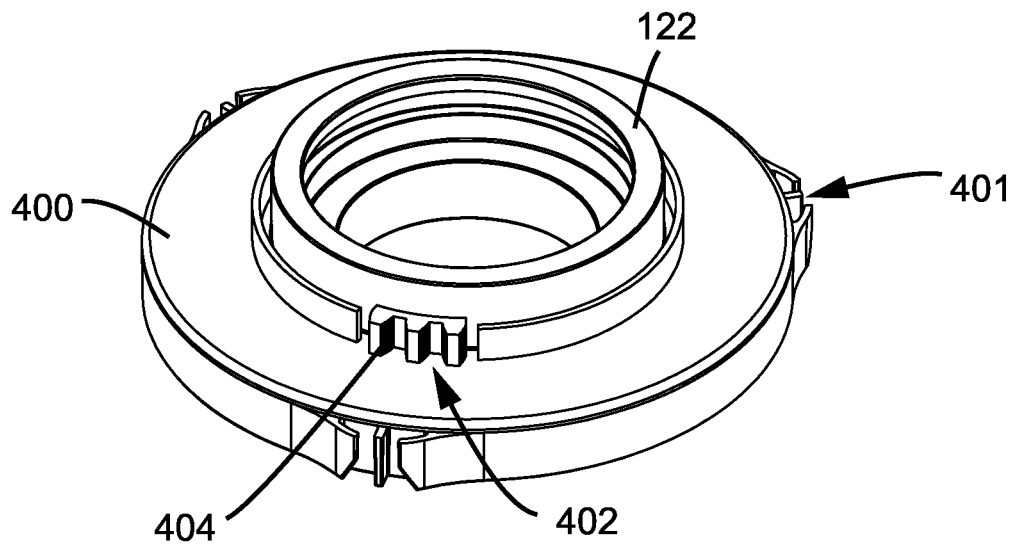
FIG. 42 is a perspective view of an endcap for a filter cartridge, such as the FIG. 19 cartridge, with an alternative projections
Figure 43:
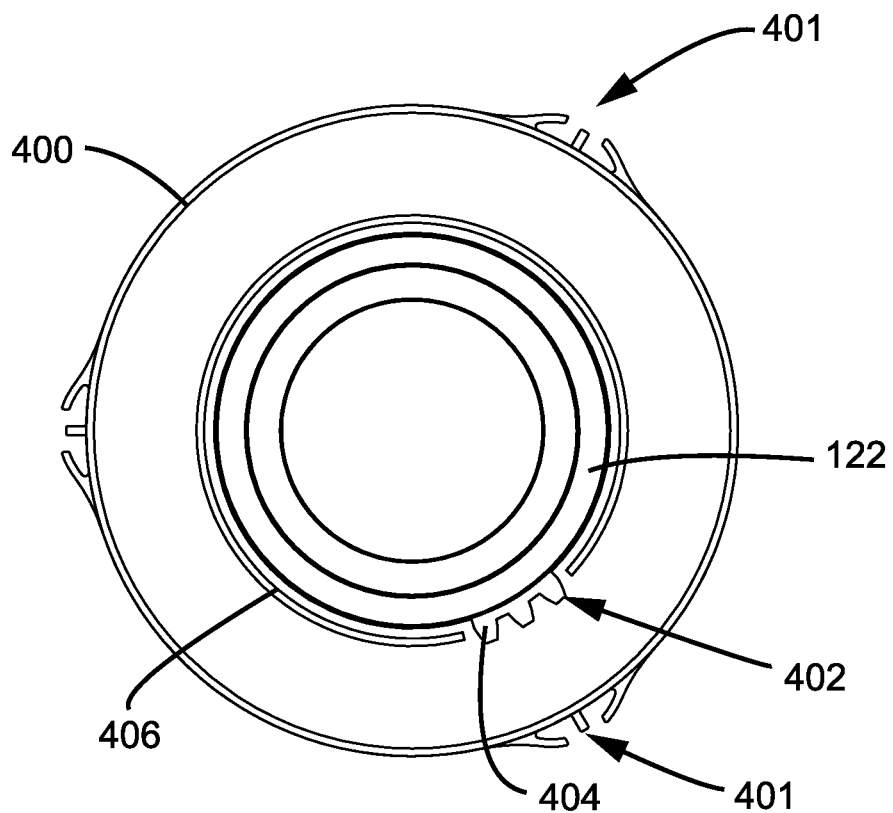
FIG. 43 is a top plan view of the endcap of FIG. 42.

In FIGS. 42 and 43, the projections 402 is in a single groups 404 of 3 projections/teeth 402. The continuous smooth ridge 406 extends circumferentially about the end cap 400 from one circumferential end of the group 404, along the end cap 400, to the opposite circumferential end.

Figure 44:
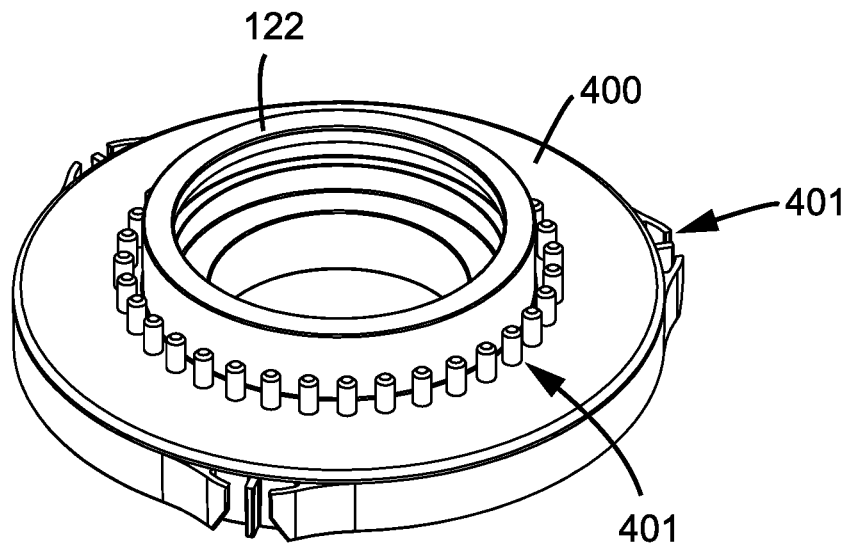
FIG. 44 is a perspective view of an endcap for a filter cartridge, such as the FIG. 19 cartridge, with an alternative projections
Figure 45:
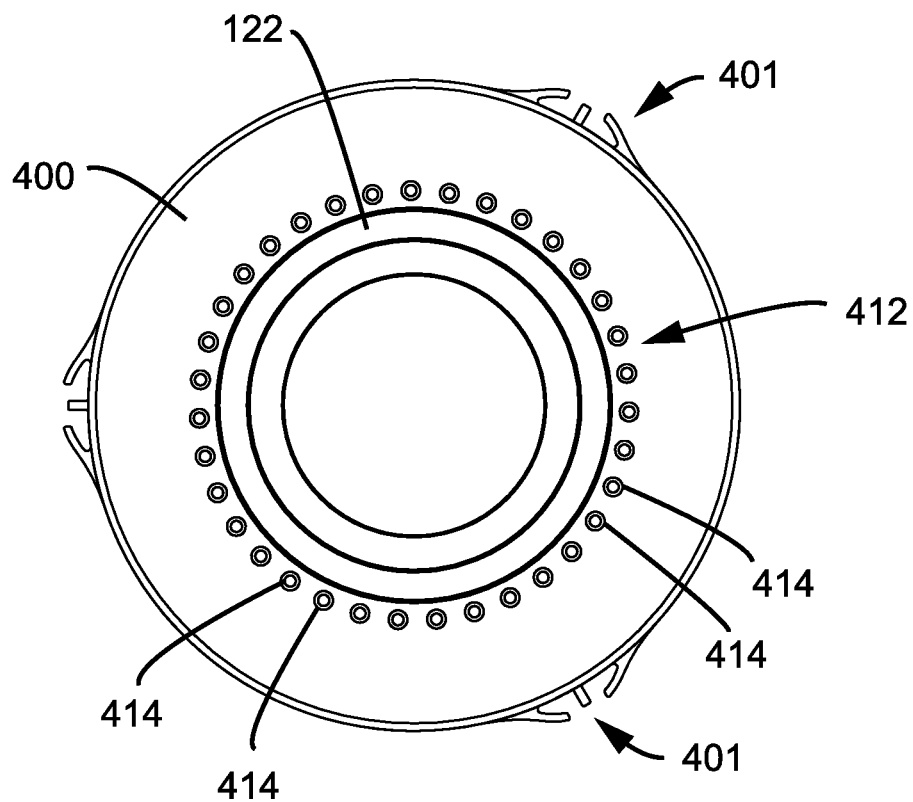
FIG. 45 is a top plan view of the endcap of FIG. 44.
Figure 46:
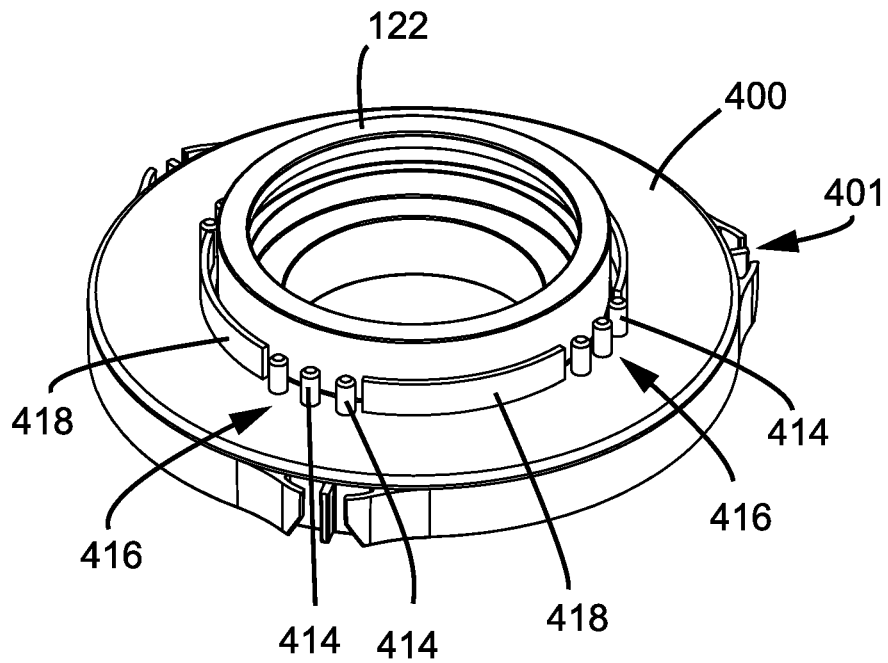
FIG. 46 is a perspective view of an endcap for a filter cartridge, such as the FIG. 19 cartridge, with an alternative projections
Figure 47:
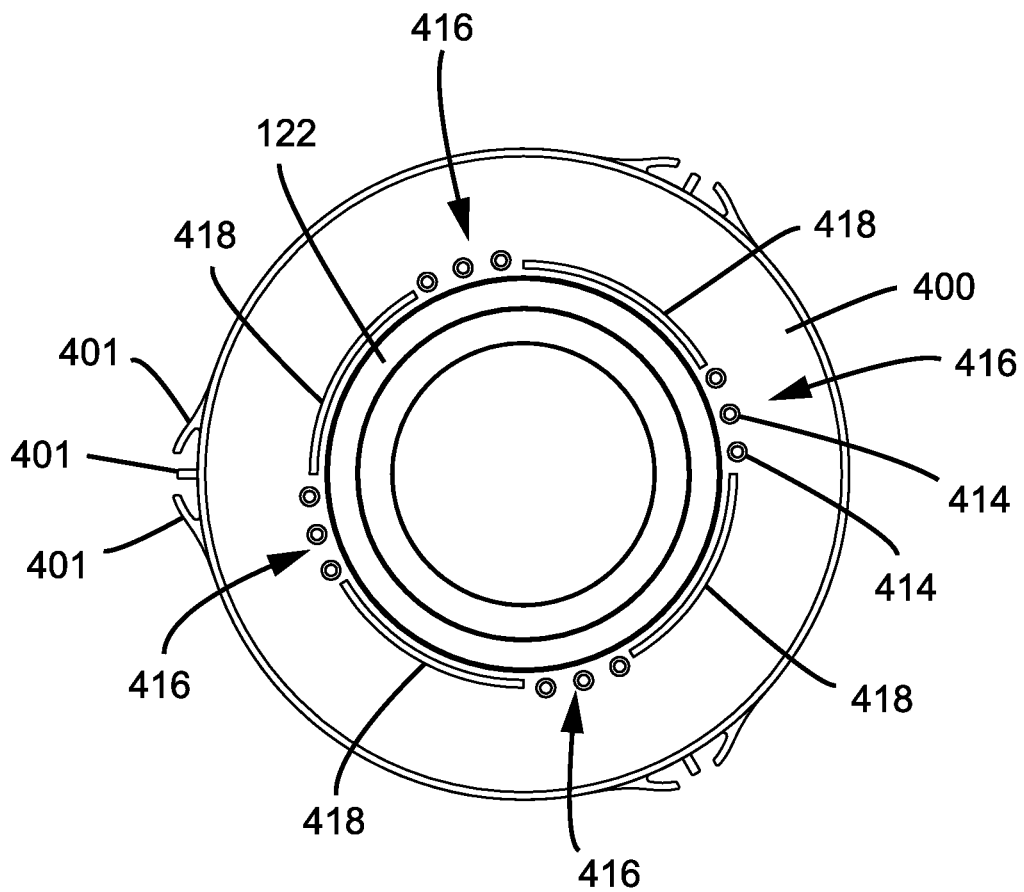
FIG. 47 is a top plan view of the endcap of FIG. 46.
Figure 48:
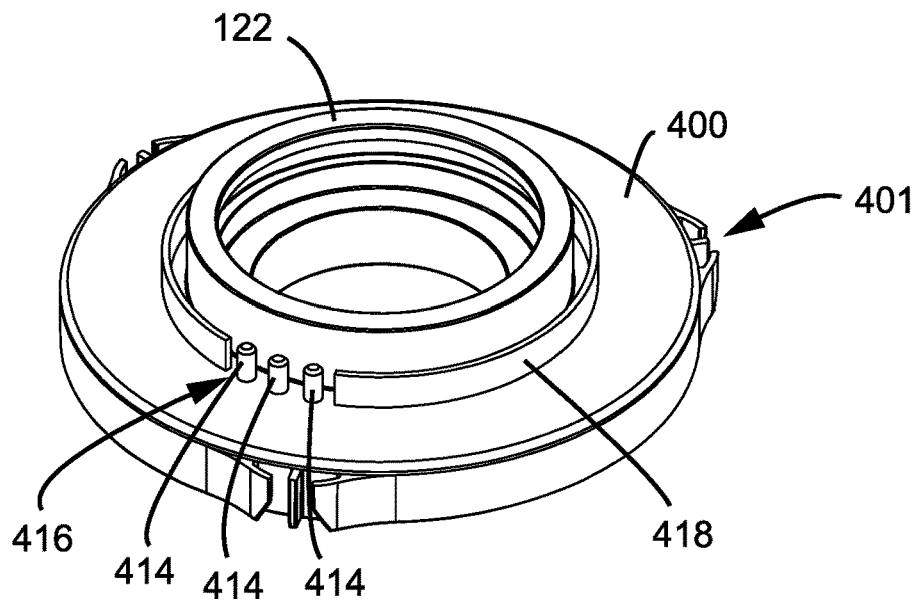
FIG. 48 is a perspective view of an endcap for a filter cartridge, such as the FIG. 19 cartridge, with an alternative projections
Figure 49:
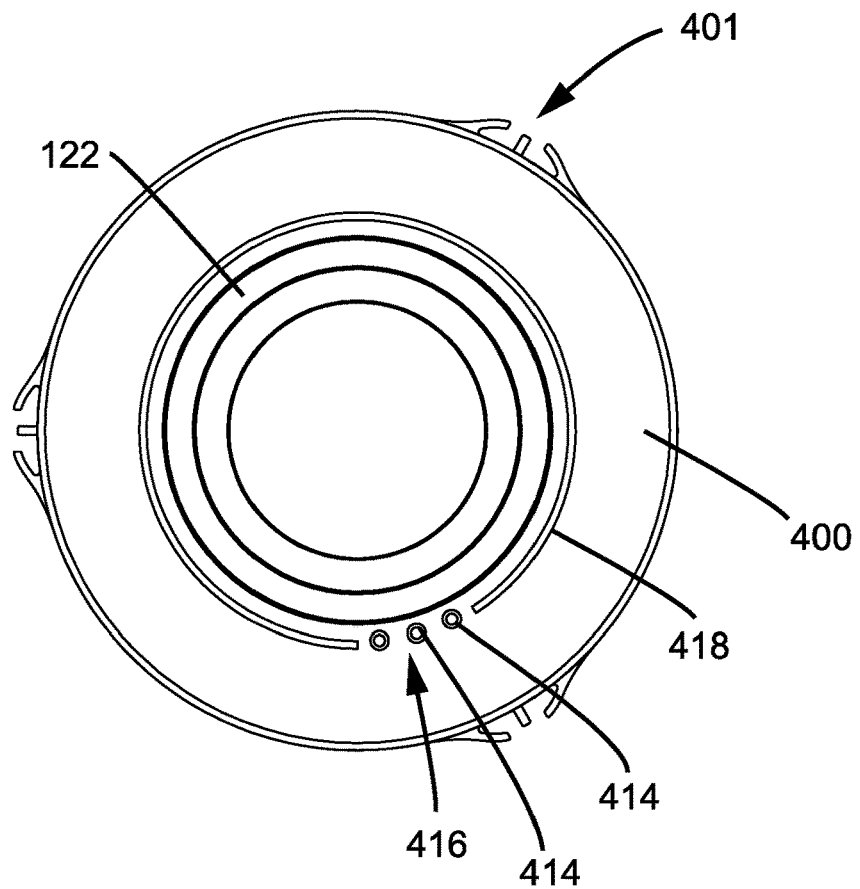
FIG. 49 is a top plan view of the endcap of FIG. 48.

FIGS. 45-49 show the projections 412 embodied as pins 414. In FIGS. 44-45, the pins 414 are evenly circumferentially spaced from each other and projecting from the axial face of the end cap 400, while being spaced from the holder 122. In FIGS. 46-47, the pins 414 are in groups 416 of 3 pins 414. There are 4 groups 416, evenly circumferentially spaced from each other. Between each group 416, there are continuous, smooth ridges 418. In FIGS. 48-49, the projections 412 is in a single groups 416 of 3 pins 414. The continuous smooth ridge 418 extends circumferentially about the end cap 400 from one circumferential end of the group 416, along the end cap 400, to the opposite circumferential end.

Figure 50:
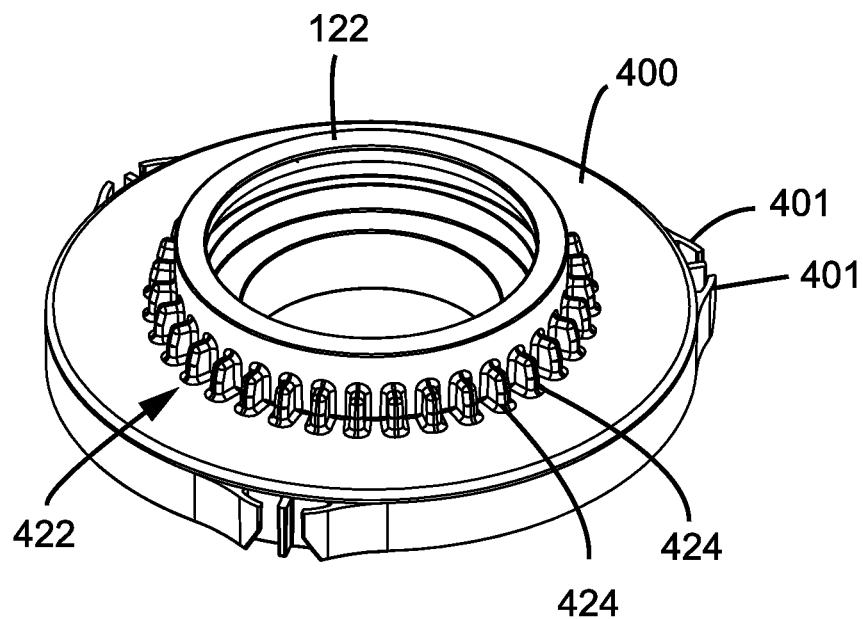
FIG. 50 is a perspective view of an endcap for a filter cartridge, such as the FIG. 19 cartridge, with an alternative projections
Figure 51:
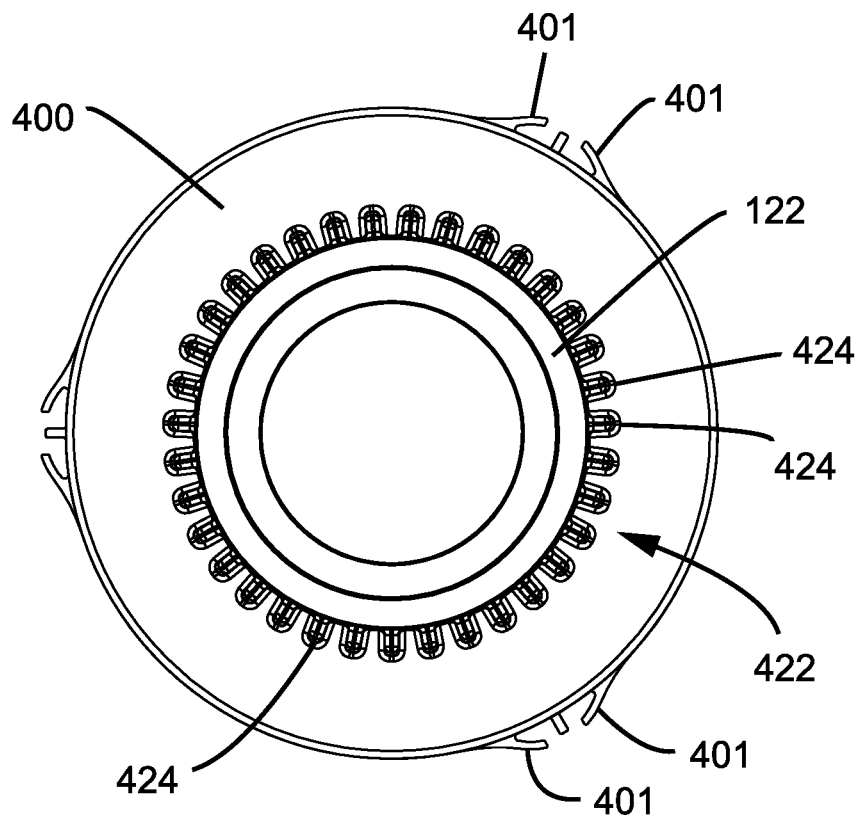
FIG. 51 is a top plan view of the endcap of FIG. 50.
Figure 52:
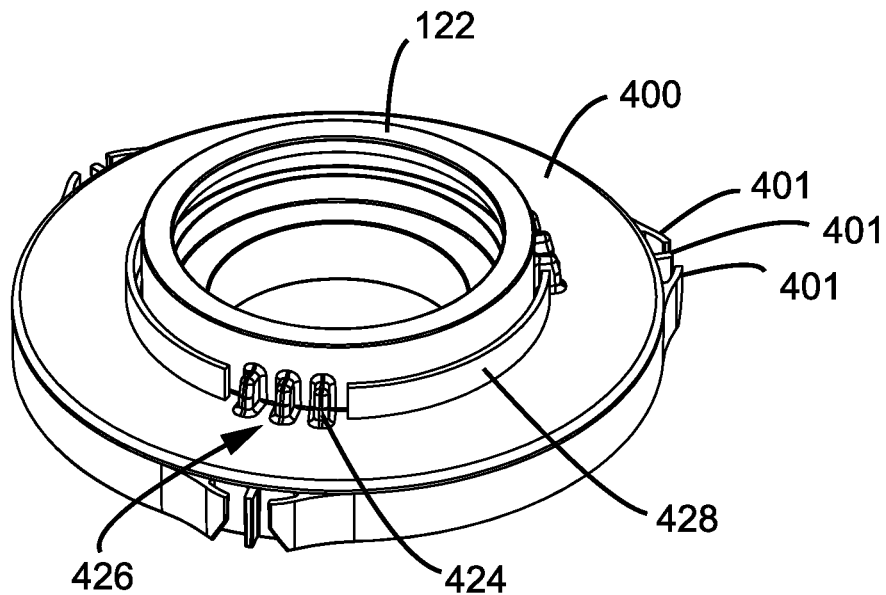
FIG. 52 is a perspective view of an endcap for a filter cartridge, such as the FIG. 19 cartridge, with an alternative projections
Figure 53:
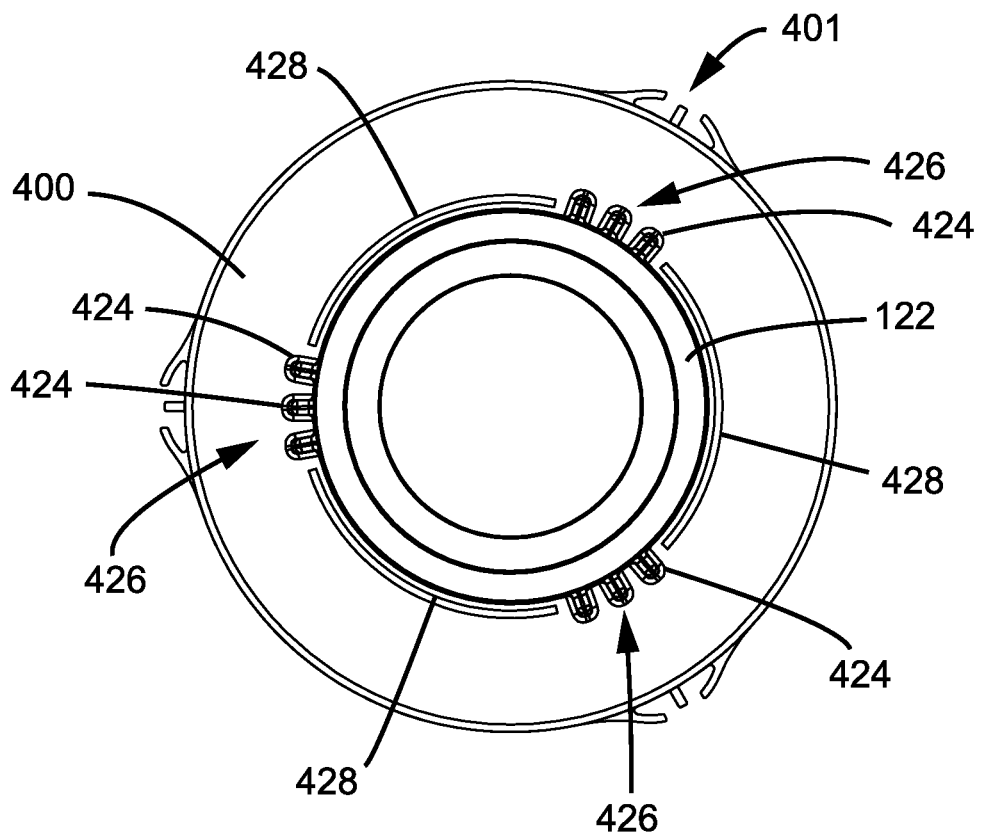
FIG. 53 is a top plan view of the endcap of FIG. 52.
Figure 54:
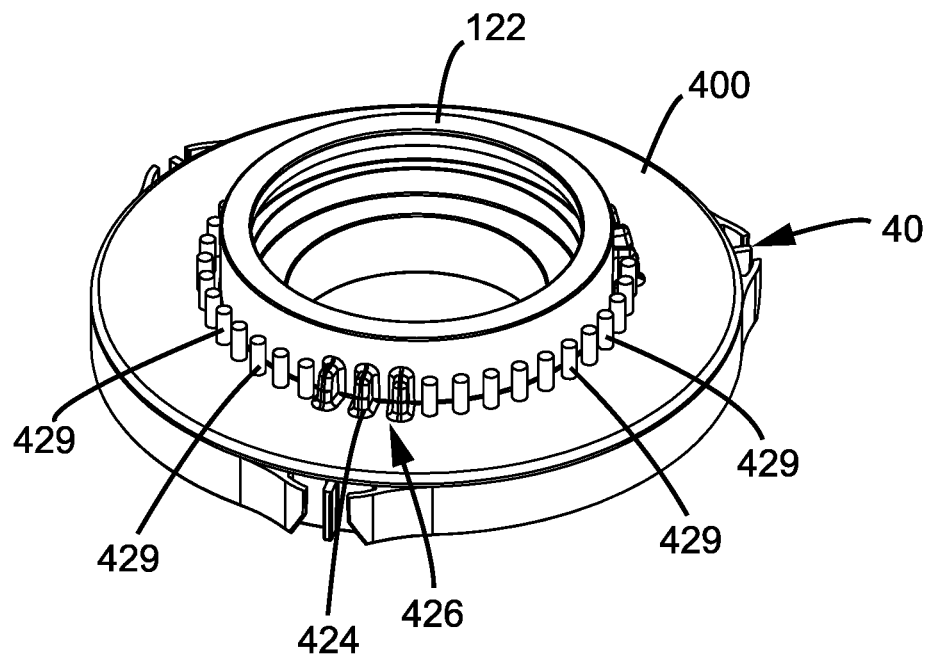
FIG. 54 is a perspective view of an endcap for a filter cartridge, such as the FIG. 19 cartridge, with an alternative projections
Figure 55:
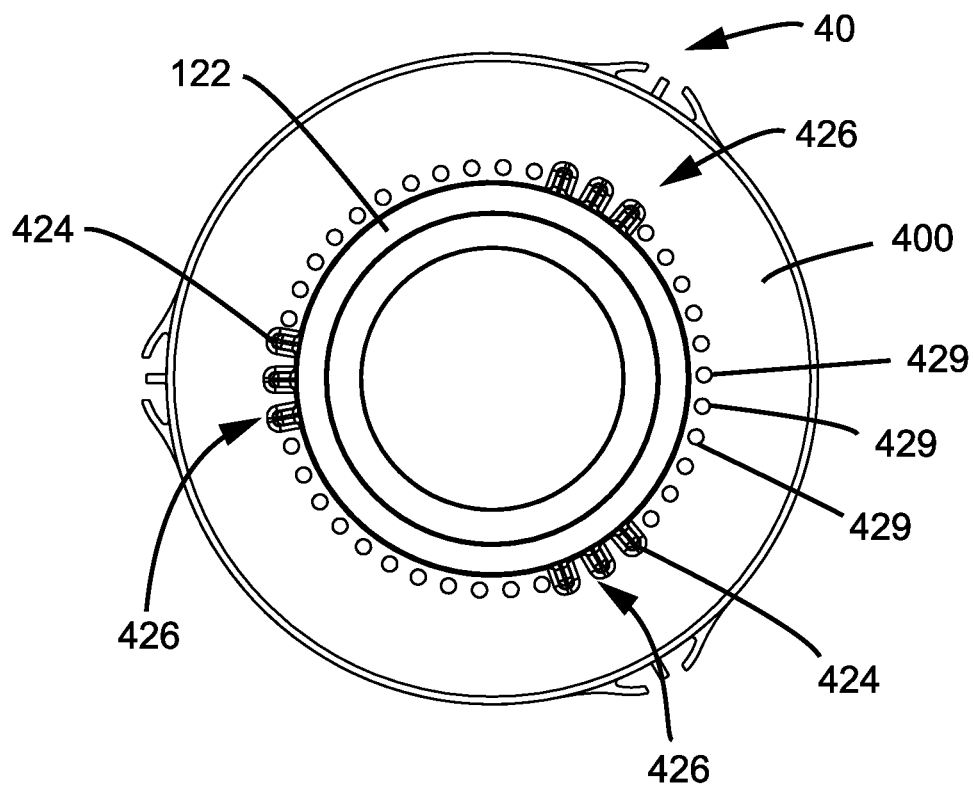
FIG. 55 is a top plan view of the endcap of FIG. 54.

FIGS. 50-55 show the projections 422 embodied as fins or paddles 424. In FIGS. 50-51, the paddles 424 are evenly circumferentially spaced from each other and projecting from the axial face of the end cap 400, while also projecting radially outwardly from the holder 122. In FIGS. 52-53, the paddles 424 are in groups 426 of 3 paddles 424. There are 3 groups 426, evenly circumferentially spaced from each other. Between each group 426, there are continuous, smooth ridges 428. In FIGS. 54-55, there are 3 groups 426, similar to FIGS. 52-53, but each group 426 is circumferentially separated by pins 429.

Figure 56:
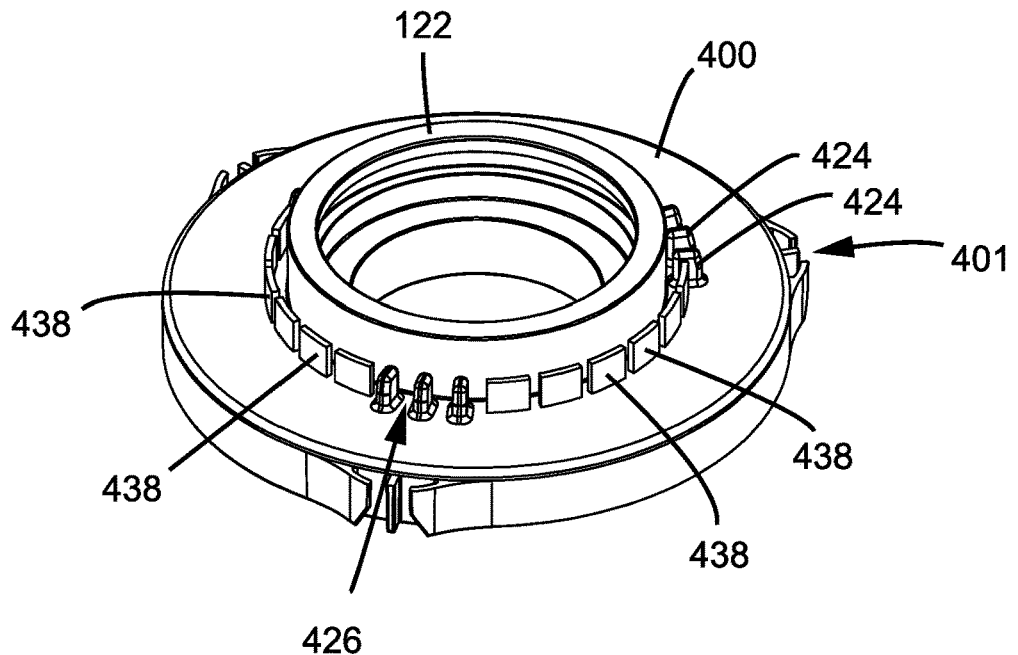
FIG. 56 is a perspective view of an endcap for a filter cartridge, such as the FIG. 19 cartridge, with an alternative projections
Figure 57:
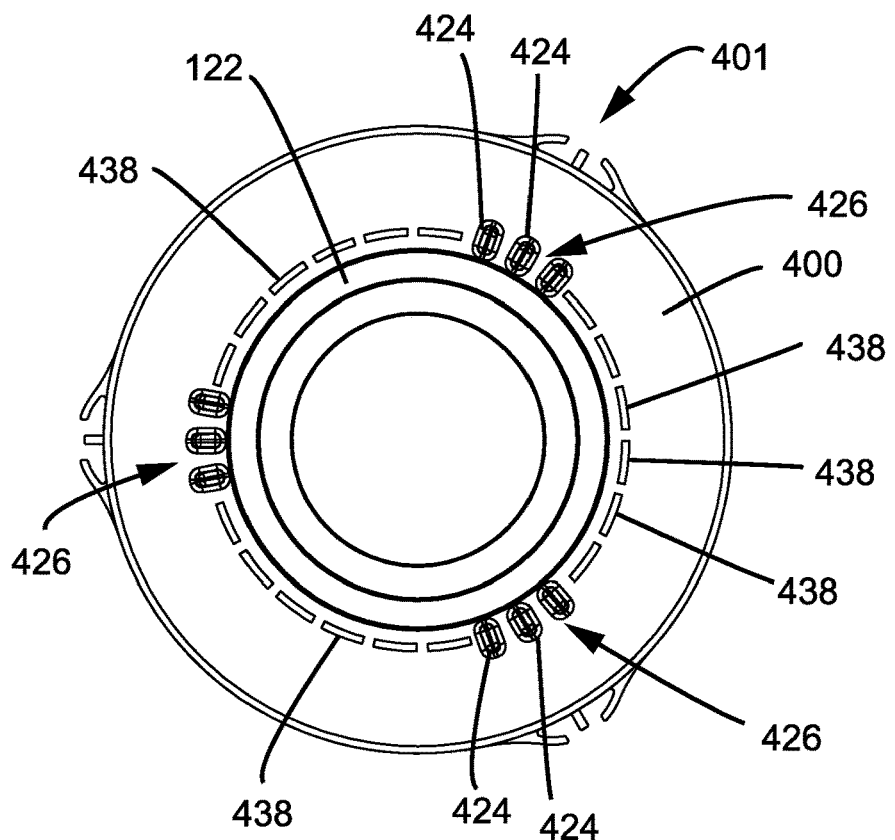
FIG. 57 is a top plan view of the endcap of FIG. 56.
Figure 58:
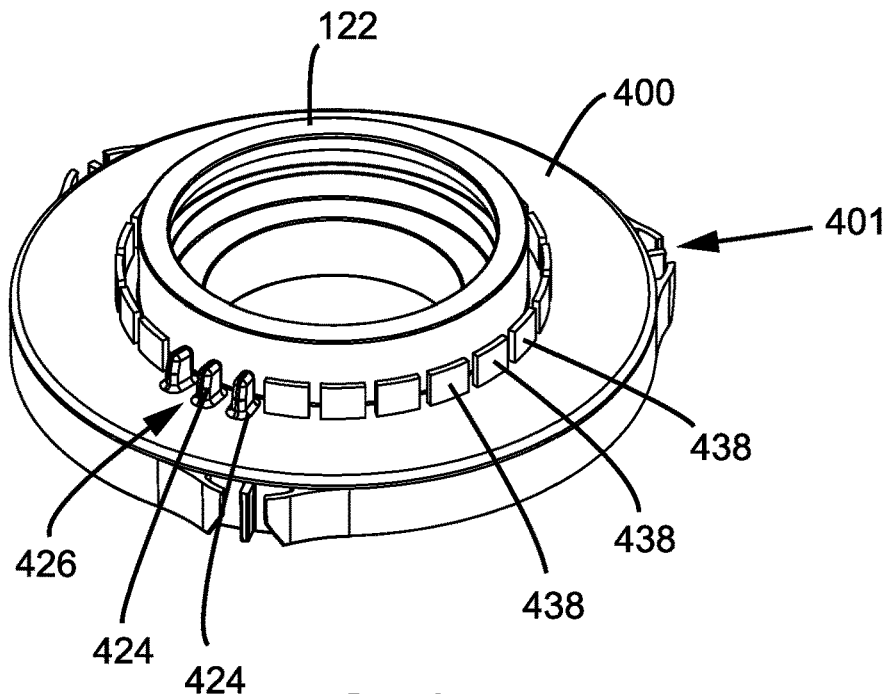
FIG. 58 is a perspective view of an endcap for a filter cartridge, such as the FIG. 19 cartridge, with an alternative projections
Figure 59:
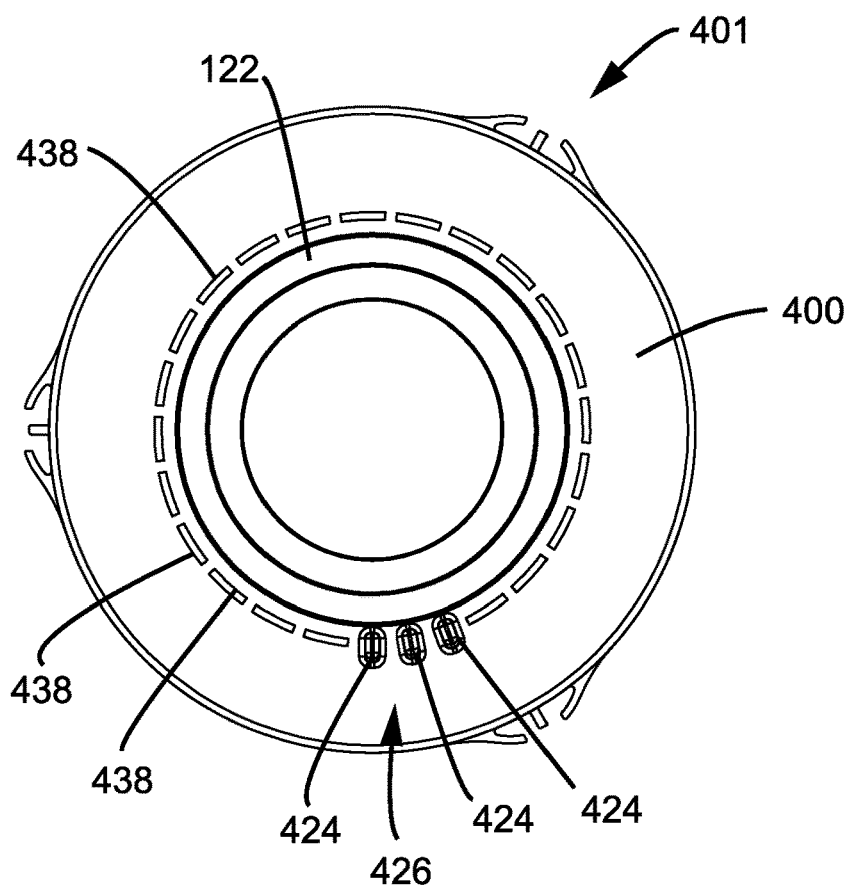
FIG. 59 is a top plan view of the endcap of FIG. 58.

FIGS. 56-59 show the projections 422, shown here as fins or paddles 424 (but could be many other variations) and with groups 426 separated by discrete fins 438. FIGS. 56-57 are similar to FIGS. 52-53, but instead of having the smooth ridges 428 separating the groups 426, there are a plurality of individual fins 438. In FIGS. 58-59, there is a single group 426, and the fins 438 extend circumferentially about the end cap 400 from one circumferential end of the group 426, along the end cap 400, to the opposite circumferential end.

E. Further Embodiments, FIGS. 28-38

As can be appreciated from the above, and as further explained below, the concepts disclosed herein relates to a filter assembly incorporating a drive gear, such as the projections from the filter cartridge described above, that is rotatably fixed to the filter assembly. Rotation of the filter assembly results in rotation of the drive gear, which can be used to transmit rotational motion to other components such as a driven gear, such as projections on a valve shaft as explained above. The filter assembly is manually rotated for installation of the filter assembly in a filtration system such that mating screw thread defined by the filter assembly and a filter head are brought into mutual engagement. Rotation of the filter assembly relative to the filter head during installation opens a fluid flow pathway leading through the filter assembly. In particular, rotation of the drive gear causes rotation of a driven gear in the filter head. The driven gear is coupled to a valve in the fluid flow pathway, which opens upon rotation of the driven gear.

Figure 28:
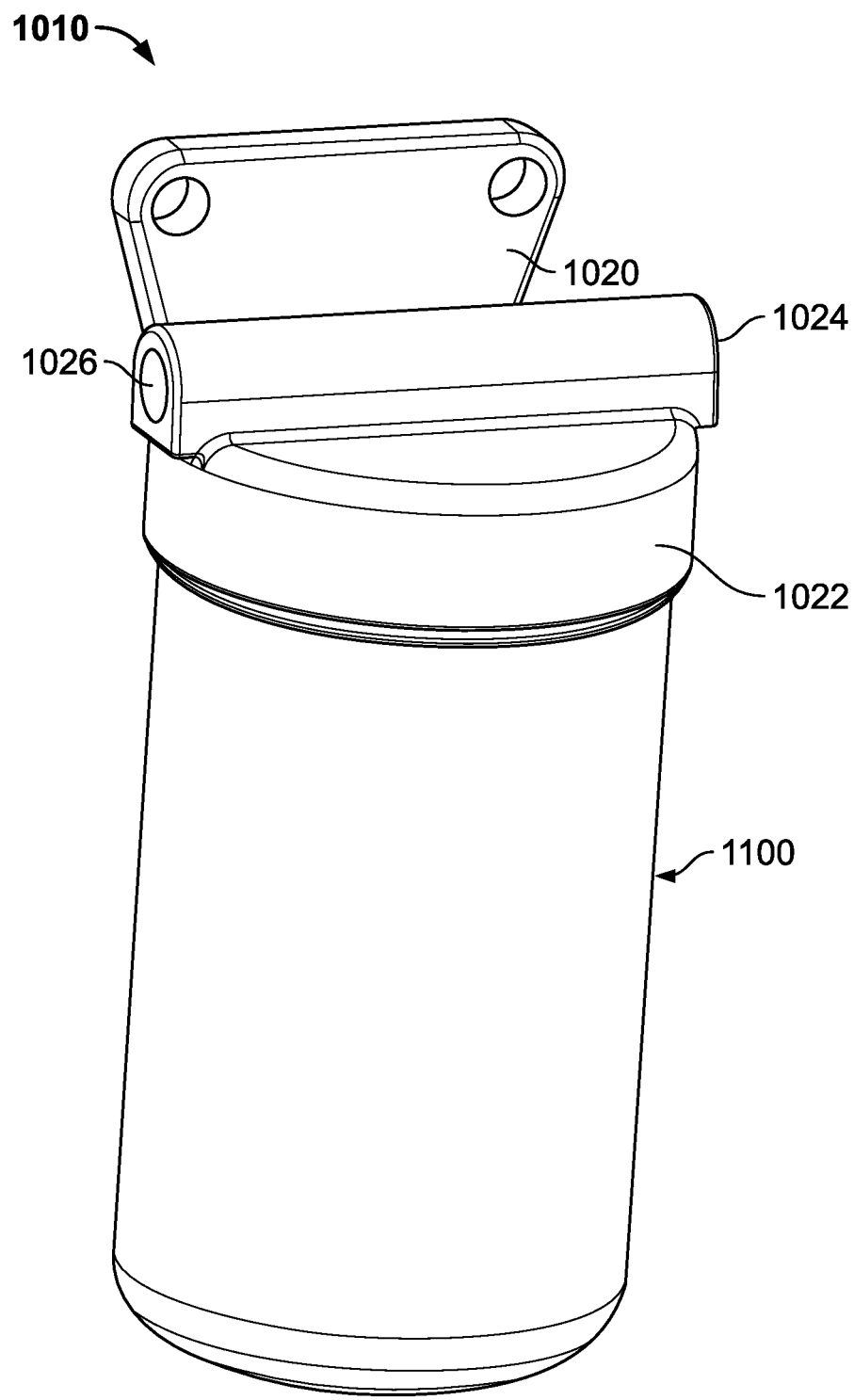
FIG. 28 depicts an example filter system consistent with embodiments disclosed herein.

FIG. 28 depicts an example filter system 1010 consistent with embodiments disclosed herein. The filter system 1010 generally has a filter head 1020 and a filter assembly 1100 configured to be coupled to the filter head 1020. The example filter system 1010 can be a liquid filter system, such as a system configured to filter oil and/or hydraulic fluid.

The filter head 1020 can be coupled to, or is an integral component of, a liquid flow system such as an oil and/or hydraulic system. The filter head 1020 has a filter connecting structure 1022 that is configured to connect to a filter assembly 1100. The filter head 1020 defines conduits that directs fluid through the filter assembly 1100 and then returns the fluid to the liquid flow system. The filter head 1020 defines an inlet 1024 and an outlet 1026. The inlet 1024 guides liquid flow to the filter assembly 1100. The outlet 1026 guides liquid flow away from the filter assembly 1100. Filter heads can have a variety of different configurations, some of which will be described in more detail below with respect to FIGS. 34-38.

The filter assembly 1100 is generally configured to filter liquid received from the filter head 1020. The filter assembly 1100 is configured to sealably couple to the filter head 1020. The filter assembly 1100 and the filter head 1020 are configured to cumulatively define a fluid flow pathway from the inlet 1024, through the filter assembly 1100, and through the outlet 1026. The filter assembly 1100 can have a variety of different configurations that will now be described in more detail.

Figure 29:
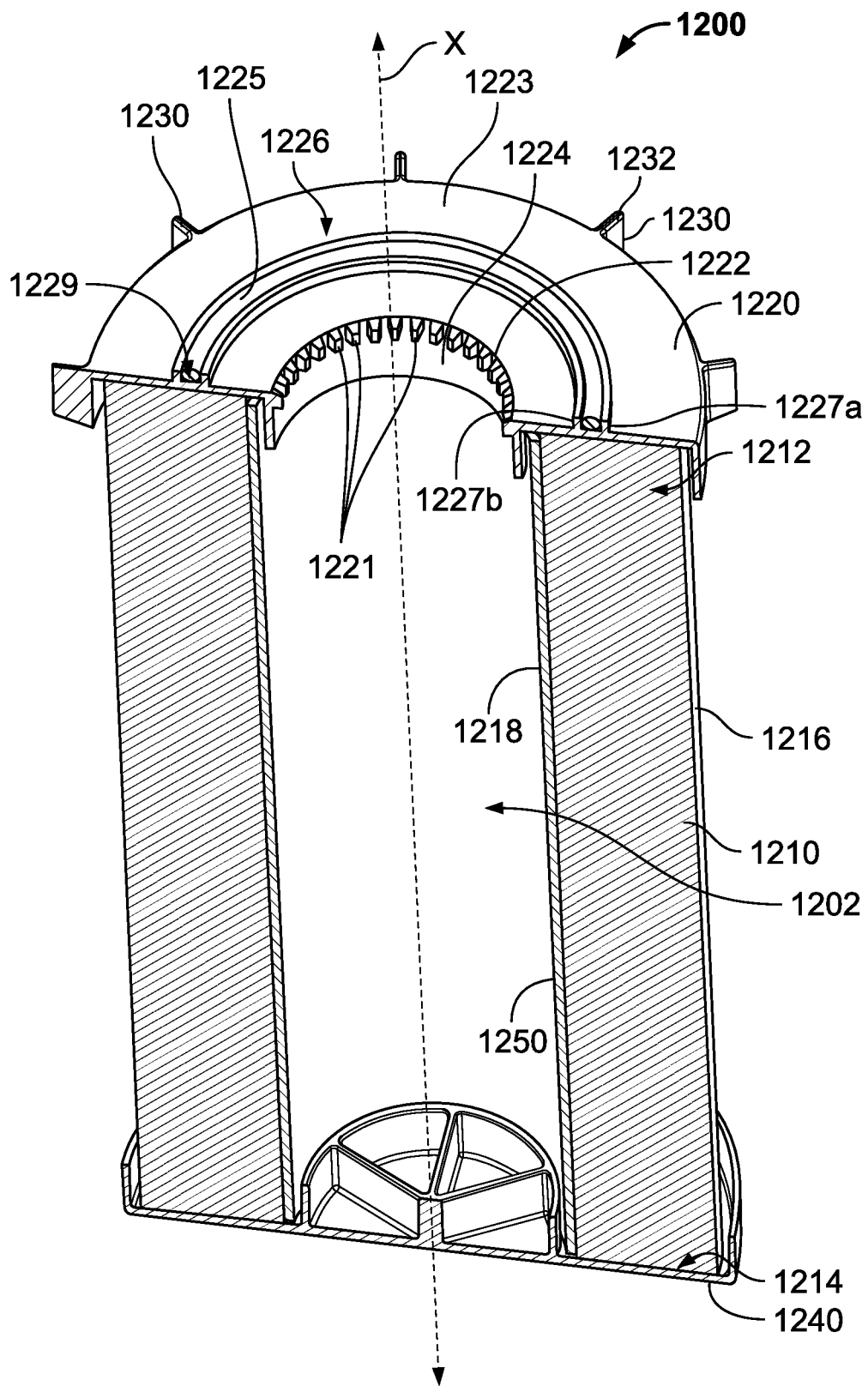
FIG. 29 is a perspective cross-sectional view of a first example filter element consistent with embodiments disclosed herein.

FIG. 29 depicts a perspective cross-sectional view of a first example filter element 1200. The filter element 1200 is generally configured to filter fluids and, particularly, liquids. The filter element 1200 at least has filter media 1210, a first endcap 1220, and a housing engagement member 1230. Here the filter element 1200 also has a second endcap 1240.

The filter media 1210 is generally configured to filter a fluid. In some embodiments the filter media 1210 is configured to filter water, oil, fuel, and/or hydraulic fluid. The filter media 1210 is arranged about a central opening 1202. In the current example, the filter media 1210 and the central opening 1202 share a central axis x. The filter media 1210 generally has a cylindrical, tubular arrangement. The filter media 1210 has a first media end 1212 and a second media end 1214. The central opening 1202 extends from the first media end 1212 to the second media end 1214. The first media end 1212 of the filter media 1210 is coupled to the first endcap 1220 and the second media end 1214 of the filter media 1210 is coupled to the second endcap 1240.

The filter media 1210 can be constructed of a variety of materials and combinations of materials. In some embodiments the filter media 1210 is constructed of fibers. The filter media 1210 is pleated in various embodiments. In some such embodiments, the filter media 1210 has a first set of pleat folds cumulatively defining an outer flow face 1216 of the filter media 1210 and a second set of pleat folds cumulatively defining an inner flow face 1218 of the filter media 1210. In some embodiments the filter media 1210 is wrapped about the central opening 1202 to have a spiraled configuration about the central opening 1202. In some such embodiments the outer flow face 1216 is defined by one surface of the filter media 1210 and the inner flow face 1218 is defined by an opposite surface of the filter media 1210. The inner flow face 1218 can be upstream of the outer flow face 1216 relative to fluid flow through the filter media 1210. However, the outer flow face 1216 can be upstream of the inner flow face 1218, in some examples.

In some embodiments the filter element 1200 can have one or more liners 1250 abutting the inner flow face 1218 and/or the outer flow face 1216 of the filter media 1210. The liner(s) 1250 can be configured to provide structural support to the filter media 210 and/or support the filtration functions of the filter media 1210.

The first endcap 1220 is generally configured to retain the first media end 1212 of the filter media 1210. The first endcap 1220 can define a portion of a fluid flow pathway through the filter media 1210. The first endcap 1220 is sealably coupled to the first media end 1212 of the filter media 1210. In the current example, the first endcap 1220 defines an endcap opening 1224 that is part of the central opening 1202. The first endcap 1220 shares the central axis x of the filter media 1210 and central opening 1202. The first endcap 1220 generally has a drive gear 1222, a housing engagement member 1230 and a sealing structure 1226.

The drive gear 1222 of the first endcap 1220 is generally configured to drive a driven gear of a system within which the filter element 1200 is installed. The drive gear 1222 is configured to operatively mesh with a corresponding gear structure of the driven gear of the corresponding system, which will be described in more detail, below. The drive gear 1222 is disposed about the central opening 1202. The drive gear 1222 shares the central axis x. The drive gear 1222 and the first endcap 1220 are rotatably fixed such that rotation of the first endcap 1220 results in equal rotation of the drive gear 1222. In various embodiments the drive gear 1222 and the first endcap 1220 form a single, unitary structure. The drive gear 1222 can be integral to the first endcap 1220.

The drive gear 1222 can have various configurations to be consistent with the technology disclosed herein. Here, the drive gear 1222 is a bevel gear. In some embodiments the bevel gear can be a crown gear. The drive gear 1222 has a plurality of gear teeth 1221 extending radially inward to partially define the endcap opening 1224. The plurality of gear teeth 1221 are equally spaced about the endcap opening 1224. In some embodiments the drive gear 1222 has at least 15 gear teeth 1221. In some embodiments the drive gear 1222 has 20-60 gear teeth. In some embodiments the drive gear 1222 has no more than 160 gear teeth. The drive gear 1222 is configured to engage a driven gear in a plurality of orientations about the central axis x. The drive gear 1222 can be other types of gears such as a worm gear drive, screw gear, and others.

The housing engagement member 1230 of the first endcap 1220 is generally configured to engage a filter housing, where the filter housing is configured to receive the filter element 1200 (described in more detail, below). The housing engagement member 230 can have a variety of configurations but will generally have a rotational obstruction feature 1232. The rotational obstruction feature 1232 is configured to obstruct rotation of the filter element 1200 relative to the filter housing. In the current example, the housing engagement member 1230 defines the rotational obstruction feature 1232. More particularly, each of a plurality of housing engagement members 1230 defines a rotational obstruction feature 1232.

Each rotational obstruction feature 1232 is configured to engage a mating feature on a filter housing to rotationally fix the filter element 1200 to the filter housing. In the current example, each rotational obstruction feature 1232 is a protrusion that extends outward from the first endcap 1220. In various examples, the rotational obstruction feature 1232 extends radially outward from the first endcap 1220. In some embodiments the rotational obstruction feature 1232 extends outward from the first endcap 1220 in an axial direction, that is, a direction along the central axis x.

In embodiments consistent with the current example, the rotational obstruction feature 1232 is integral to the first endcap 1220. In some embodiments, the rotation obstruction feature 1232 can be a separate component that is coupled to both the first endcap 1220 and the filter housing. While in the current example the rotational obstruction feature 1232 is a protrusion extending from the first endcap 1220, in some embodiments the rotational obstruction feature can be a pocket arrangement defined by the first endcap 1220. Such a pocket arrangement can be configured to receive a mating protrusion of the corresponding filter housing or, in another example, the pocket arrangement can be configured to be received by an obstruction feature that is a separate component from the filter housing and the first endcap 1220.

The sealing structure 1226 of the first endcap 1220 is configured to form a seal with filtration system components. In a variety of embodiments, the sealing structure 1226 is configured to form a seal with a filter head. The sealing structure 1226 is disposed about the central opening 1202. The sealing structure 1226 is disposed about the drive gear 1222. In the current example, the sealing structure 1226 has a seal 1225 and a seal receptacle 1229 that receives the seal 1225. Here the seal receptacle 1229 is defined by an outer facing surface 1223 of the first endcap 1220, an outer annular ridge 1227*a*, and an inner annular ridge 1227*b*. The outer annular ridge 1227*a* and the inner annular ridge 1227*b* receive the seal 1225 therebetween. Each of the outer annular ridge 1227*a* and the inner annular ridge 1227*b* extend axially outward from the outer facing surface 1223 of the first endcap 1220. In the current example, the sealing structure 1226 defines an annular seal, meaning that the exposed portion of the seal 1225 (referred to as the "sealing surface") generally faces the axial direction. In some embodiments, the sealing structure can define a radial seal, where the sealing surface generally faces a radial direction. Such a configuration is described below with reference to FIG. 30.

The second endcap 1240 of the filter element 1200 is generally configured to retain the second media end 1214 of the filter media 1210 and define a portion of a fluid flow pathway through the filter media 1210. In particular, the second endcap 1240 extends across the central opening 1202 to obstruct the central opening 1202. As such, the fluid flow pathway extends through the filter media 1210 and the endcap opening 1224.

Figure 30:
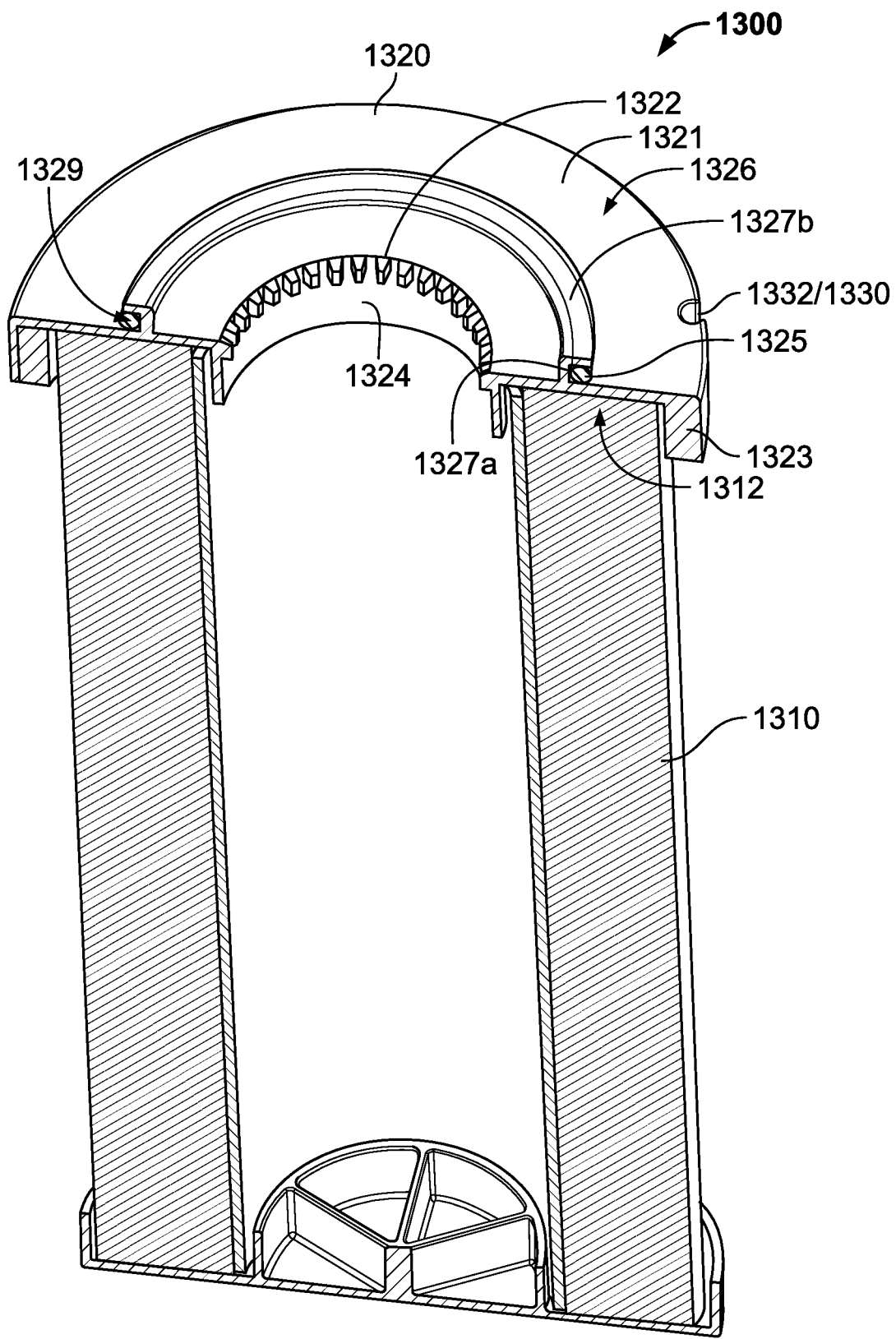
FIG. 30 is a perspective cross-sectional view of a second example filter element consistent with embodiments disclosed herein.

FIG. 30 depicts a perspective cross-sectional view of a second example filter element 1300 consistent with examples. The second example filter element 1300 is consistent with the description of the first example filter element 1200 (described above with reference to FIG. 29) except where inconsistent with FIG. 30 or the current description. Here a first endcap 1320 is coupled to a first media end 1312 of filter media 1310. The first endcap 1320 has an endcap opening 1324, a drive gear 1322 about the endcap opening 1324, a sealing structure 1326 disposed about the drive gear 1322 and a housing engagement member 1330 having a rotational obstruction feature 1332.

In this example, the housing engagement member 1330 is the rotational obstruction feature 1332 that is a pocket formed along the outer radial surface 1323 of the first endcap 1320. The pocket extends in the axial direction along the first endcap 1320. The pocket is configured to receive a corresponding protrusion of a filter housing such that the filter element 1300 is rotationally fixed to the filter housing. In some examples consistent with this embodiment there is no more than one rotational obstruction feature 1332. In some other examples consistent with this embodiment, there is more than one rotational obstruction feature 1332. While the pocket is depicted as extending through the outer facing surface 1321 of the first endcap 1320, in some embodiments the pocket does not extend through the outer facing surface 1321 of the first endcap 1320.

The sealing structure 1326 depicted in this example defines a radial seal. The sealing structure 1326 has a seal 1325 and a seal receptacle 1329 that receives the seal 1325. The seal receptacle 1329 is defined by the outer facing surface 1321 of the first endcap 1320, an annular ridge 1327a, and a rim 1327b. The annular ridge 1327a extends axially outward from the outer facing surface 1321 of the first endcap 1320 about the endcap opening 1324. The rim 1327b extends radially outward from the annular ridge 1327a. The rim 1327b is axially spaced from the outer facing surface 1321 of the first endcap 1320 to receive the seal 1325 therebetween. The radial seal is positioned radially outward from the drive gear 1322. More particularly, in this example the sealing structure 1326 defines an outer radial seal. The outer radial seal is configured to form a seal with an inner circumferential surface of a corresponding system. In some other examples the sealing structure 1326 can form an inner radial seal configured to form a seal with an outer circumferential surface of a corresponding system. Now various filter assemblies will be described.

Figure 31:
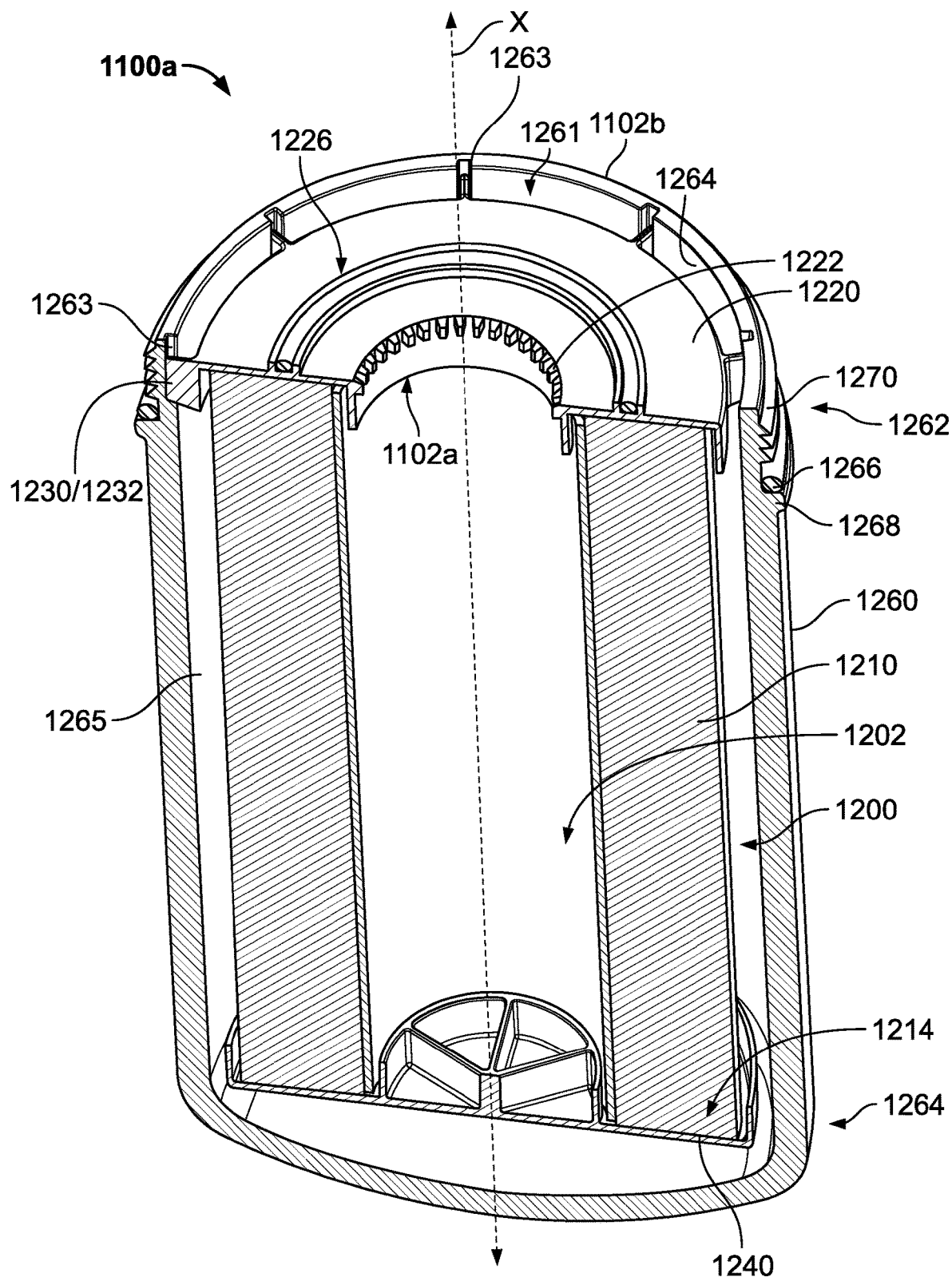
FIG. 31 is a perspective cross-sectional view of a first example filter assembly consistent with the system of FIG. 28.

FIG. 31 is a perspective cross-sectional view of a first example filter assembly 1100a that can be consistent with the system depicted in FIG. 28. The filter assembly 1100a is generally configured to filter liquids. The filter assembly 1100a has a filter element 1200 and a filter housing 1260. The filter assembly 1100a has a filter inlet 102a and a filter outlet 1104a. In the current example, the filter outlet 1104a surrounds the filter inlet 102a, but in some other examples, the filter inlet can surround the filter outlet.

The filter element 1200 is consistent with FIG. 29 and its corresponding description, above. The filter housing 1260 is generally configured to substantially receive the filter element 1200, where "substantially receives" means that the filter housing 1260 contains at least 90% of the volume of the filter element 1200. In the current example, the filter housing 1260 completely contains the filter element 1200, meaning that the entire filter element 1200 fits within the filter housing 1260. The filter housing 1260 is configured to define a fluid flow pathway between the filter housing 1260 and the filter element 1200. The filter outlet 1104a can be defined between the filter housing 1260 and the first endcap 1220.

The filter housing 1260 has a first housing end 1262 and a second housing end 1264. The first housing end 1262 defines a housing opening 1261 that is configured to receive the filter element 1200. The housing opening 1261 extends towards the second housing end 1264, and the second housing end 1264 extends across the housing opening 1261. The second housing end 1264 is configured to surround the second media end 1214. The second housing end 1264 is configured to surround the second endcap 1240.

The filter housing 1260 is coupled to the first endcap 1220. In particular, the first housing end 1262 is rotatably fixed to the first endcap 1220. As discussed above with reference to FIG. 29, the first endcap 1220 has a plurality of housing engagement members 1230 that include rotational obstruction features 1232 that are received by mating features 1263 of the filter housing 1260. Here the rotational obstruction features 1232 are radial protrusions extending radially outward from the first endcap 1220. Correspondingly, the mating features 1263 are radial slots extending outwardly from an inner surface 1265 of the filter housing 1260. Each radial protrusion 1232 is configured to be received by an axially and radially-aligned radial slot 1263. As such, the first endcap 1220 is coupled to filter housing 1260 and, more particularly, the first endcap 1220 is rotationally fixed to the filter housing 1260. In various embodiments consistent with the present example, the filter element 1200 is removable from the filter housing 1260 by translating the filter element 1200 axially out of the filter housing 1260.

The filter assembly 1100a has a screw thread 1270 coupled to the filter housing 1260 and the first endcap 1220. The screw thread 1270 is generally configured to engage a filter system. In particular, the screw thread 1270 is configured to engage a filter head. The screw thread 1270 is disposed about the central opening 1202. The screw thread 1270 is disposed about the housing opening 1261. In the current example, the screw thread 1270 is integral to the filter housing 1260, meaning that the filter housing 1260 defines the screw thread 1270. The screw thread 1270 extends axially along the first housing end 1262 circumferentially about the filter housing 1260 and about the central axis x.

A housing seal 1266 is disposed about the filter housing 1260 towards the first housing end 1262. The housing seal 1266 is generally configured to form a seal with system components such as a filter head upon complete installation of the filter housing 1260 to the system. The housing seal 1266 is proximate to the screw thread 1270 such that, upon fully coupling the screw thread to a filter head, the housing seal 1266 is configured to create a seal between the filter housing 1260 and the filter head. A lip 1268 extending radially outward from the filter housing 1260 receives the housing seal 1266 to maintain the axial position of the housing seal 1266 relative to the filter housing 1260. The screw thread 1270 is positioned axially between the first housing end 1262 and the lip 1268. The lip 1268 can be configured to compress the housing seal 1266 against mating components of the filter head upon installation, which is described in more detail below. The housing seal 1266 can be an o-ring in various embodiments. The housing seal 1266 can be a pinch seal in various embodiments.

As described above with reference to FIG. 29, the first endcap 1220 has a sealing structure 1226 that defines an axial seal. The axial seal 1226 is positioned radially between the drive gear 1222 and the screw thread 1270. In some embodiments, the first endcap can have an alternate sealing structure, such as a radial seal as described with reference to FIG. 30.

Figure 32:
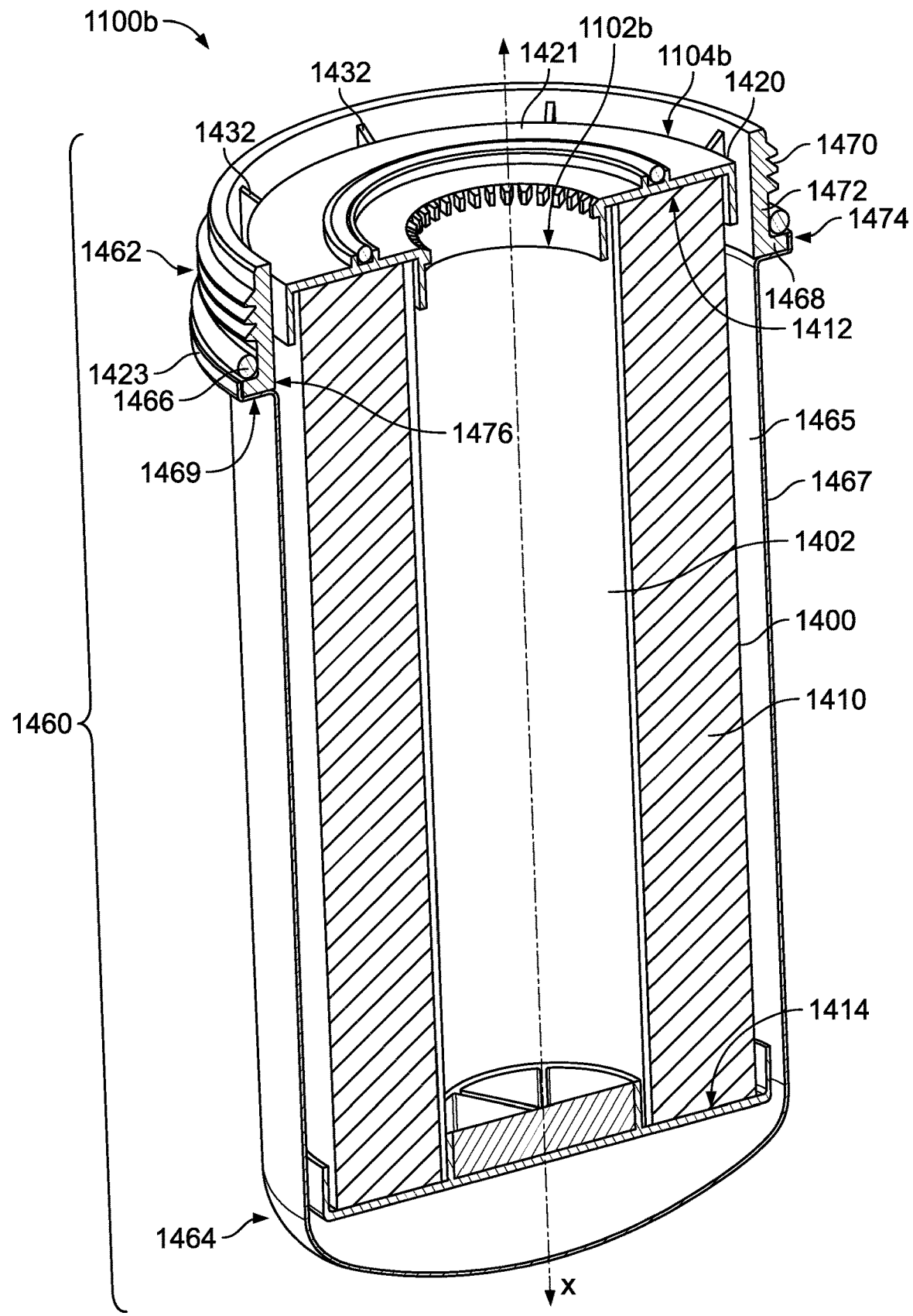
FIG. 32 is a perspective cross-sectional view of a second example filter assembly consistent with the system of FIG. 28.

FIG. 32 is a perspective cross-sectional view of a second example filter assembly 1100b that can be consistent with the system depicted in FIG. 28. The filter assembly 1100b is generally configured to filter liquids. The filter assembly 1100b is similar to the filter assembly described above with reference to FIG. 30, except where contradictory to the present description or figure. The filter assembly 1100b has a filter element 1400 and a filter housing 1460. The filter assembly 1100b has a filter inlet 1102b and a filter outlet 1104b. In the current example, the filter outlet 1104b surrounds the filter inlet 1102b, but in some other examples, the filter inlet can surround the filter outlet.

The filter element 1400 can generally be consistent with other filter elements described herein except that, in the current example, a first endcap 1420 of the filter element 1400 is fixed to a threaded component 1472 defining the screw thread 1470. In particular, the threaded component 1472 of the filter housing 1460 is fixed to an outer radial surface 1423 of the first endcap 1420 towards the first housing end 1462. The filter housing 1460 is fixed to the outer radial surface 1423 of the first endcap 1420 about the central axis x and the central opening 1402. The filter housing 1460 is fixed to the outer radial surface 1423 of the first endcap 1420 about the filter media 1410.

In this particular example, a series of braces 1432 extend radially outward from the outer radial surface 1423 of the first endcap 1420 to the inner surface 1465 of the filter housing 1460. Each brace 1432 in the series of braces is fixed to the outer radial surface 1423 of the first endcap 1420 on one end and, on an opposite end, is fixed to the inner surface 1465 of the filter housing 1460. Each brace 1432 spans a radial gap between the outer radial surface 1423 of the first endcap 1420 and the inner surface 1465 of the filter housing 1460. In various embodiments, the first endcap 1420 forms a single, unitary structure with the threaded component 1472 defining the screw thread 1470. In such embodiments, the first endcap 1420 and the screw thread 1470 can be formed through a single molding operation or machined from a single piece of material.

While the current example reflects a plurality of braces, in some embodiments a single brace can be used to fix the first endcap 1420 to the filter housing 1460. Also, in some embodiments one or more braces can fix an outer facing surface 1421 of the first endcap 1420 to the filter housing 1460.

In the current example, the threaded component 1472 defines a portion of the filter housing 1460, such as the first housing end 1462 of the filter housing 1460. The threaded component 1472 partially defines the housing opening 1461. The threaded component 1472 can be fixed to a remaining housing portion 1467 of the filter housing 1460. In some embodiments, where the threaded component 1472 and the first endcap 1420 are molded as a single, unitary structure, the threaded component 1472 and the remaining housing portion 1467 can be fixed together through the use of adhesive, fasteners, or the like. In some embodiments, such as that depicted in FIG. 32, an end region 1469 of the remaining housing portion 1467 is crimped over a proximate end 1476 of the threaded component 1472 about the housing opening 1461 and the central axis x, where the proximate end of the threaded component 1472 is axially opposite the end of the threaded component 1472 forming the first housing end 1462.

A housing seal 1466 (such as described above with reference to FIG. 31) proximate the screw thread 1470 can be positioned over the joint between the threaded component 1472 and the remaining housing portion 1467. In some embodiments the housing seal 1466 can be configured to bolster the bond between the threaded component 1472 and the remaining housing portion 1467. In the current example, the lip 1468 upon which the housing seal 1466 is positioned is defined by the threaded component 1472. The remaining housing portion 1467 is crimped to the threaded component 1472 around the lip 1468. Upon installation of such an assembly in a filter head (which will be described in more detail below), the housing seal 1466 can be configured to reinforce the seal between the threaded component 1472 and the remaining housing portion 1467. The housing seal 1466 is otherwise consistent with the housing seal 1466 discussed above with reference to FIG. 31.

Figure 33:
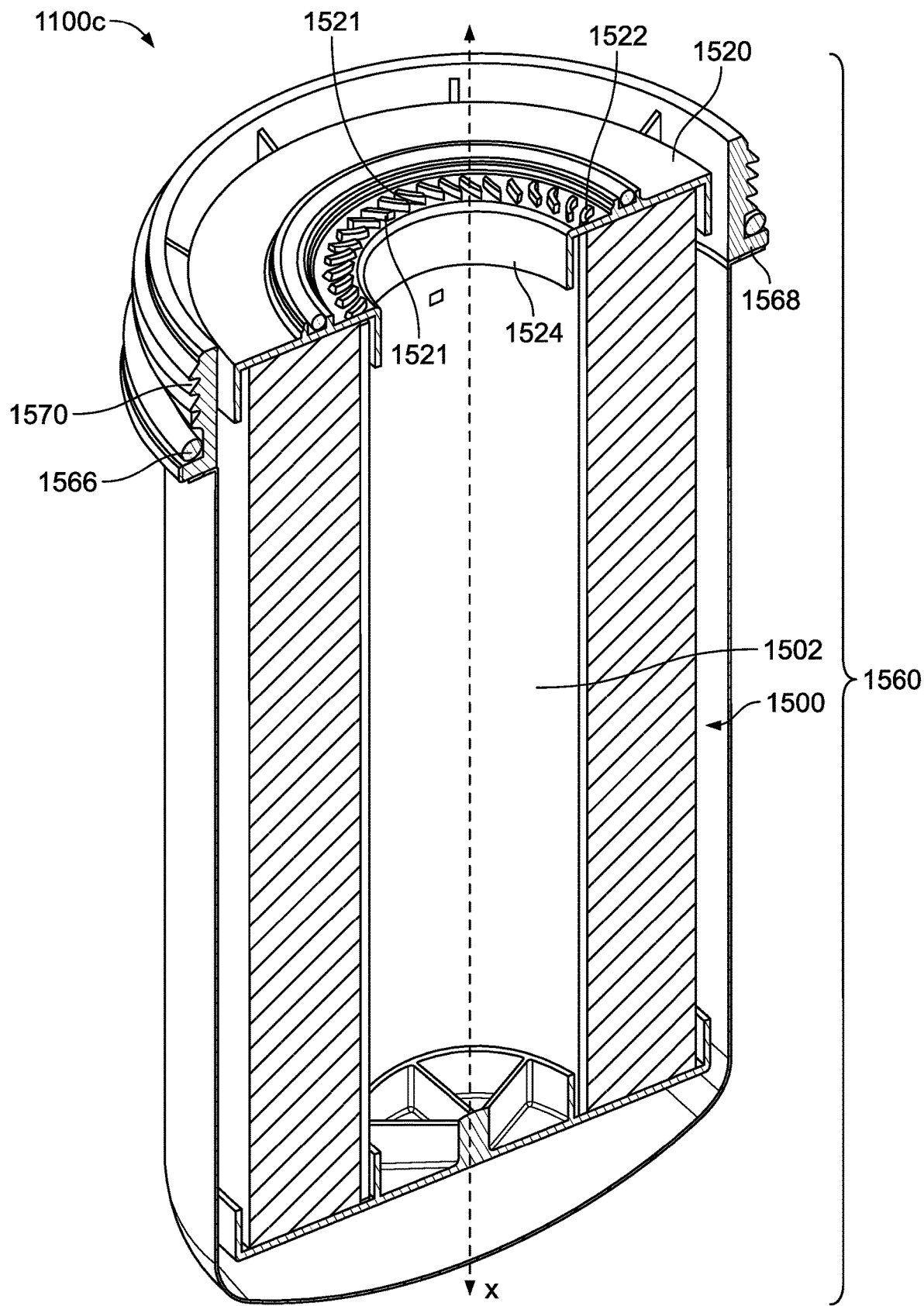
FIG. 33 is a perspective cross-sectional view of a third example filter assembly consistent with the system of FIG. 28.

FIG. 33 is a perspective cross-sectional view of a third example filter assembly 1100c. The third example filter assembly 1100c can be consistent with the system depicted in FIG. 28. The filter assembly 1100c is similar to the second example filter assembly 1100b discussed above with reference to FIG. 32, except where contradictory to the present description or figure. The filter assembly 1100c has a filter element 1500 and a filter housing 1560. The filter element 1500 is generally consistent with other filter elements described herein, and the filter housing 1560 is generally consistent with other filter housings described herein.

In this example, a first endcap 1520 of the filter element 1500 defines a drive gear 1522 about the central opening 1502 that is a worm gear drive 1522. The worm gear drive 1522 is configured to mesh with a worm gear in a corresponding system within which the filter assembly 1100c is installed, which will be discussed in more detail, below. The worm gear drive 1522 defines a plurality of gear teeth 1521 about the endcap opening 1524. In contrast to the example discussed with reference to FIG. 29, here the gear teeth 1521 do not extend into the endcap opening 1524. In the current example, the drive gear 1522 can be a face worm gear drive, meaning that the gear teeth 1521 are parallel to/or project from a plane that is substantially perpendicular to the central axis x. "Substantially perpendicular" is used herein to mean within 5° of perpendicular to the central axis x. The drive gear 1522 can also be a bevel worm gear drive, meaning that the gear teeth 1521 are defined on a surface non-perpendicular to the axis of rotation of the gear (which is the central axis x).

Figure 34:
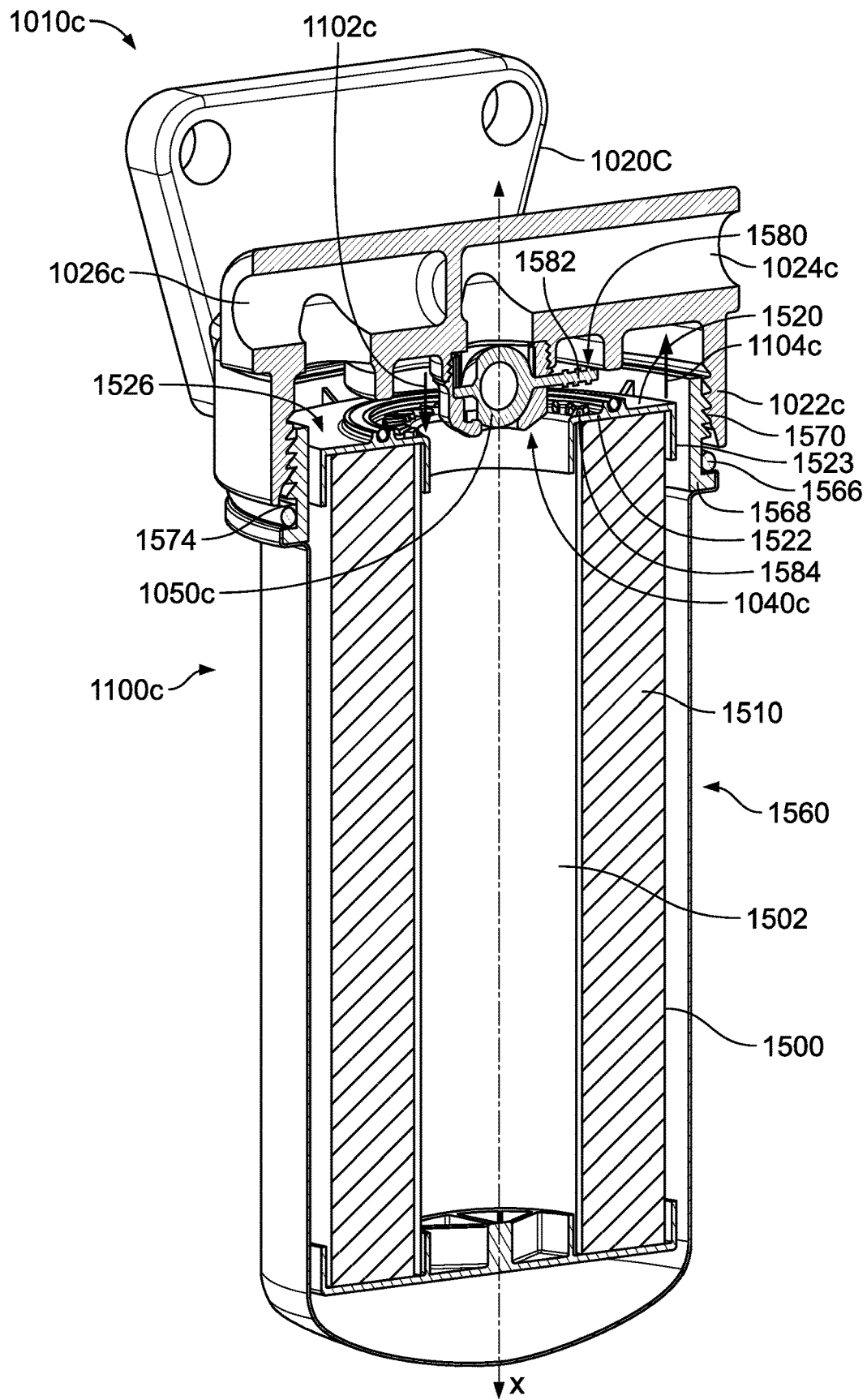
FIG. 34 is a first perspective cross-sectional view of a first example system consistent with FIG. 28.
Figure 35:
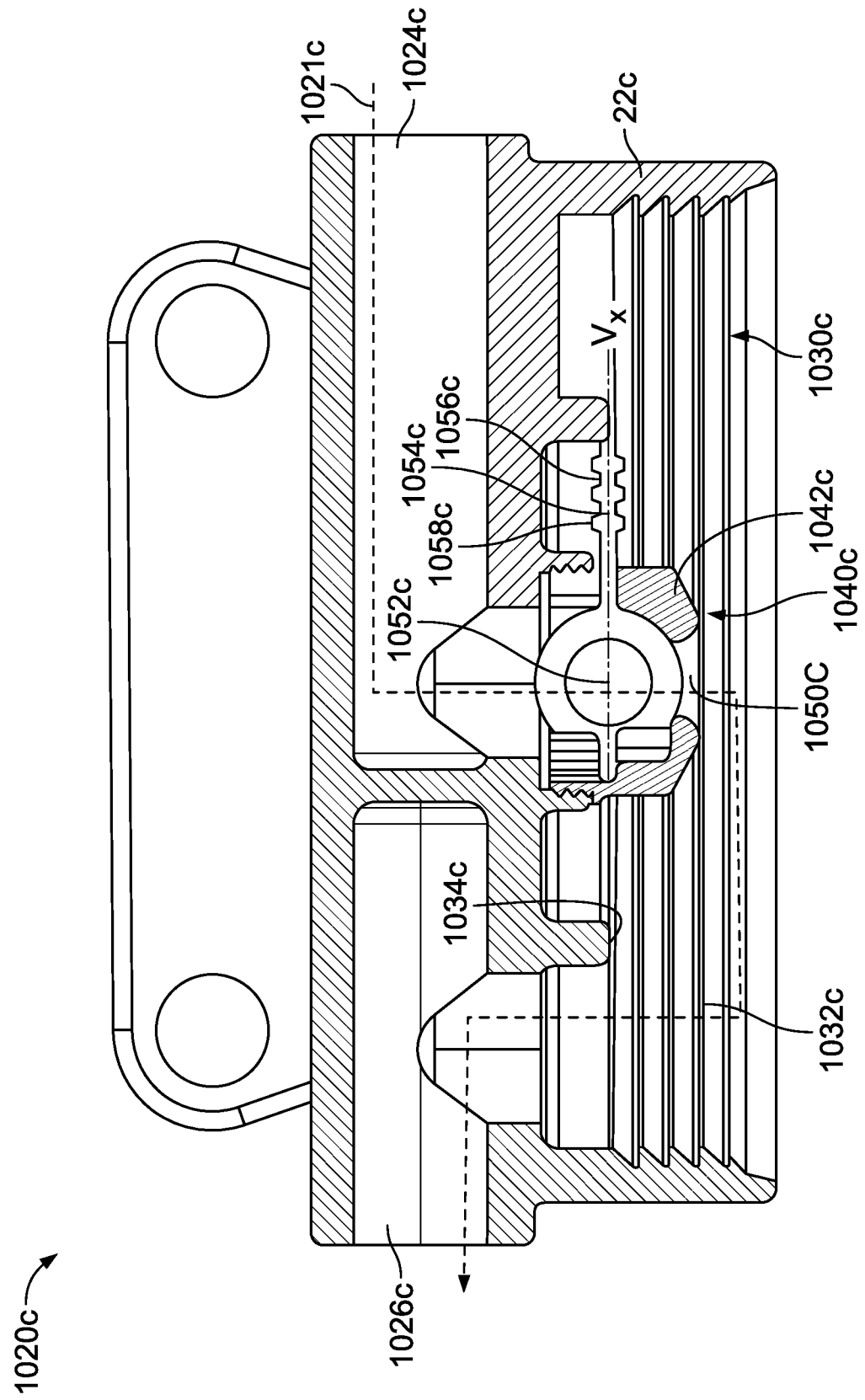
FIG. 35 is a cross-sectional view of a filter head consistent with FIG. 34.
Figure 36:
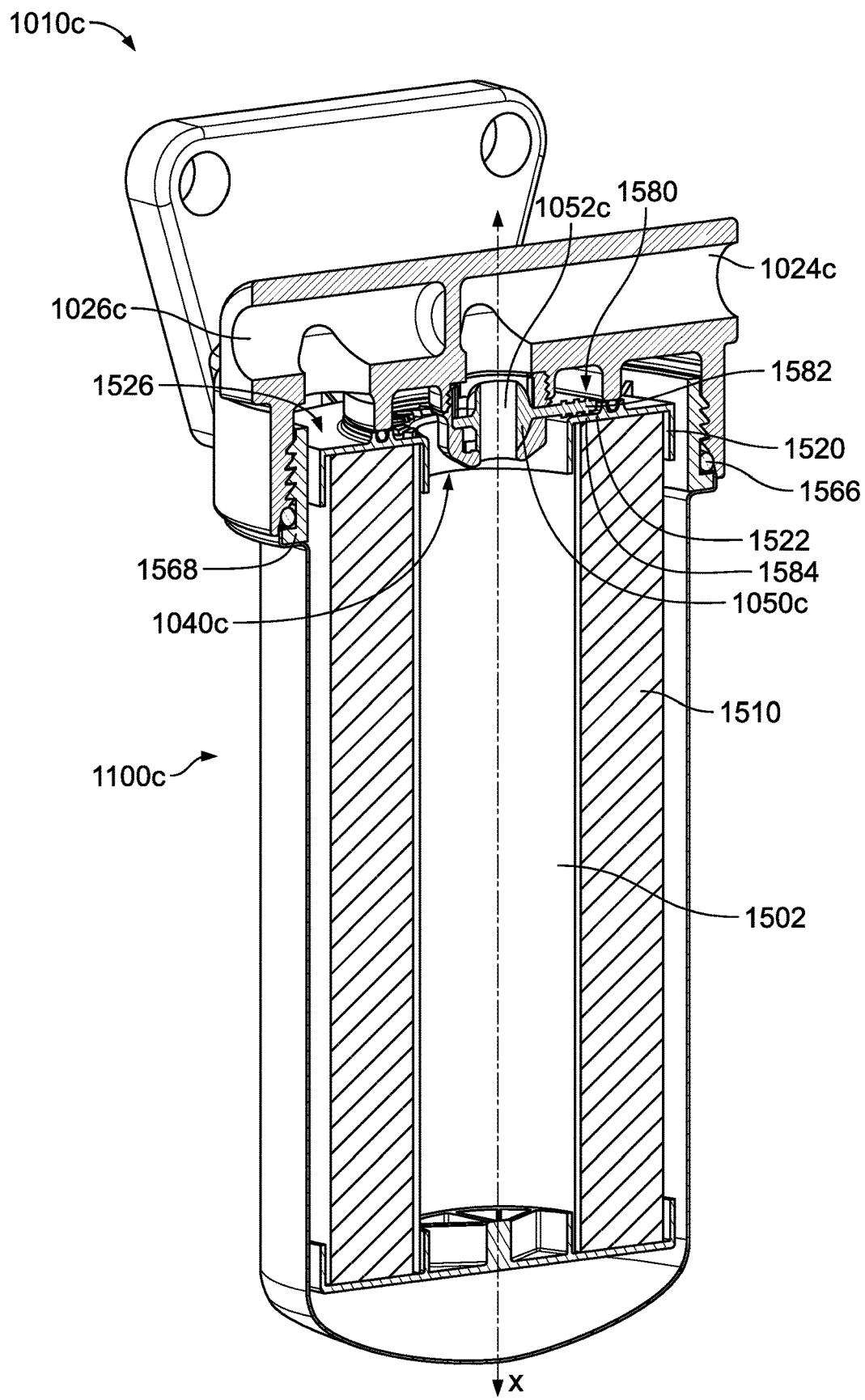
FIG. 36 is a second perspective cross-sectional view of the first example system of FIG. 34.

FIG. 34 depicts a perspective cross-sectional view of an example filter system 1010c consistent with the system depicted in FIG. 28. The filter system 1010c incorporates a filter assembly 1100c consistent with FIG. 33, which has a filter element 1500 and a filter housing 1560. The filter element 1500 and the filter housing 1560 are each consistent with the descriptions of filter elements and filter housings herein. The filter assembly 1100c is configured to be installed in a filter head 1020c where the filter housing 1560 and the filter head 1020c encase the filter media 1510. FIG. 35 is a cross-sectional view of the filter head 1020c alone. FIG. 34 depicts the filter system 1010c with the filter assembly 1100c uninstalled, and FIG. 36 depicts the filter system 1010c with the filter assembly 1100c installed in the filter head 1020c.

The filter head 1020c is configured to be coupled to a filter assembly 1100c. The filter head 1020c has a filter connecting structure 1022c that is configured to couple to the filter assembly 1100c. In particular, the filter connecting structure 1022c has a filter assembly opening 1030c that is configured to receive a portion of the filter assembly 1100c and a first screw thread 1032c defined about the filter assembly opening 1030c that is configured to engage a mating screw thread 1570 of the filter assembly 1100c. The mating screw thread 1570 generally extends about the filter housing 1560 of the filter assembly 1100c, which has been described above with reference to the screw threads depicted in FIGS. 31-33. The mating screw thread 1570 is configured to engage the first screw thread 1032c of the filter head 1020c upon insertion of the filter assembly 1100c into the filter assembly opening 30c and rotation of the filter assembly 1100c relative to the filter head 1020c within the filter assembly opening 1030c.

The filter head 1020c has a system inlet 1024c and a system outlet 1026c and defines a fluid flow pathway 1021c selectively extending from the system inlet 1024c to the system outlet 1026c through the filter assembly opening 1030c. The filter head 1020c has a valve assembly 1040c disposed in the fluid flow pathway 1021c. The valve assembly 1060c has a valve 1050c having an open position and a closed position, where FIGS. 34 and 35 depict the valve 1050c in the closed position. FIG. 36 is a perspective cross-sectional view of the system of FIG. 34 with the valve 1050c in the open position. When the valve 1050c is in the open position, the fluid flow pathway 1021c extends from the system inlet 1024c to the filter assembly opening 1030c. When the valve 1050c is in the closed positioned, the fluid flow pathway 1021c is obstructed between the system inlet 1024c and the filter assembly opening 1030c.

The valve assembly 1040c can have a variety of different configurations. In some embodiments consistent with FIGS. 34-36, the valve assembly 1040c has a valve housing 1042c fixed to the filter head 1020c and a valve 1050c operatively disposed in the valve housing 1042c. In this example, the valve 1050c is a ball valve defining a valve opening 1052c. The valve 1050c is rotatably disposed in the filter head 1020c and, more particularly, in the valve housing 1042c. The valve 1050c is configured to be rotated to bring the valve opening 1052c into fluid communication with the fluid flow pathway 1021c in the "open" position. The valve 1050c is also configured to be rotated to bring the valve opening 1052c out of fluid communication with the fluid flow pathway 1021c to obstruct fluid flow through the fluid flow pathway 1021c in the "closed" position.

In the presently-described example, the valve 1050c has a rotational axis vx. The rotational axis vx (see FIG. 35) is perpendicular to the central axis x in this example, but in some other embodiments the rotational axis vx can have a different orientation relative to the central axis x. For example, in some embodiments the rotational axis vx of the valve can be parallel to the central axis x. Other types of valves can certainly be used in systems consistent with the current technology such as a gate valve, flue valve, piston valve, plug valve, and the like. In some such embodiments, the valve is not rotatable within the filter head but, rather, is linearly or otherwise translatable relative to the fluid pathway to selectively obstruct the fluid pathway.

Regardless of the specific type of valve implemented in the filter head, the system generally has a mating gear arrangement that is configured to be in mechanical communication with the valve to translate the valve from a closed position to an open position during installation of the filter assembly in the filter head. In some embodiments, the mating gear arrangement is configured to translate the valve from an open position to a closed position during removal of the filter assembly from the filter head.

With specific reference to FIGS. 34-36, the filtration system 1010c has a mating gear arrangement 1580 is that operatively coupled to the valve 1050c. The mating gear arrangement 1580 is configured to translate the valve 1050c from the closed position (FIGS. 34-35) to the open position (FIG. 36). In this example the mating gear arrangement 1580 is also configured to translate the valve 1050c from the open position to the closed position. The mating gear arrangement 1580 has a first portion 1582 and a second portion 1584. The first portion 1582 and the second portion 1584 are mating gears. The first portion 1582 of the mating gear arrangement 1580 is a component of the filter head 1020c and the second portion 1584 is a component of the filter assembly 1100c. The second portion 1584 of the mating gear arrangement 1580 is a drive gear and, more specifically, a worm gear drive 1522 described above with reference to FIG. 33. In various embodiments, the second portion 1584 of the mating gear arrangement 1580, in particular the drive gear 1522, has a rotational axis that is collinear with the central axis x.

The first portion 1582 of the mating gear arrangement 1580 is configured to be driven by the drive gear 1522 that is the second portion 1584 of the mating gear arrangement 1580. As such, in various embodiments the first portion 1582 of the mating gear arrangement 1580 is a driven gear 1054c. Specific to this example, here the first portion 1582 of the mating gear arrangement 1580 is a worm gear 1054c. The worm gear 1054c is configured to be received by the worm drive gear forming the second portion 1584 of the mating gear arrangement 1580. The worm gear 1054c generally has a cylindrical projection 1056c extending along a rotational axis vx having a helical screw thread 1058c about the cylindrical projection 1056c about the rotational axis vx. Other worm gear configurations are possible.

The first portion 1582 of the mating gear arrangement 1580 is operatively coupled to the valve 1050c. In particular, in the current example, the first portion 1582 of the mating gear arrangement 1580 is fixed to the valve 1050c. In various embodiments the first portion 1582 and the valve 1050c form a single, unitary structure. In the current example, the worm gear of the first portion 1582 of the mating gear arrangement 1580 extends outwardly from the valve 1050c along the rotational axis vx of the valve 1050c. The first portion 1582 of the mating gear arrangement 1580 defines a rotational axis that is perpendicular to the central axis x. In particular, in the present example the rotational axis of the first portion 1582 of the mating gear arrangement 1580 is the rotational axis vx of the valve 1050c. In some embodiments the first portion 1582 of the mating gear arrangement 1580 defines a rotational axis parallel to the central axis x.

As mentioned above, FIG. 34 depicts the system before installation of the filter assembly 1100c in the filter head 1020c. As the filter assembly 1100c is installed in the filter head 1020c, the filter assembly 1100c is rotated in the filter head 1020c such that the mating screw thread 1570 of the filter assembly 1100c engages the first screw thread 1032c of the filter head 1020c. As the filter assembly 1100c is rotated, the filter assembly 1100c translates axially into the filter assembly opening 1030c, which translates the second portion 1584 of the mating gear assembly 1580 (e.g., the drive gear 1522) towards the first portion 1582 of the mating gear assembly 1580 (e.g., the driven gear 1054c). The second portion 1584 of the mating gear assembly 1580 is brought into axial alignment and operational engagement with the first portion 1582 of the mating gear assembly 1580. After the mating gear assembly 1580 is in operational engagement, further rotation of the filter assembly 1100c relative to the filter head 1020c (to complete installation) causes the second portion 1584 to transmit rotational motion to the first portion 1582 of the mating gear arrangement 1580, which results in the opening of the valve 1050c as seen in FIG. 36.

While the present disclosure described in examples mating gear arrangements having two mating gears, other configurations are certainly contemplated that incorporate additional mating gears. For example, the mating gear arrangement can have a third portion that is a gear configured to transmit rotational motion from the second portion to the first portion. The mating gear arrangement can additionally have a fourth portion and a fifth portion that are gears in mechanical communication with the first portion and second portion. Furthermore, the mating gear arrangement can incorporate additional mechanisms other than the gears that are in mechanical communication with the valve and the mating gear arrangement.

As can be appreciated from a review of the FIGS., the valve 1050c is part of a valve arrangement including a valve shaft, such as first portion 1582, having a fluid flow bore, and valve gear teeth, such as mating gear assembly 1582 projecting from the valve shaft, constructed and arranged to receive a force to rotate the valve shaft. The shaft/first portion 1582 has opposite first ends and second ends with a longitudinal axis passing through the first and second ends. The fluid flow bore has a central axis rotatable between perpendicular and parallel to the longitudinal axis. The valve gear teeth can project from the second end of the shaft. The valve gear teeth can project radially from the second end of the shaft.

The filter system 1010c has a sealing structure 1526 that can be similar to sealing structures discussed herein. The sealing structure 1526 extends around the central axis x and around the central opening 1502. The sealing structure 1526 is configured to form a seal between the filter head 1020c and the filter assembly 1100c about the central opening 1502 to fluidly isolate the filter inlet 1102c from the filter outlet 1104c. Upon installation of the filter assembly 1100c to the filter head 1020c, the sealing structure 1526 prevents fluid flow from the system inlet 1024c to the system outlet 1026c except through the filter media 1510. The sealing structure 1526 is positioned radially inward from the mating screw thread 1570. More particularly, the sealing structure 1526 is positioned radially inward from the outer radial surface 1523 of the first endcap 1520. In the current example, the sealing structure 1526 defines an axial seal, but in other examples the sealing structure can define a radial seal. The filter head 1020c defines an axial sealing surface 1034c that is configured to abut the sealing structure 1526 about the central opening 1502. In the current example, the axial sealing surface 1034c is an annular surface defined about the central axis x.

The filter system 1010c has a housing seal 1566 disposed about the filter housing 1560. In particular, the housing seal 1566 is disposed on a lip 1568 of the filter housing 1560. The housing seal 1566 is configured to be positioned between the filter housing 1560 and the filter head 1020c to prevent fluid flow there-through. The housing seal 1566 abuts an axial end 1574 of the threaded connection between the housing seal 1566 and filter housing 1560 about the filter housing 1560. Upon installation of the filter assembly 1100c in the filter head 1020c, the housing seal 1566 is compressed between the filter assembly 1100c and the filter head 1020c.

Figure 37:
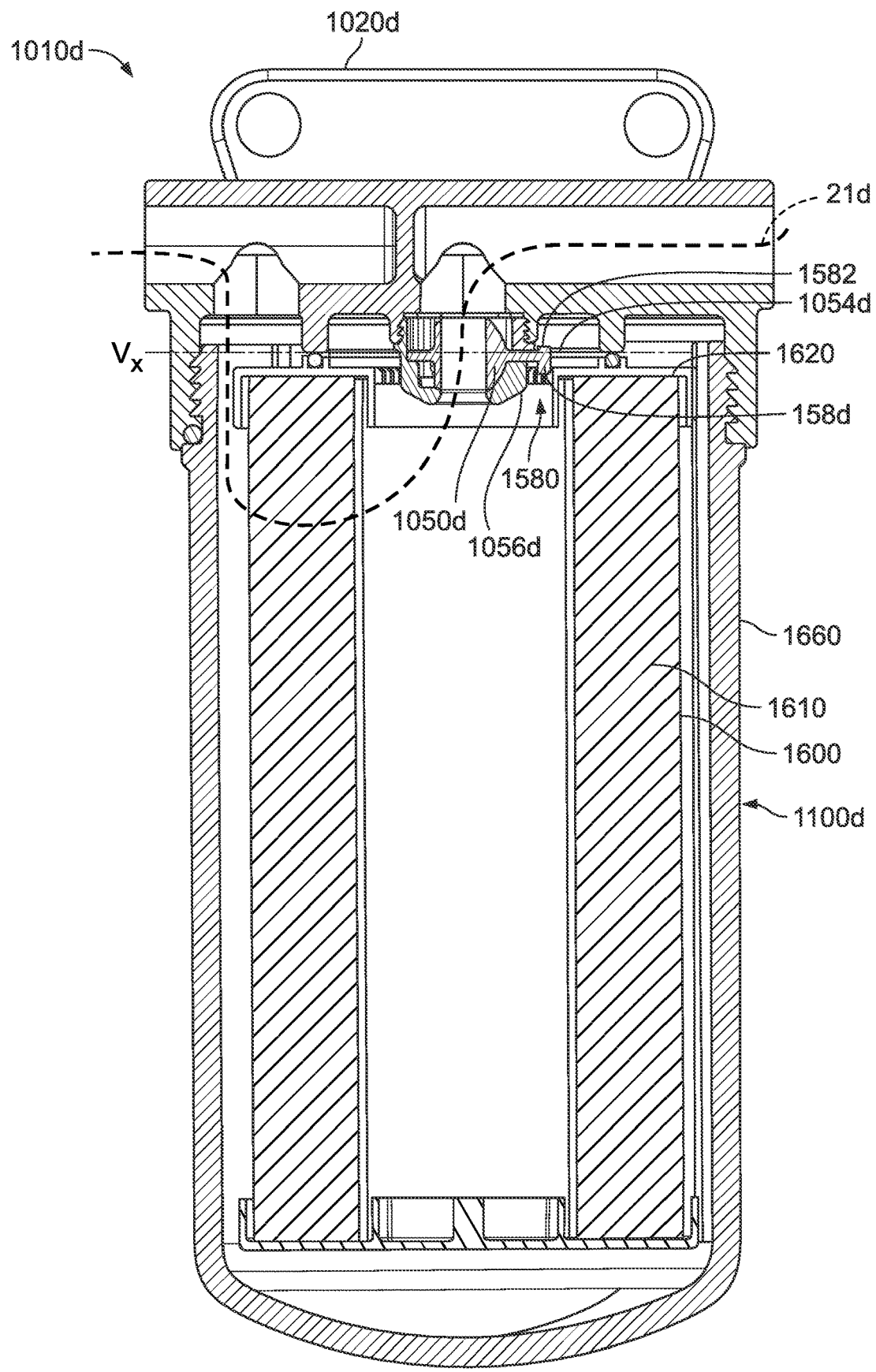
FIG. 37 is a cross-sectional view of a second example system consistent with FIG. 28.

FIG. 37 depicts a second example system 1010d consistent with various embodiments. The system 1010d is consistent with the system depicted in FIG. 28. The system has a filter assembly 1100d that can be consistent with the filter assemblies disclosed with reference to FIG. 31 or 32. That is, the filter assembly 1100d has a filter element 1600 disposed in a filter housing 1660, where the filter element 1600 has a first endcap 1620 coupled to the filter housing 1660 via (1) a housing engagement member having a rotational obstruction feature that is received by a mating feature of the filter housing 1660 (as described with reference to FIG. 34), or (2) one or more braces that fix the first endcap 1620 to the filter housing 1660 (as described with reference to FIG. 32).

The second system 1010d can be consistent with the description of the first system discussed above with reference to FIGS. 34-36 except for where contradictory to FIG. 37 and the corresponding description herein. In particular, in the current example, a mating gear arrangement 1580 has a different configuration than the example described above. The mating gear arrangement 1580, which is operatively coupled to the valve 1050d, can be a bevel gear arrangement. In some such embodiments the mating gear arrangement 1580 can be a miter gear arrangement. The first portion 1582 of the mating gear arrangement 1580 is a pinion gear 1054d in this example. The pinion gear 1054d has a plurality of teeth 1058d extending radially outward from a cylindrical projection 1056d. The pinion gear 1054d has a rotational axis vx and the plurality of teeth 1058d are spaced about the rotational axis vx. In some such embodiments the pinion gear 1054d can be a ratchet gear.

Figure 38:
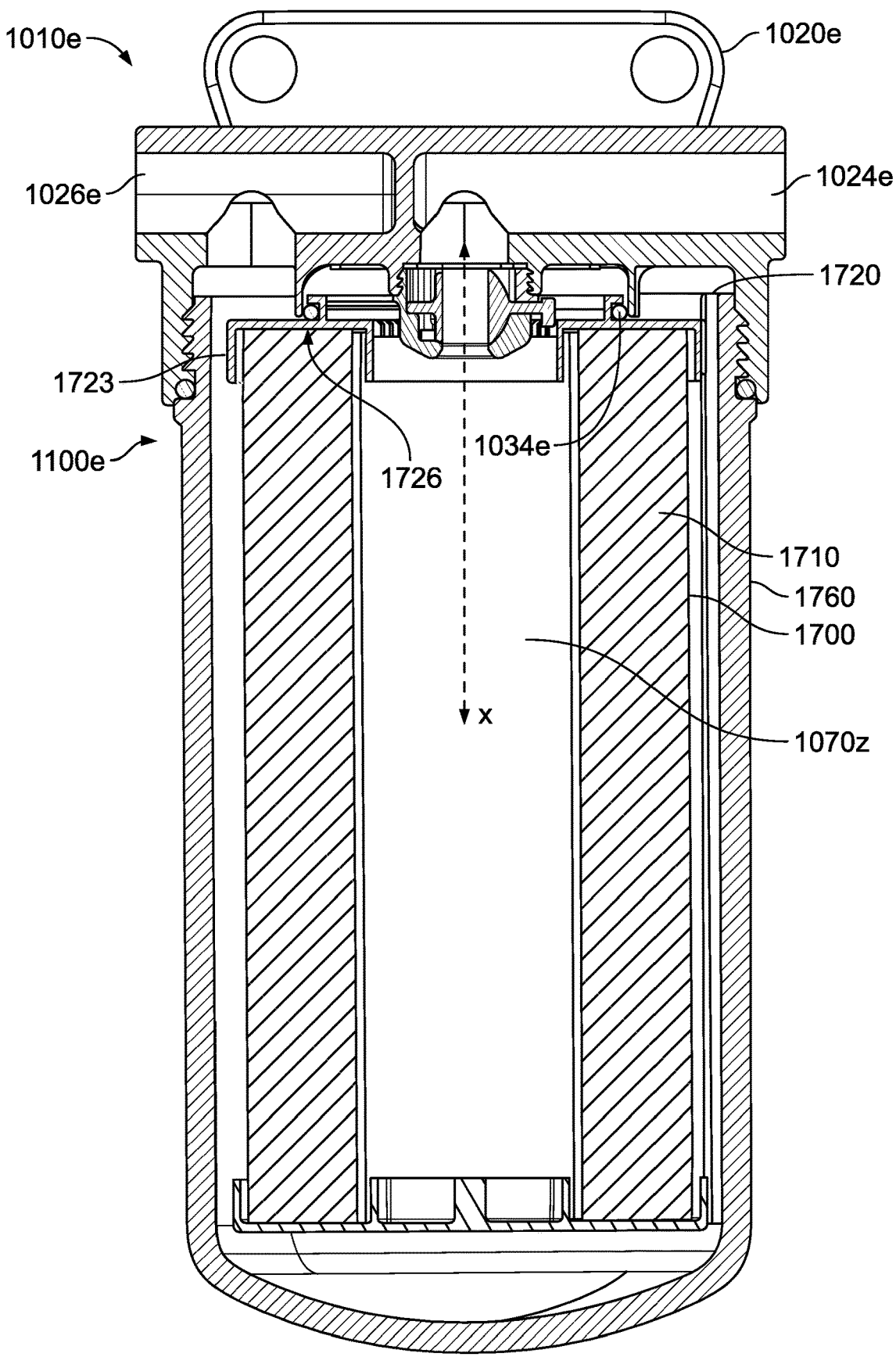
FIG. 38 is a cross-sectional view of a third example system consistent with FIG. 28.

FIG. 38 depicts a third example system 1010e consistent with various embodiments. The system 1010e is consistent with the system depicted in FIG. 28. The system has a filter assembly 1100e having a filter element 1700 disposed in a filter housing 1760, where the filter element 1700 has a sealing structure 1726 consistent with that described above with reference to FIG. 30. The filter element 1700 and the filter housing 1760 can have features consistent with filter elements and filter housings described throughout this document.

In the present example, the sealing structure 1726 extends around the central axis x and around the central opening 1702. The sealing structure 1726 is configured to form a seal between the filter head 1020e and the filter assembly 1100e about the central opening 1702. Upon installation of the filter assembly 1100e to the filter head 1020e, the sealing structure 1726 prevents fluid flow from the inlet 1024e to the outlet 1026e except through the filter media 1710. The sealing structure 1726 is positioned radially inward from the mating screw thread 1770. More particularly, the sealing structure 1726 is positioned radially inward from the outer radial surface 1723 of the first endcap 1720. In the current example, the sealing structure 1726 defines a radial seal, but in other examples the sealing structure can define an axial seal. The filter head 1020e defines a radial sealing surface 1034e that is configured to abut the sealing structure 1726 about the central opening 1702. In the current example, the radial sealing surface 1034e is an inner radial surface defined about the central axis x. In some other embodiments, the sealing structure 1726 can define and inner radial sealing surface and the mating sealing surface of the filter head can be an outer radial surface.

As can be appreciated from FIGS. 29-38, there is provided a filter cartridge or element 1200, 1300, 1400, 1500, 1600, 1700 including a filter media construction/media 1210 and a set of cartridge gear teeth 1221 attached to the filter media construction. In some embodiments, the cartridge gear teeth 1221 can be part of a ring member and be circumferentially spaced from each other. The filter media construction may include pleated media in a tube shape surrounding an open interior volume having first and second opposite ends. The cartridge can include a first end cap secured to the first end of the filter media construction, in which the first end cap has an opening in communication with the open interior volume. The ring member can be part of the first end cap. The filter cartridge may also include a radially directed seal member secured to the first end cap. The pleated media can have inner pleat tips and outer pleat tips, and the seal member can be positioned spaced radially from both the inner pleat tips and outer pleat tips. In example embodiments, the cartridge further includes a second end cap secured to a second end of the filter media construction. The filter cartridge can further include a housing with an interior holding the filter media construction within the interior. The housing can have externally directed threads for connection with the filter head.

As can also be appreciated from the above, the filter head 1020 can be part of a filter head arrangement comprising: a fluid inlet 1024; and a valve arrangement wherein valve projections/drive gear 1222 are constructed and arranged to receive a force to rotate the valve shaft/portion 1582 between an open position and a closed position. The open position aligns the fluid flow bore with the fluid inlet; and the closed position blocks fluid flow from the fluid inlet.

F. Example Method, FIG. 39

Figure 39:
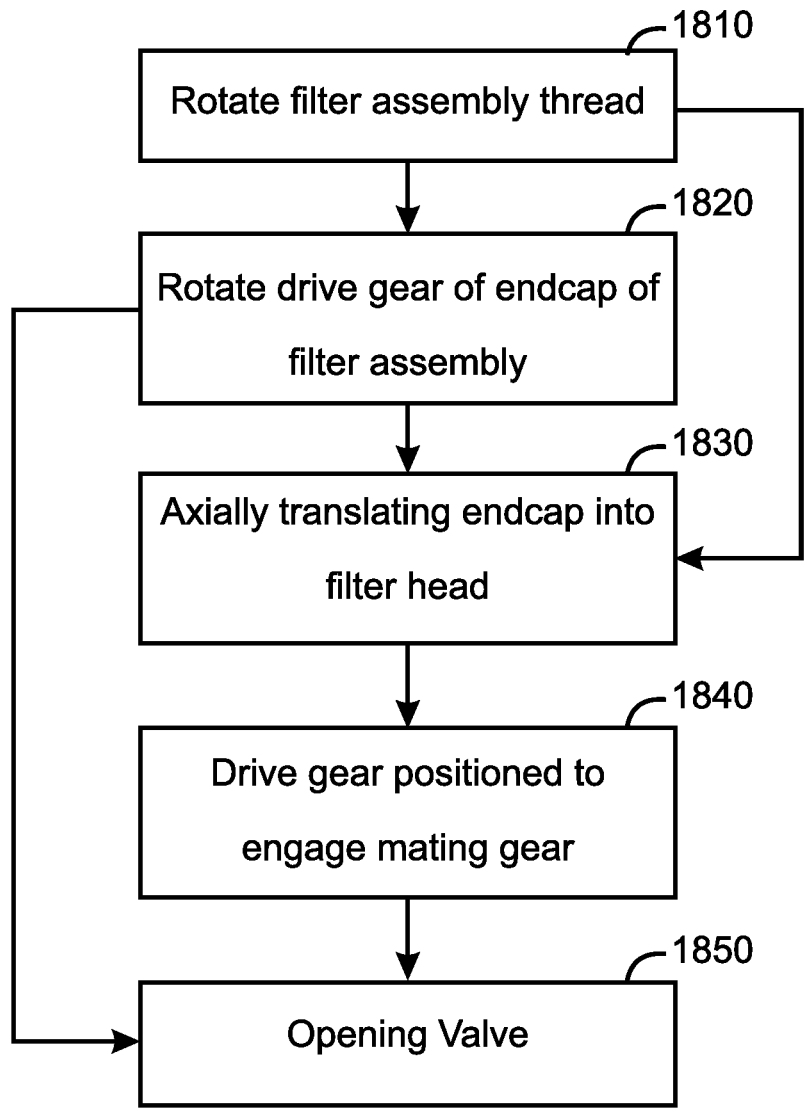
FIG. 39 is a flow chart consistent with various embodiments.

FIG. 39 is a flow chart of an example method 1800 consistent with various embodiments. The method 1800 can correspond to the systems described herein. A filter assembly screw thread is rotated relative to a mating screw thread 1810. A drive gear of an endcap, such as the cartridge projections or teeth, of the filter assembly is rotated 1820. The endcap is axially translated into a filter head 1830. A drive gear is positioned to engage a mating gear 1840, such as projections/teeth from a valve shaft. A valve is opened 1850.

The filter assembly screw thread is rotated 1810 to install the filter assembly to a system. The filter assembly is rotated 1810 relative to a mating screw thread of the system. The filter assembly, filter assembly thread, and the mating screw thread can be consistent with descriptions herein. The filter assembly screw thread can be rotated 1810 by a user manually rotating the filter assembly to couple the filter assembly to a filter head. The rotation of the filter assembly 1810 results in rotation of a drive gear/cartridge projections of the endcap of the filter assembly, where the drive gear and the endcap of the filter assembly can be consistent with the descriptions herein.

As the filter assembly screw thread is rotated 1810 to engage mating screw thread of a filter head, the endcap axially translates into the filter head 1830, such as into the filter assembly opening (described above with reference to FIGS. 34-36) defined by the filter head 1830. The axial translation of the endcap into the filter head 1830 positions the drive gear to engage a mating gear 1840. In various embodiments, positioning the drive gear to engage the mating gear 1840 results in axial alignment between the gears. The drive gear can be a component of the endcap, and the mating gear (e.g., projections or teeth on the valve shaft) can be a component of the filter head, as described above. When the drive gear engages the mating gear, further rotation of the filter assembly (and, therefore the drive gear) results in rotation of the mating gear. Rotation of the mating gear results in opening of the valve 1850, where the valve is consistent with those already discussed herein. In particular, rotation of the mating gear can result in rotation of the valve about a rotational axis. Rotation of the valve about the rotational axis can result in opening of the valve 1850. As discussed above, in some embodiments the rotational axis is perpendicular to the central axis, and in some other embodiments the rotational axis is parallel to the central axis.

G. Example Embodiments

Embodiment 1. A valve arrangement comprising: (a) a valve shaft having a fluid flow bore; and (b) projections extending from the valve shaft, constructed and arranged to receive a force to rotate the valve shaft.

Embodiment 2. The valve arrangement of embodiment 1 wherein: (a) the shaft has opposite first and second ends with a longitudinal axis passing through the first and second ends; and (b) the fluid flow bore has a central axis perpendicular to the longitudinal axis.

Embodiment 3. The valve arrangement of any one of embodiments 1 and 2 wherein the fluid flow bore has a non-circular perimeter shape.

Embodiment 4. The valve arrangement of embodiment 3 wherein the fluid flow bore has an oval perimeter shape.

Embodiment 5. The valve arrangement of any one of embodiments 2-4 wherein the projections extend from the second end of the shaft.

Embodiment 6. The valve arrangement of any one of embodiments 2-4 wherein the projections extend radially from the second end of the shaft.

Embodiment 7. The valve arrangement of any one of embodiments 1-6 wherein the projections are gear teeth projecting from the valve shaft, constructed and arranged to receive a force to rotate the valve shaft.

Embodiment 8. The valve arrangement of embodiment 7 wherein the valve gear teeth include at least two teeth circumferentially spaced from each other.

Embodiment 9. The valve arrangement of embodiment 7 wherein the valve gear teeth include at least three teeth circumferentially spaced from each other.

Embodiment 10. The valve arrangement of embodiment 7 wherein the valve gear teeth include from 2-10 teeth circumferentially spaced from each other.

Embodiment 11. The valve arrangement of any one of embodiments 1-10 wherein the valve gear teeth are spur gear teeth.

Embodiment 12. The valve arrangement of any one of embodiments 1-11 wherein the shaft is cylindrical with a circumference, and the projections extend along no more than a 180° arc along the circumference.

Embodiment 13. The valve arrangement of embodiment 12 wherein the projections extend along no more than a 150° arc along the circumference.

Embodiment 14. A liquid filter assembly using the valve arrangement of any one of embodiments 1-13, wherein: (a) the filter assembly has an unfiltered liquid inlet, a filter cartridge to filter incoming liquid, and a filtered liquid outlet; and (b) the valve arrangement controls a volume of flow through the unfiltered liquid inlet to the filter cartridge.

Embodiment 15. A filter cartridge comprising: (a) a filter media construction; and (b) a set of cartridge projections attached to the filter media construction.

Embodiment 16. The filter cartridge of embodiment 15 wherein: (a) the cartridge projections include gear teeth.

Embodiment 17. The filter cartridge of any one of embodiments 15 and 16 wherein the cartridge projections are part of a ring member.

Embodiment 18. The filter cartridge of any one of embodiments 15-17 wherein the cartridge projections are circumferentially spaced from each other.

Embodiment 19. The filter cartridge of any one of embodiments 15-18 wherein, when the filter cartridge is operably installed with a filter head, the cartridge projections are configure to hold a valve shaft in a fixed and open position.

Embodiment 20. The filter cartridge of any one of embodiments 15-19 wherein the cartridge projections extend radially outwardly.

Embodiment 21. The filter cartridge of any one of embodiments 15-19 wherein the cartridge projections extend radially inwardly.

Embodiment 22. The filter cartridge of embodiment 17, wherein the cartridge projections project from a radial wall of the ring member.

Embodiment 23. The filter cartridge of any one of embodiments 15 and 16 wherein the cartridge projections project from a plane perpendicular to a central longitudinal axis of the filter media construction.

Embodiment 24. The filter cartridge of any one of embodiments 15 and 16 wherein the cartridge projections are parallel to a central longitudinal axis of the filter media construction.

Embodiment 25. The filter cartridge of any one of embodiments 16-24 wherein:

Embodiment (a) the filter media construction includes pleated media in a tube shape surrounding an open interior volume and has first and second opposite ends; and (b) the cartridge includes a first end cap secured to the first end of the filter media construction; the first end cap having an opening in communication with the open interior volume.

Embodiment 26. The filter cartridge of embodiment 17 and 25 wherein the ring member is part of the first end cap.

Embodiment 27. The filter cartridge of embodiment 26 further including: (a) a radial directed seal member secured to the first end cap.

Embodiment 28. The filter cartridge of embodiment 27 wherein: (a) the seal member is held within a groove having a base; and (b) a lateral distance between an outermost tip of the projections and the base of the groove is 1-13 mm.

Embodiment 29. The filter cartridge of embodiment 28 wherein the lateral distance between an outermost tip of the projections and the base of the groove is 5 and 10 mm.

Embodiment 30. The filter cartridge of embodiment 28 wherein the lateral distance between an outermost tip of the projections and the base of the groove is 7-8 mm.

Embodiment 31. The filter cartridge of any one of embodiments 27-30 wherein: (a) the pleated media has inner pleat tips and outer pleat tips; and (b) the seal member is positioned spaced radially from both the inner pleat tips and outer pleat tips.

Embodiment 32. The filter cartridge of any one of embodiments 27-30 wherein: (a) the pleated media has inner pleat tips and outer pleat tips; and (b) the seal member is positioned to be spaced radially from the inner pleat tips.

Embodiment 33. The filter cartridge of any one of embodiments 31 and 32 wherein: (a) the ring member having the projections is radially spaced between the inner pleat tips and outer pleat tips, and wherein the projections are spaced radially inward from the outer pleat tips.

Embodiment 34. The filter cartridge of embodiment 33 wherein: (a) the first end cap includes a seal member holder extending axially from the first end cap and between the inner pleat tips and outer pleat tips; the holder having a radial groove holding the seal member; and (b) the ring member in an integral part of the seal member holder.

Embodiment 35. The filter cartridge of embodiment 34 wherein: (a) the seal member extends radially inwardly; and (b) the cartridge projections on the ring member extend radially outwardly.

Embodiment 36. The filter cartridge of embodiment 35 wherein the seal member extends radially outwardly.

Embodiment 37. The filter cartridge of embodiment 36 wherein the cartridge projections on the ring member extend radially outwardly.

Embodiment 38. The filter cartridge of any one of embodiments 15-37 wherein the cartridge projections are spur gear teeth.

Embodiment 39. The filter cartridge of any one of embodiments 25-38 further including a second end cap secured to a second end of the filter media construction.

Embodiment 40. The filter cartridge of any one of embodiments 15-39 further comprising a housing with an interior holding the filter media construction within the interior.

Embodiment 41. The filter cartridge of embodiment 40 wherein the housing has externally directed threads for connection with a filter head.

Embodiment 42. The filter cartridge of any one of embodiments 40 and 41 wherein the filter media construction is non-removably secured within the housing.

Embodiment 43. The filter cartridge of any one of embodiments 40 and 41 wherein the filter media construction is removably secured within the housing.

Embodiment 44. The filter cartridge of any one of embodiments 15-43 wherein the cartridge projections are along a full 360° extension.

Embodiment 45. The filter cartridge of any one of embodiments 15-44 wherein each projection has a height of 0.12-0.34".

Embodiment 46. The filter cartridge of any one of embodiments 15-44 wherein each projection has a height of about $13/35$" inch.

Embodiment 47. The filter cartridge of any one of embodiments 15-46 wherein each projection is a gear tooth sized so that a one tooth angle of rotation is 7.2-20°

Embodiment 48. The filter cartridge of any one of embodiments 15-47 wherein each projection is a gear tooth sized so that a one tooth angle of rotation is about 10-11°.

Embodiment 49. The filter cartridge any one of embodiments 15-48 wherein there are no more than 50 projections.

Embodiment 50. The filter cartridge any one of embodiments 15-49 wherein there are no fewer than 18 projections.

Embodiment 51. The filter cartridge any one of embodiments 15-50 wherein there are about 43-47 projections.

Embodiment 52. The filter cartridge of any one of embodiments 15-51 further including an anti-rotation arrangement.

Embodiment 53. The filter cartridge of embodiment 52 wherein the anti-rotation arrangement comprises a plurality of tabs projecting radially from the element.

Embodiment 54. The filter cartridge of any one of embodiments 15-46 wherein the projections are one of spur, pin or paddle shaped.

Embodiment 55. The filter cartridge of any one of embodiments 15-46 wherein the projections are in groups of three, and there is no more than a single group of three projections.

Embodiment 56. The filter cartridge of any one of embodiments 15-46 wherein the projections are in groups of three, and there at least 3 group of three projections, each group being circumferentially spaced from an adjacent group.

Embodiment 57. The filter cartridge of embodiment 56 further including axially projecting ridges or fins circumferentially extending between the groups.

Embodiment 58. A filter head arrangement comprising: (a) a fluid inlet; and (b) a valve arrangement according to any one of embodiments 1-13; wherein the valve projections are constructed and arranged to receive a force to rotate the valve shaft between an open position and a closed position; (i) the open position aligning the fluid flow bore with the fluid inlet; and (ii) the closed position blocking fluid flow from the fluid inlet.

Embodiment 59. The filter head arrangement of embodiment 58 wherein the valve arrangement further includes a torsion spring to hold the valve shaft in the closed position when no force is applied to the valve projections.

Embodiment 60. A filter assembly comprising: (a) a filter head arrangement of embodiment 58; and (b) a filter cartridge according to any one of embodiments 14-57 removably secured to the filter head; wherein the cartridge projections on the filter cartridge apply a force against the valve projections to move the valve shaft between the open and closed positions.

Embodiment 61. The filter assembly of embodiment 60 wherein: (a) the cartridge projections comprise cartridge gear teeth; and (b) the valve projections comprise valve gear teeth.

Embodiment 62. The filter assembly of embodiment 61 wherein the valve gear teeth extend along no more than a 180° arc.

Embodiment 63. The filter assembly of embodiment 61 wherein the valve gear teeth extend along no more than a 120° arc.

Embodiment 64. The filter assembly of any one of embodiments 61-63 wherein: (a) a ratio of the valve gear teeth to the cartridge gear teeth is about 1:2.5-1:5.

Embodiment 65. The filter assembly of any one of embodiments 61-63 wherein: (a) a ratio of the valve gear teeth to the cartridge gear teeth is about 1:2.69.

Embodiment 66. The filter assembly of any one of embodiments 61-65 wherein the height of the valve gear teeth and the cartridge gear teeth is between about 0.12 inch and 0.34 inch.

Embodiment 67. The filter assembly of any one of embodiments 61-66 wherein the height of the valve gear teeth and the cartridge gear teeth is about $13/35$ths inch.

Embodiment 68. The filter assembly of any one of embodiments 61-67 wherein: (a) the valve shaft has an outer diameter of about 17-18 mm; and (b) the bore in the valve shaft has a diameter of about 9-10 mm.

Embodiment 69. The filter assembly of any one of embodiments 60-68 wherein: (a) the valve shaft has a rotational axis parallel to a central longitudinal axis of the filter cartridge.

Embodiment 70. The filter assembly of any one of embodiments 60-68 wherein: (a) the valve shaft has a rotational axis perpendicular to a central longitudinal axis of the filter cartridge.

Embodiment 71. The filter assembly of any one of embodiments 61-70 wherein: (a) the filter cartridge is a spin-on cartridge comprising a filter element non-removably secured within an outer housing; the housing being removably attached to the filter head.

Embodiment 72. The filter assembly of any one of embodiments 61-70 wherein: (a) the filter cartridge comprises a bowl-cartridge assembly including a filter element removably positioned within a bowl; the bowl being removably attached to the filter head.

Embodiment 73. The filter assembly of embodiment 72 wherein the bowl-cartridge assembly further includes a coalescer element in an interior of the filter cartridge.

Embodiment 74. The filter assembly of any one of embodiments 72 and 73 wherein the filter element and bowl include an anti-rotation arrangement.

Embodiment 75. The filter assembly of embodiment 74 wherein the anti-rotation arrangement includes a plurality of tabs projecting radially from the element, and a plurality of slots along an interior wall of the bowl receiving the tabs.

Embodiment 76. The filter assembly of embodiment 75 wherein the anti-rotation arrangement includes at least one protrusion extending outward from an endcap.

Embodiment 77. The filter assembly of embodiment 75, wherein the anti-rotation arrangement comprises a pocket arrangement configured to receive a protrusion on a filter housing.

Embodiment 78. A method comprising: (a) rotating a filter assembly having a first screw thread relative to a mating screw thread of a filter head, wherein rotating the filter assembly rotates a set of cartridge projections; (b) axially translating the first endcap of the filter assembly into the filter head resulting from rotating the filter assembly, wherein axially translating the first endcap into the filter head positions the cartridge projections into operational engagement with one or more projections on a valve shaft in the filter head; and (c) opening a valve integral with the valve shaft in the filter head by rotating the projections on the valve shaft resulting from rotating the cartridge projections.

Embodiment 79. The method of embodiment 78 wherein the step of rotating includes rotating the set of cartridge projections that are integral with a first endcap of the filter assembly about a central axis Embodiment 80. The method of embodiment 79, wherein opening the valve comprises rotating the valve about a rotational axis.

Embodiment 81. The method of embodiment 80 wherein the valve rotational axis and central axis are parallel and offset.

Embodiment 82. The method of embodiment 80 wherein the valve rotational axis is perpendicular to the central axis.

Embodiment 83. The method of embodiment 80, wherein the rotational axis is parallel to the central axis.

Embodiment 84. The method of any one of embodiments 78-83, wherein the valve is a ball valve.

Embodiment 85. The method of any one of embodiments 78-84, wherein the cartridge projections comprise teeth on a bevel gear.

Embodiment 86. The method of any one of embodiments 78-84, wherein the cartridge projections comprise teeth on a worm gear.

The above represents example principles. Many embodiments can be made using these principles.

What is claimed is:

1. A filter assembly comprising:
   (a) a filter head arrangement including,
      (i) a fluid inlet; and
      (ii) a valve arrangement having a valve shaft with a fluid flow bore; and valve projections extending from the valve shaft, constructed and arranged to receive a force to rotate the valve shaft; and
   (b) a filter cartridge removably secured to the filter head arrangement; the filter cartridge having filter media construction; and a set of cartridge projections attached to the filter media construction;
      wherein the set of cartridge projections on the filter cartridge apply a force against the valve projections to move the valve shaft between an open position and a closed position;
      (i) the open position aligning the fluid flow bore with the fluid inlet;
      (ii) the closed position blocking fluid flow from the fluid inlet;
      (iii) the set of cartridge projections comprise cartridge gear teeth; and
      (iv) the valve projections comprise valve gear teeth.

2. The filter assembly of claim 1 wherein the valve gear teeth extend along no more than a 180° arc.

3. The filter assembly of claim 1 wherein the valve gear teeth extend along no more than a 120° arc.

4. The filter assembly of claim 1 wherein:
   (a) a ratio of the valve gear teeth to the cartridge gear teeth is about 1:2.5-1:5.

5. The filter assembly of claim 1 wherein:
   (a) a ratio of the valve gear teeth to the cartridge gear teeth is about 1:2.69.

6. The filter assembly of claim 1 wherein a height of the valve gear teeth and the cartridge gear teeth is between about 0.12 inch and 0.34 inch.

7. The filter assembly of claim 1 wherein a height of the valve gear teeth and the cartridge gear teeth is about $13/35$ths inch.

8. The filter assembly of claim 1 wherein:
(a) the valve shaft has an outer diameter of about 17-18 mm; and
(b) the bore in the valve shaft has a diameter of about 9-10 mm.

9. The filter assembly of claim 1 wherein:
(a) the valve shaft has a rotational axis parallel to a central longitudinal axis of the filter cartridge.

10. The filter assembly of claim 1 wherein:
(a) the valve shaft has a rotational axis perpendicular to a central longitudinal axis of the filter cartridge.

11. The filter assembly of claim 1 wherein:
(a) the filter cartridge is a spin-on cartridge comprising a filter element non-removably secured within an outer housing; the housing being removably attached to the filter head arrangement.

12. The filter assembly of claim 1 wherein:
(a) the filter cartridge comprises a bowl-cartridge assembly including a filter element removably positioned within a bowl; the bowl being removably attached to the filter head arrangement.

13. The filter assembly of claim 12 wherein the bowl-cartridge assembly further includes a coalescer element in an interior of the filter cartridge.

14. The filter assembly of claim 12 wherein the filter element and bowl include an anti-rotation arrangement.

15. The filter assembly of claim 14 wherein the anti-rotation arrangement includes a plurality of tabs projecting radially from the element, and a plurality of slots along an interior wall of the bowl receiving the tabs.

16. The filter assembly of claim 15 wherein the anti-rotation arrangement includes at least one protrusion extending outward from an endcap.

17. The filter assembly of claim 15, wherein the anti-rotation arrangement comprises a pocket arrangement configured to receive a protrusion on a filter housing.

18. A filter assembly comprising:
(a) a filter head arrangement including,
  (i) a fluid inlet; and
  (ii) a valve arrangement having a valve shaft with a fluid flow bore; and valve projections extending from the valve shaft, constructed and arranged to receive a force to rotate the valve shaft; and
(b) a filter cartridge removably secured to the filter head arrangement; the filter cartridge having filter media construction; and a set of cartridge projections attached to the filter media construction;
  wherein the set of cartridge projections on the filter cartridge apply a force against the valve projections to move the valve shaft between an open position and a closed position;
  (i) the open position aligning the fluid flow bore with the fluid inlet;
  (ii) the closed position blocking fluid flow from the fluid inlet; and
  wherein the valve shaft has a rotational axis perpendicular to a central longitudinal axis of the filter cartridge.

19. The filter assembly of claim 18 wherein:
(a) the set of cartridge projections comprise cartridge gear teeth;
(b) the valve projections comprise valve gear teeth; and
(c) the valve gear teeth extend along no more than a 180° arc.

20. The filter assembly of claim 19 wherein:
(a) a ratio of the valve gear teeth to the cartridge gear teeth is about 1:2.5-1:5.

21. The filter assembly of claim 19 wherein a height of the valve gear teeth and the cartridge gear teeth is between about 0.12 inch and 0.34 inch.

22. The filter assembly of claim 18 wherein:
(a) the valve shaft has an outer diameter of about 17-18 mm; and
(b) the bore in the valve shaft has a diameter of about 9-10 mm.

* * * * *